(12) United States Patent
Tsuda

(10) Patent No.: US 8,971,900 B2
(45) Date of Patent: Mar. 3, 2015

(54) INFORMATION PROCESSING METHOD, INFORMATION PROCESSING DEVICE AND COMMUNICATION SYSTEM

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 5 days.

(21) Appl. No.: 13/981,362

(22) PCT Filed: Jan. 24, 2012

(86) PCT No.: PCT/JP2012/051408
§ 371 (c)(1),
(2), (4) Date: Jul. 24, 2013

(87) PCT Pub. No.: WO2012/105366
PCT Pub. Date: Aug. 9, 2012

(65) Prior Publication Data
US 2013/0303117 A1    Nov. 14, 2013

(30) Foreign Application Priority Data
Jan. 31, 2011   (JP) ................. 2011-017609

(51) Int. Cl.
*H04W 36/22* (2009.01)
*H04W 48/06* (2009.01)
*H04W 8/18* (2009.01)
*H04W 48/18* (2009.01)

(52) U.S. Cl.
CPC .............. *H04W 36/22* (2013.01); *H04W 48/06* (2013.01); *H04W 8/183* (2013.01); *H04W 48/18* (2013.01)
USPC ........... 455/445; 455/453; 370/229; 370/237

(58) Field of Classification Search
CPC ..... H04W 36/22; H04W 48/06; H04W 8/183; H04W 48/18
USPC ........................ 455/445, 453; 370/229, 237
See application file for complete search history.

(56) References Cited

U.S. PATENT DOCUMENTS

| 7,957,353 | B2 * | 6/2011 | Sashihara | 370/338 |
|---|---|---|---|---|
| 7,990,863 | B2 * | 8/2011 | Yagyu et al. | 370/232 |
| 2006/0182023 | A1 * | 8/2006 | Bejerano et al. | 370/229 |
| 2009/0209282 | A1 * | 8/2009 | Kobayashi et al. | 455/552.1 |

FOREIGN PATENT DOCUMENTS

| JP | 2001-358644 | 12/2001 |
|---|---|---|
| JP | 2002-078020 | 3/2002 |
| JP | 2010-171520 | 8/2010 |
| JP | 2010-171662 | 8/2010 |

OTHER PUBLICATIONS

International Search Report and Written Opinion mailed Apr. 10, 2012 for Application No. PCT/JP2012/051408.
International Preliminary Report on Patentability mailed Aug. 15, 2013 for Application No. PCT/JP2012/051408.

* cited by examiner

*Primary Examiner* — Ajit Patel
(74) *Attorney, Agent, or Firm* — Wolf, Greenfield & Sacks, P.C.

(57) ABSTRACT

Provided is an information processing method including an extraction procedure of extracting another communication service provider other than a first communication service provider based on a result of a comparison of a congestion degree of a base station related to the first communication service provider with a congestion degree of each of base stations related to one or a plurality of communication service providers other than the first communication service provider, and an exchange control procedure of performing control to transfer the first access right from the first wireless terminal device to a second wireless terminal device having a second access right to access a base station related to the other extracted communication service provider, and to transfer the second access right from the second wireless terminal device to the first wireless terminal device.

15 Claims, 37 Drawing Sheets

FIG. 1
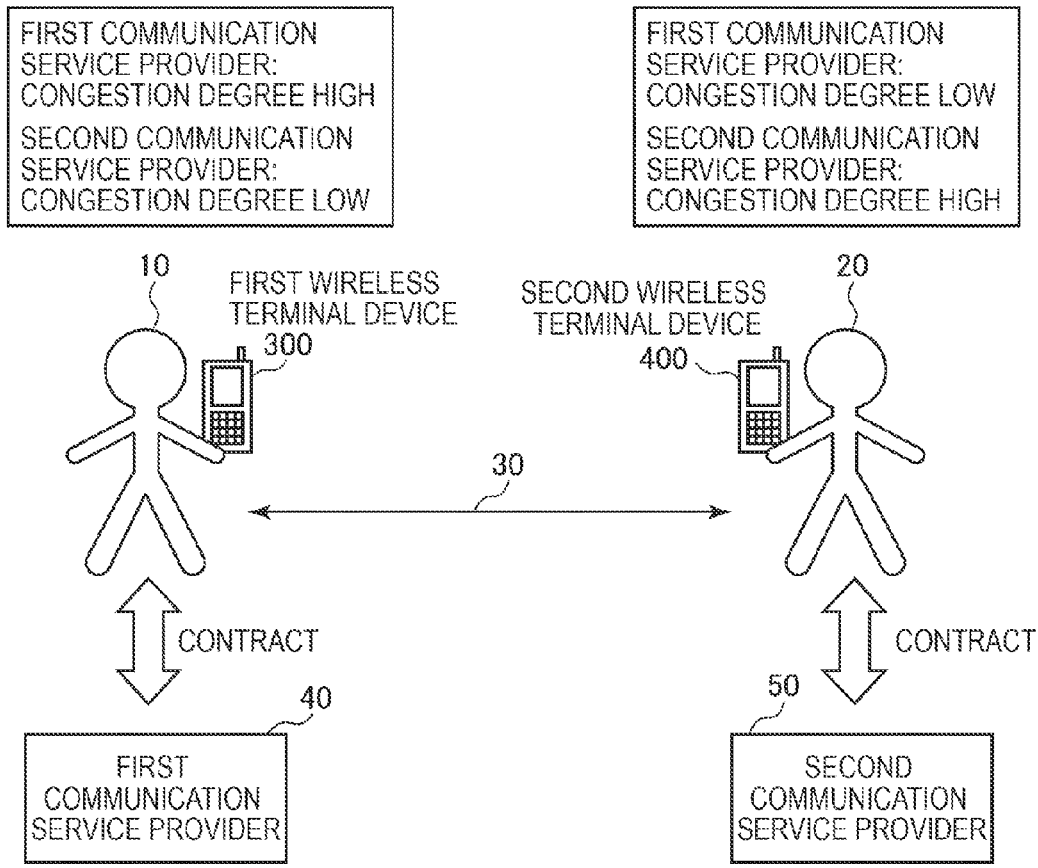
(a)
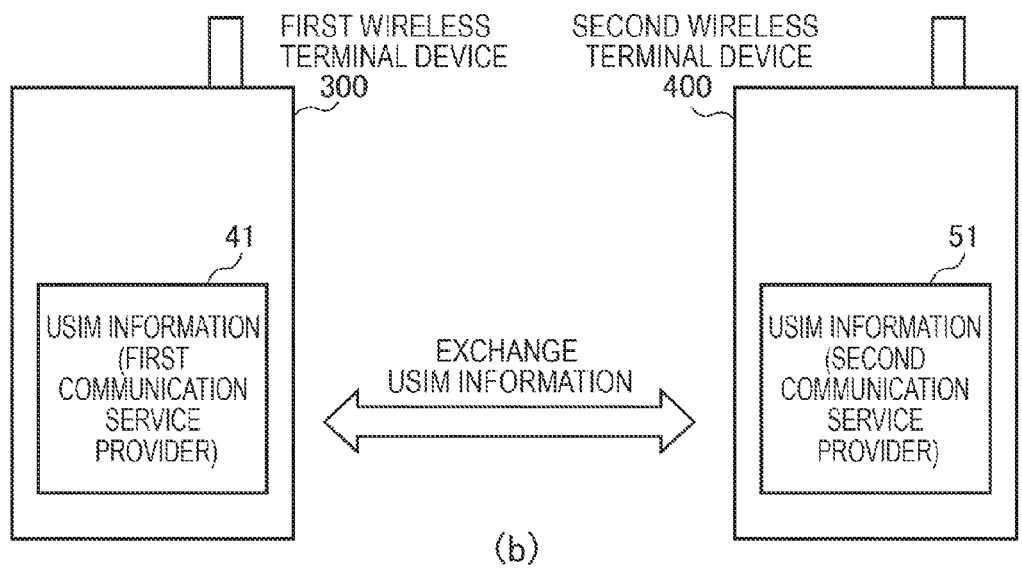
(b)

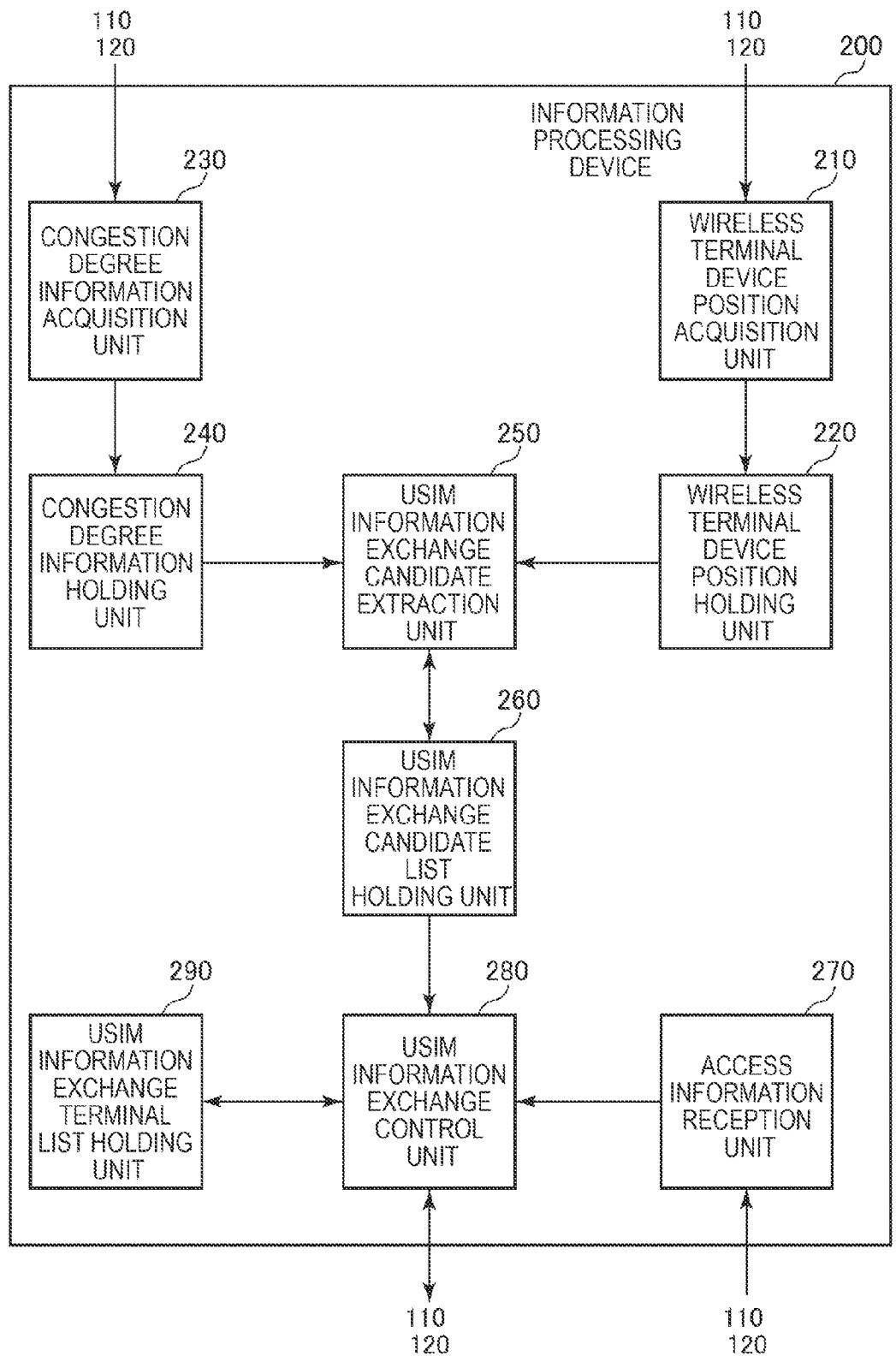

FIG. 5

WIRELESS TERMINAL DEVICE POSITION HOLDING UNIT
220

| | TERMINAL IDENTIFICATION INFORMATION 221 | POSITION INFORMATION 222 | COMMUNICATION SERVICE PROVIDER IDENTIFICATION INFORMATION 223 |
|---|---|---|---|
| 1 | #1 (FIRST WIRELESS TERMINAL DEVICE) | LATITUDE: ○○° ○○' LONGITUDE: ○○° ○○' | #101 (FIRST COMMUNICATION SERVICE PROVIDER) |
| 2 | #2 (SECOND WIRELESS TERMINAL DEVICE) | LATITUDE: ○○° ○○' LONGITUDE: ○○° ○○' | #102 (SECOND COMMUNICATION SERVICE PROVIDER) |
| ... | ... | ... | ... |
| ... | ... | ... | ... |

FIG. 6

CONGESTION DEGREE INFORMATION HOLDING UNIT
240

| FIRST COMMUNICATION SERVICE PROVIDER | | | SECOND COMMUNICATION SERVICE PROVIDER | | |
|---|---|---|---|---|---|
| 241 | 242 | 243 | 241 | 242 | 243 |
| CELL ID | POSITION INFORMATION | CONGESTION DEGREE INFORMATION | CELL ID | POSITION INFORMATION | CONGESTION DEGREE INFORMATION |
| c5c00a | 35.622, 139.731 | 0.125 | b2640d4 | 35.625, 139.735 | 0.505 |
| 611c047 | 35.631, 139.716 | 0.447 | b204066 | 35.633, 139.712 | 0.111 |
| 24404c | 35.658, 139.701 | 0.278 | b248087 | 35.660, 139.703 | 0.339 |
| 607402b | 35.657, 139.699 | 0.777 | 9f7013b | 35.655, 139.700 | 0.227 |
| 5f2407c | 35.546, 139.530 | 0.338 | 9f70095 | 35.544, 139.527 | 0.109 |
| 5f2407d | 35.544, 139.528 | 0.121 | 9d041df | 35.540, 139.522 | 0.419 |
| ⋮ | ⋮ | ⋮ | ⋮ | ⋮ | ⋮ |
| 5f24018 | 35.622, 139.731 | 0.298 | 9d1016b | 35.620, 139.733 | 0.519 |

USIM INFORMATION EXCHANGE CANDIDATE LIST HOLDING UNIT
260

| | TERMINAL IDENTIFICATION INFORMATION 261 | COMMUNICATION SERVICE PROVIDER IDENTIFICATION INFORMATION 262 | USIM INFORMATION EXCHANGE CANDIDATE INFORMATION 263 |
|---|---|---|---|
| 1 | #1 (FIRST WIRELESS TERMINAL DEVICE) | #101 (FIRST COMMUNICATION SERVICE PROVIDER) | #102 (SECOND COMMUNICATION SERVICE PROVIDER) |
| 2 | #2 (SECOND WIRELESS TERMINAL DEVICE) | #102 (SECOND COMMUNICATION SERVICE PROVIDER) | #101 (FIRST COMMUNICATION SERVICE PROVIDER) |
| ... | ... | ... | ... |
| ... | ... | ... | ... |

FIG. 8

USIM INFORMATION EXCHANGE TERMINAL LIST HOLDING UNIT
290

| | 291<br>IDENTIFICATION INFORMATION FOR TERMINAL UNDER USIM INFORMATION EXCHANGE | 292<br>IDENTIFICATION INFORMATION FOR COMMUNICATION SERVICE PROVIDER THAT TERMINAL UNDER USIM INFORMATION EXCHANGE CAN ACCESS |
|---|---|---|
| 1 | #1<br>(FIRST WIRELESS TERMINAL DEVICE) | #101<br>(SECOND COMMUNICATION SERVICE PROVIDER) |
| | #2<br>(SECOND WIRELESS TERMINAL DEVICE) | #102<br>(FIRST COMMUNICATION SERVICE PROVIDER) |
| ⋮ | ... | ... |
| | ... | ... |
| ⋮ | ⋮ | ⋮ |

FIG. 10

DISPLAY UNIT 350

DISPLAY EXAMPLE OF WIRELESS TERMINAL DEVICE OF EXCHANGE PARTNER

SIM INFORMATION IS CURRENTLY UNDER EXCHANGE.

CURRENTLY AVAILABLE
COMMUNICATION SERVICE PROVIDER IS

FIRST COMMUNICATION
SERVICE PROVIDER

EXPECTED COMMUNICATION RATE AND
COMMUNICATION UNIT PRICE OF
FIRST COMMUNICATION SERVICE
PROVIDER ARE AS FOLLOWS.

■ EXPECTED COMMUNICATION RATE : ABOUT 2 Mbps

■ COMMUNICATION UNIT PRICE : ¥ 0.025/kB

FIG. 16
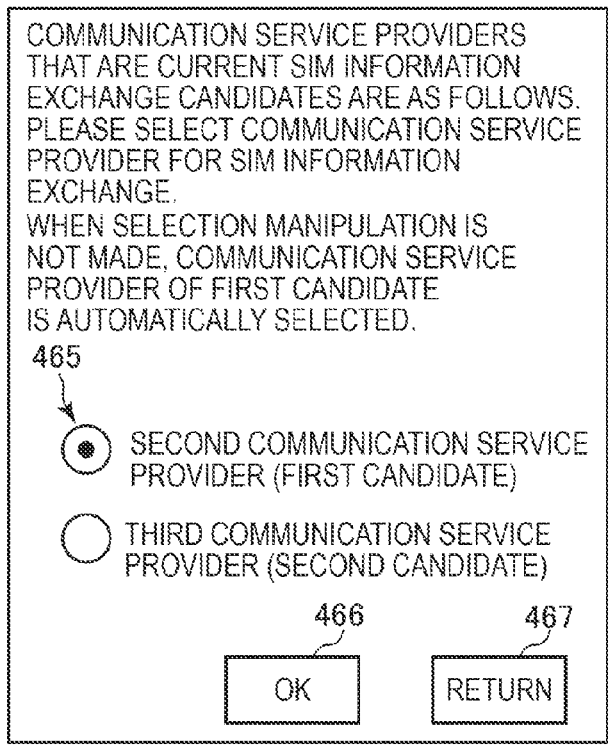
(a)
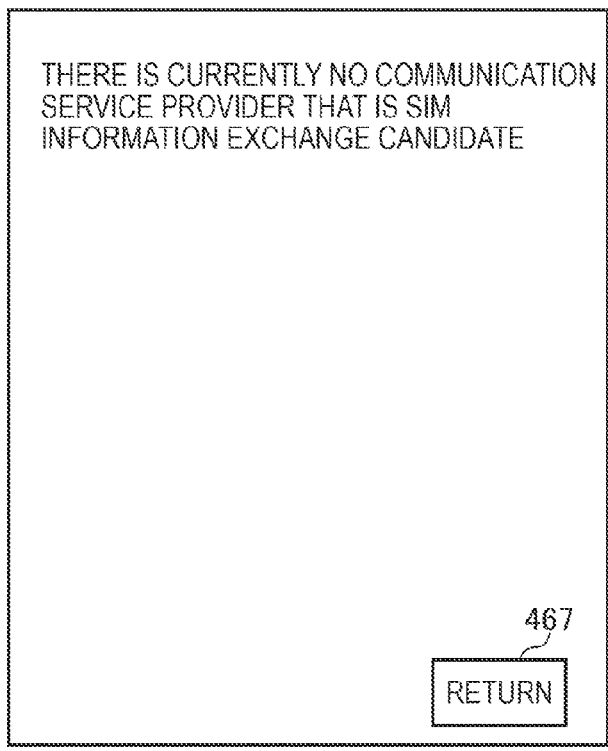
(b)

FIG. 19

WIRELESS TERMINAL DEVICE INFORMATION HOLDING UNIT
620

| | TERMINAL IDENTIFICATION INFORMATION 221 | POSITION INFORMATION 222 | COMMUNICATION SERVICE PROVIDER IDENTIFICATION INFORMATION 223 | NONUSE PERIOD INFORMATION 621 |
|---|---|---|---|---|
| 1 | #1 (WIRELESS TERMINAL DEVICE 300) | LATITUDE: OO° OO' LONGITUDE: OO° OO' | #101 (FIRST COMMUNICATION SERVICE PROVIDER 40) | IN USE |
| 2 | #2 (WIRELESS TERMINAL DEVICE 400) | LATITUDE: OO° OO' LONGITUDE: OO° OO' | #102 (SECOND COMMUNICATION SERVICE PROVIDER 50) | UNUSED |
| ... | ... | ... | ... | ... |
| ... | ... | ... | ... | ... |

FIG. 20

USIM INFORMATION EXCHANGE CANDIDATE LIST HOLDING UNIT 640

| | TERMINAL IDENTIFICATION INFORMATION 261 | COMMUNICATION SERVICE PROVIDER IDENTIFICATION INFORMATION 262 | USIM INFORMATION EXCHANGE CANDIDATE INFORMATION 263 | UNUSED TERMINAL INFORMATION 641 |
|---|---|---|---|---|
| 1 | #1 (FIRST WIRELESS TERMINAL DEVICE) | #101 (FIRST COMMUNICATION SERVICE PROVIDER) | #102 (SECOND COMMUNICATION SERVICE PROVIDER) | #2 (SECOND WIRELESS TERMINAL DEVICE) |
| 2 | #2 (SECOND WIRELESS TERMINAL DEVICE) | #102 (SECOND COMMUNICATION SERVICE PROVIDER) | #101 (FIRST COMMUNICATION SERVICE PROVIDER) | ... |
| ... | ... | ... | ... | ... |
| ... | ... | ... | ... | ... |

FIG. 21

VIRTUAL RENEWAL COMPLETION TERMINAL LIST HOLDING UNIT
650

| IDENTIFICATION INFORMATION FOR TERMINAL IN NONUSE PERIOD (651) | IDENTIFICATION INFORMATION FOR COMMUNICATION SERVICE PROVIDER THAT TERMINAL IN NONUSE PERIOD CAN ACCESS (652) |
|---|---|
| #2 (WIRELESS TERMINAL DEVICE 400) | #102 (SECOND COMMUNICATION SERVICE PROVIDER 50) |
| ... | ... |
| ⋮ | ⋮ |

EXAMPLE OF SETTING OF NONUSE PERIOD
BASED ON POWER ON/OFF MANIPULATION

FIG. 27

WIRELESS TERMINAL DEVICE INFORMATION HOLDING UNIT 720

| | TERMINAL IDENTIFICATION INFORMATION 221 | POSITION INFORMATION 222 | COMMUNICATION SERVICE PROVIDER IDENTIFICATION INFORMATION 223 | COMMUNICATION UNIT PRICE INFORMATION 721 |
|---|---|---|---|---|
| 1 | #1 (WIRELESS TERMINAL DEVICE 300) | LATITUDE: ○○° ○○' LONGITUDE: ○○° ○○' | #101 (FIRST COMMUNICATION SERVICE PROVIDER 40) | ... |
| 2 | #2 (WIRELESS TERMINAL DEVICE 400) | LATITUDE: ○○° ○○' LONGITUDE: ○○° ○○' | #102 (SECOND COMMUNICATION SERVICE PROVIDER 50) | ... |
| ... | ... | ... | ... | ... |
| ... | ... | ... | ... | ... |

FIG. 28

CHARGING INFORMATION HOLDING UNIT
740

| | TERMINAL IDENTIFICATION INFORMATION 741 | CHARGING INFORMATION 742 | |
|---|---|---|---|
| | | HISTORY INFORMATION | TOTAL AMOUNT (COMMUNICATION COST) |
| 1 | #1 (WIRELESS TERMINAL DEVICE 300) | ⋮ | 1,000 YEN |
| 2 | #2 (WIRELESS TERMINAL DEVICE 400) | ⋮ | 2,000 YEN |
| ⋮ | ... | ... | ... |
| ⋮ | ⋮ | ⋮ | ⋮ |

INFORMATION PROCESSING METHOD, INFORMATION PROCESSING DEVICE AND COMMUNICATION SYSTEM

TECHNICAL FIELD

The present disclosure relates to an information processing method, and more particularly, to an information processing method, an information processing device, and a communication system for wireless communication.

BACKGROUND ART

Conventionally, wireless terminal devices accessing networks such as public wireless networks have spread widely. Further, portable telephone service of a 3G scheme (called a third generation in Japan) was started in 2002. In this portable telephone service, initially, a small capacity of packets such as sounds or emails were primary applications. However, with the introduction of HSDPA (High Speed Downlink Packet Access) or the like, a use action of users is being changed to downloading of packets having a relatively large size such as downloading of music files and watching of videos.

Further, traffic is assumed to be concentrated locally due to users being concentrated in a specific area (a base station) and downloading a large capacity of packets. In this case, a problem is generated, for example, in that a sufficient communication rate is not obtained.

Therefore, for example, a distribution system in which, when a content distribution request from a wireless terminal device is made, it is determined whether the distribution is performed according to a reception environment in the wireless terminal device has been proposed (e.g., see Patent Literature 1).

CITATION LIST

Patent Literature

[Patent Literature 1] Japanese Patent Laid-Open No. 2002-78020

SUMMARY OF INVENTION

Technical Problem

In the above-mentioned related art, when the reception environment in the wireless terminal device is not good, the distribution of content to the wireless terminal device is not performed. In this case, for example, the distribution itself stops or a determination of the reception environment is performed after a predetermined period has elapsed and it is determined again whether the distribution is performed according to the reception environment.

However, when the reception environment in the wireless terminal device is not good and the distribution of the content to the wireless terminal device is not performed, it is difficult to receive appropriate wireless access service at a timing desired by a user.

This disclosure has been made in view of such circumstances and an object of this disclosure is to provide appropriate wireless access service.

Solution to Problem

According to a first embodiment of the present disclosure, there is provided an information processing method and a program for causing a computer to execute the method, the method including an extraction procedure of extracting another communication service provider other than a first communication service provider based on a result of a comparison of a congestion degree of a base station related to the first communication service provider corresponding to a position in which a first wireless terminal device having a first access right to access the base station related to the first communication service provider is present with a congestion degree of each of base stations related to one or a plurality of communication service providers other than the first communication service provider corresponding to the position in which the first wireless terminal device is present, and an exchange control procedure of performing control to transfer the first access right from the first wireless terminal device to a second wireless terminal device having a second access right to access a base station related to the other extracted communication service provider, and to transfer the second access right from the second wireless terminal device to the first wireless terminal device. This yields an effect that the other communication service provider is extracted based on the result of the comparison of the congestion degrees of the respective base stations, the first access right is transferred from the first wireless terminal device to the second wireless terminal device having the second access right to access the base station related to the other extracted communication service provider, and the second access right is transferred from the second wireless terminal device to the first wireless terminal device.

According to the first embodiment of the present disclosure, the extraction procedure may extract as the other communication service provider, a communication service provider related to a base station whose congestion degree is lower than the congestion degree of the base station related to the first communication service provider corresponding to the position in which the first wireless terminal device is present. This yields an effect that the communication service provider related to the base station whose congestion degree is lower than the congestion degree of the base station related to the first communication service provider corresponding to the position in which the first wireless terminal device is present is extracted as the other communication service provider.

According to the first embodiment of the present disclosure, the extraction procedure may compare the congestion degree of the base station related to the first communication service provider corresponding to the position in which the first wireless terminal device is present with the congestion degree of each of the base stations related to the one or the plurality of communication service providers corresponding to the position in which the first wireless terminal device is present, and extracts a communication service provider related to a base station whose congestion degree is lowest as the other communication service provider. This yields an effect that the congestion degree of the base station related to the first communication service provider corresponding to the position in which the first wireless terminal device is present is compared with the congestion degree of each base station related to the one or the plurality of communication service providers corresponding to the position in which the first wireless terminal device is present, and a communication service provider related to a base station whose congestion degree is lowest is extracted as the other communication service provider.

According to the first embodiment of the present disclosure, the exchange control procedure may transfer the first access right and the second access right when an access request for access to the base station related to the first communication service provider based on the first access right is transmitted from the first wireless terminal device, and, thereafter, may perform control to cause the base station related to the second communication service provider and the first wireless terminal device based on the second access right to access each other. This yields an effect that, when an access request for access to the base station related to the first communication service provider based on the first access right is transmitted from the first wireless terminal device, the transfer of the first access right and the second access right is performed, and the base station related to the second communication service provider is accessed by the first wireless terminal device based on the second access right after the transfer.

According to the first embodiment of the present disclosure, the information processing method may further include a restoration control procedure of performing control, when use of wireless communication service based on the access request ends, to transfer the second access right from the first wireless terminal device to the second wireless terminal device and to transfer the first access right from the second wireless terminal device to the first wireless terminal device. This yields an effect that, when use of wireless communication service based on the access request ends, the second access right is transferred from the first wireless terminal device to the second wireless terminal device, and the first access right is transferred from the second wireless terminal device to the first wireless terminal device.

According to the first embodiment of the present disclosure, the extraction procedure may extract a plurality of communication service providers as the other communication service provider. The exchange control procedure may select, as the second wireless terminal device, a wireless terminal device having an access right to access a base station related to one communication service provider selected in the first wireless terminal device from the plurality of extracted communication service providers. This yields an effect that the plurality of communication service providers are extracted, and the wireless terminal device having an access right to access the base station related to one communication service provider selected in the first wireless terminal device from among the plurality of extracted communication service providers is selected as the second wireless terminal device.

According to the first embodiment of the present disclosure, the information processing method may further include an acquisition procedure of acquiring nonuse information on an unused state of each of wireless terminal devices having an access right to access at least one of the base stations related to the one or a plurality of communication service providers. The exchange control procedure may select, as the second wireless terminal device, a wireless terminal device that is in an unused state from among the plurality of wireless terminal devices having the second access right. This yields an effect that the wireless terminal device that is in an unused state from among the plurality of wireless terminal devices having the second access right is selected as the second wireless terminal device.

According to the first embodiment of the present disclosure, the extraction procedure may acquire and may use the congestion degree of each base station from a wireless terminal device accessing the base station. This yields an effect that the congestion degree of each base station is acquired and used from a wireless terminal device accessing the base station.

According to the first embodiment of the present disclosure, the information processing method may further include a charging procedure of charging, as a cost related to the second wireless terminal device, a cost related to communication performed after access of the first wireless terminal device to the base station related to the second communication service provider based on the second access right after the first access right and the second access right are transferred. This yields an effect that the cost related to communication performed after access of the first wireless terminal device to the base station related to the second communication service provider based on the second access right after the first access right and the second access right are transferred is charged as a cost related to the second wireless terminal device.

According to the first embodiment of the present disclosure, the information processing method may further include a charging procedure of charging, as a cost related to the first wireless terminal device, a cost related to communication performed after access of the first wireless terminal device to the base station related to the second communication service provider based on the second access right after the first access right and the second access right are transferred. This yields an effect that the cost related to communication performed after access of the first wireless terminal device to the base station related to the second communication service provider based on the second access right after the first access right and the second access right are transferred is charged as a cost related to the first wireless terminal device.

According to the first embodiment of the present disclosure, the charging procedure may calculate the cost related to the communication based on a communication unit price related to the second communication service provider. This yields an effect that the communication cost is calculated based on a communication unit price related to the second communication service provider.

According to the first embodiment of the present disclosure, the charging procedure may calculate the cost related to the communication while changing the communication unit price based on the congestion degree of the base station related to the second communication service provider accessing the first wireless terminal device. This yields an effect that the communication cost is calculated while changing the communication unit price based on the congestion degree of the base station related to the second communication service provider accessed by the first wireless terminal device.

According to the first embodiment of the present disclosure, the information processing method may further include a charging procedure of charging, after transfer of the first access right and the second access right, a reward for the transfer in a cost related to the first wireless terminal device and a cost related to the second wireless terminal device. This yields an effect that the reward for the transfer is charged in the cost related to the first wireless terminal device and the cost related to the second wireless terminal device after the transfer of the first access right and the second access right.

According to a second embodiment of the present disclosure, there is provided an information processing device including an extraction unit that extracts another communication service provider other than a first communication service provider based on a result of a comparison of a congestion degree of a base station related to the first communication service provider corresponding to a position in which a first wireless terminal device having a first access right to access the base station related to the first communication service provider is present with a congestion degree of each of base stations related to one or a plurality of communication service providers other than the first communication service provider corresponding to the position in which the first wireless terminal device is present, and a control unit that performs control to transfer the first access right from the first wireless terminal device to a second wireless terminal device having a second access right to access a base station related to the other extracted communication service provider, and to transfer the second access right from the second wireless terminal device to the first wireless terminal device. This yields an effect that the other communication service provider is extracted based on the result of the comparison of the congestion degrees of the respective base stations, the first access right is transferred from the first wireless terminal device to the second wireless terminal device having the second access right to access the base station related to the other extracted communication service provider, and the second access right is transferred from the second wireless terminal device to the first wireless terminal device.

According to a third embodiment of the present disclosure, there is provided an information processing system including a first wireless terminal device having a first access right to access a base station related to a first communication service provider, a second wireless terminal device having a second access right to access a base station related to a second communication service provider, and a control unit that performs control to transfer the first access right from the first wireless terminal device to the second wireless terminal device and to transfer the second access right from the second wireless terminal device to the first wireless terminal device, based on a result of a comparison of a congestion degree of the base station related to the first communication service provider corresponding to a position in which the first wireless terminal device is present with a congestion degree of the base station related to the second communication service provider corresponding to the position in which the first wireless terminal device is present. This yields an effect that the first access right is transferred from the first wireless terminal device to the second wireless terminal device and the second access right is transferred from the second wireless terminal device to the first wireless terminal device based on the result of the comparison of the congestion degrees of the respective base stations.

Advantageous Effects of Invention

According to this disclosure, it is possible to obtain an excellent effect in that it is possible to provide appropriate wireless access service.

BRIEF DESCRIPTION OF DRAWINGS

FIG. 1 is a diagram simply illustrating a use example of a plurality of wireless terminal devices in a first embodiment of this disclosure.

FIG. 4 is a block diagram illustrating a functional configuration example of an information processing device 200 in the first embodiment of this disclosure.

FIG. 5 is a diagram schematically illustrating an example of held content of a wireless terminal device position holding unit 220 in the first embodiment of this disclosure.

FIG. 6 is a diagram schematically illustrating an example of held content of a congestion degree information holding unit 240 in the first embodiment of this disclosure.

FIG. 7 is a diagram schematically illustrating an example of held content of a USIM information exchange candidate list holding unit 260 in the first embodiment of this disclosure.

FIG. 8 is a diagram schematically illustrating an example of held content of a USIM information exchange terminal list holding unit 290 in the first embodiment of this disclosure.

FIG. 10 is a diagram illustrating an example of display screen displayed in a second wireless terminal device 400 in the first embodiment of this disclosure.

FIG. 16 is a diagram illustrating an example of a display screen displayed in the first wireless terminal device 300 in the first embodiment of this disclosure.

FIG. 19 is a diagram schematically illustrating an example of held content of a wireless terminal device information holding unit 620 in the second embodiment of this disclosure.

FIG. 20 is a diagram schematically illustrating an example of held content of a USIM information exchange candidate list holding unit 640 in the second embodiment of this disclosure.

FIG. 21 is a diagram schematically illustrating an example of held content of a virtual renewal completion terminal list holding unit 650 in the second embodiment of this disclosure.

FIG. 27 is a diagram schematically illustrating an example of held content of a wireless terminal device information holding unit 720 in the third embodiment of this disclosure.

FIG. 28 is a diagram schematically illustrating an example of held content of a charging information holding unit 740 in the third embodiment of this disclosure.

DESCRIPTION OF EMBODIMENTS

Figure 2:
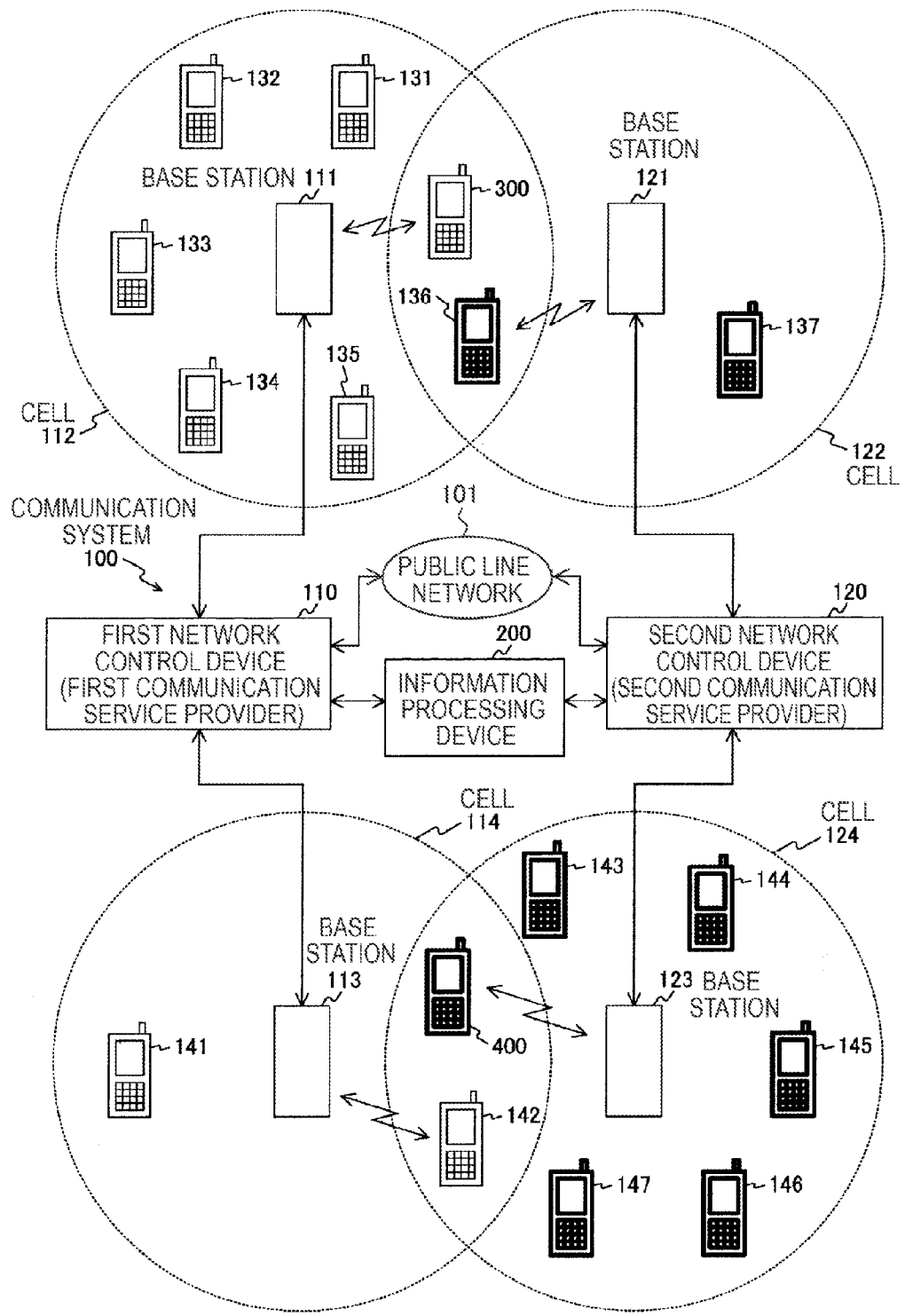
FIG. 2 is a block diagram illustrating a system configuration example of a communication system 100 in the first embodiment of this disclosure.

Hereinafter, modes for carrying out this disclosure (hereinafter referred to as embodiments) will be described. A description is given in the following order.

1. First embodiment (USIM information exchange control: example of exchange of USIM information based on position of wireless terminal device and congestion degree of base station)

2. Second embodiment (USIM information exchange control: example of exchange of USIM information based on unused period of wireless terminal device)

3. Third embodiment (charging control: charging example after exchange of USIM information)

1. First Embodiment

Use Example of Wireless Terminal Device

FIG. 1 is a diagram simply illustrating a use example of a plurality of wireless terminal devices in a first embodiment of this disclosure.

A state in which, in two relatively far places (apart only a distance indicated by an arrow 30), a user 10 owns a first wireless terminal device 300 and a user 20 owns a second wireless terminal device 400 is illustrated in FIG. 1(a). Further, a first communication service provider 40 and a second communication service provider 50 are mobile communication service providers that provide wireless access service. Further, the first wireless terminal device 300 and the second wireless terminal device 400 are, for example, portable telephone devices (e.g., portable telephone devices or smartphones with a call function and a data communication function), data communication devices with a wireless communication function (e.g., a personal computer), or the like.

Here, it is assumed that the user 10 has contracted wireless access service with the first communication service provider 40, and the user 20 has contracted wireless access service with the second communication service provider 50. In other words, the user 10 has made a contract for use of a base station operated by the first communication service provider 40, and the user 20 has made a contract for use of a base station operated by the second communication service provider 50. In this case, the first wireless terminal device 300 owned by the user 10 can use a portable telephone network of the first communication service provider 40 by holding USIM information 41 of the first communication service provider 40, as illustrated in FIG. 1(b). Further, the second wireless terminal device 400 owned by the user 20 can use a mobile telephone network of the second communication service provider 50 by holding USIM information 51 of the second communication service provider 50. Here, the USIM information is an example of contract authentication information, and the contract authentication information is information including telephone subscriber information and authentication key information.

Here, it is assumed that a congestion degree of the base station (the first communication service provider 40) that the first wireless terminal device 300 wirelessly accesses is high whereas a congestion degree of the base station (the second communication service provider 50) installed in an area corresponding to the position of the base station (the first communication service provider 40) is low, as illustrated in FIG. 1(a). It is also assumed that the congestion degree of the base station (the second communication service provider 50) that the second wireless terminal device 400 wirelessly accesses is high whereas the congestion degree of the base station (the first communication service provider 40) installed in an area corresponding to a position of the base station (the second communication service provider 50) is small. In this case, although the user 10 and the user 20 are present within coverage of the base station with the low congestion degree, it is difficult for the user 10 and the user 20 to use such a base station.

Accordingly, in the first embodiment of this disclosure, as in the case illustrated in FIG. 1(a), the USIM information 41 held in the first wireless terminal device 300 and the USIM information 51 held in the second wireless terminal device 400 are exchanged as illustrated in FIG. 1(b). Thus, by exchanging each other's USIM information and using the USIM information after exchange for access to the base station, it is possible to improve a communication environment of each of the first wireless terminal device 300 and the second wireless terminal device 400.

[Configuration Example of Communication System]

FIG. 2 is a block diagram illustrating a system configuration example of a communication system 100 in a first embodiment of this disclosure.

The communication system 100 includes a public line network 101, a first network control device 110, a second network control device 120, base stations 111, 113, 121, and 123, an information processing device 200, and a plurality of wireless terminal devices (e.g., 300 and 400).

The public line network 101 is a public line network, such as a telephone network or the Internet. Further, the public line network 101, the first network control device 110, and the second network control device 120 are accessed by each other via a gateway (not illustrated).

The base stations 111 and 113 are base stations operated by the first communication service provider 40, and are mobile communication base stations (NodeB) that cause wireless terminal devices holding the USIM information of the first communication service provider 40 and the first network control device 110 to access each other via a wireless line. A user 10 owning the first wireless terminal device 300 is assumed to have made a contract with the first communication service provider 40 to use the base stations 111 and 113, as described above. Further, respective users owning the wireless terminal device 131 to 135, 141 and 142 are assumed to have made a contract with the first communication service provider 40 to use the base stations 111 and 113.

Further, in FIG. 2, a range reached by radio waves of the base station 111 (a range in which wireless communication is possible) is schematically illustrated as a cell 112 and a range reached by radio waves of the base station 113 is schematically illustrated as a cell 114. Further, it is assumed that relatively more wireless terminal devices (e.g., the wireless terminal devices 131 to 135 and 300) are present in the cell 112 whereas relatively fewer wireless terminal devices (e.g., the wireless terminal devices 141 and 142) are present in the cell 114.

Further, in the embodiment of this disclosure, the base station is assumed to include meanings of both the base station itself and the cell identified by the base station. For example, in the embodiment of this disclosure, a contract to use a base station is assumed to include a meaning of a contract to use a cell identified by the base station.

The base stations 121 and 123 are base stations operated by the second communication service provider 50 and are mobile communication base stations (NodeB) that cause wireless terminal devices holding the USIM information of the second communication service provider 50 and the second network control device 120 to access each other via a wireless line. As described above, the user 20 owning the second wireless terminal device 400 is assumed to have made a contract with the second communication service provider 50 to use the base stations 121 and 123. Further, respective users owning the wireless terminal devices 136, 137, and 143 to 147 are assumed to have made contracts with the second communication service provider 50 to use the base stations 121 and 123. In FIG. 2, the wireless terminal devices 136, 137, 143 to 147 and 400 in contract with the second communication service provider 50 to use the base stations 121 and 123 are indicated by bold lines.

In FIG. 2, a range reached by radio waves of the base station 121 (a range in which wireless communication is possible) is schematically illustrated as a cell 122, and a range reached by radio waves of the base station 123 is schematically illustrated as a cell 124. Further, it is assumed that relatively fewer wireless terminal devices (e.g., the wireless terminal devices 136 and 137) are present in the cell 122 whereas relatively more wireless terminal devices (e.g., the wireless terminal devices 143 to 147 and 400) are present in the cell 124.

Further, while only the first communication service provider 40 and the second communication service provider 50 are illustrated as communication service providers for ease of the description in FIG. 2, the same applies even to a case in which there are three or more communication service providers. Further, in FIG. 2, while only the base stations 111, 113, 121, and 123 are illustrated as the base stations operated by the respective communication service providers for ease of the description, the same can apply to a case in which there are three or more base stations operated by the respective communication service providers.

The first network control device 110 is a communication control device managed by the first communication service provider 40, which provides the wireless access service, and performs authentication control of wireless terminal devices accessed via the base stations 111 and 113. Further, the first network control device 110 causes the authenticated wireless terminal devices to access the public line network 101 via a gateway (not illustrated).

The second network control device 120 is a communication control device managed by the first communication service provider 40, which provides the wireless access service, and performs authentication control of wireless terminal devices accessed via the base stations 121 and 123. Further, the second network control device 120 causes the authenticated wireless terminal devices to access the public line network 101 via a gateway (not illustrated).

Here, the first network control device 110 authenticates only a wireless terminal device holding USIM information (contract authentication information) except for a specific case among wireless terminal devices accessed via the base stations 111 and 113. Further, similarly, the second network control device 120 authenticates only a wireless terminal device holding effective USIM information (contract authentication information) except for a specific case among wireless terminal devices accessed via the base stations 121 and 123. Further, the specific case is, for example, a case in which an outgoing call is made for an urgent use (e.g., a case in which an outgoing call directed to police, a fire department or the like is made).

The first network control device 110 or the second network control device 120 outputs various pieces of information transmitted from each wireless terminal device via each base station to the information processing device 200, and transmits various pieces of information output from the information processing device 200 to each wireless terminal device via each base station.

The information processing device 200 is an information processing device operated by a service provider mediating the communication service and performs a USIM information exchange process based on information from the first network control device 110 and the second network control device 120. Here, the service provider mediating the communication service is assumed to be a communication service provider providing wireless access service, MVNO (Mobile Virtual Network Operator; a service provider in a business form known as a virtual communication service provider) or the like. Further, the information processing device 200 will be described in detail with reference to FIG. 4.

[Configuration Example of Wireless Terminal Device]

Figure 3:
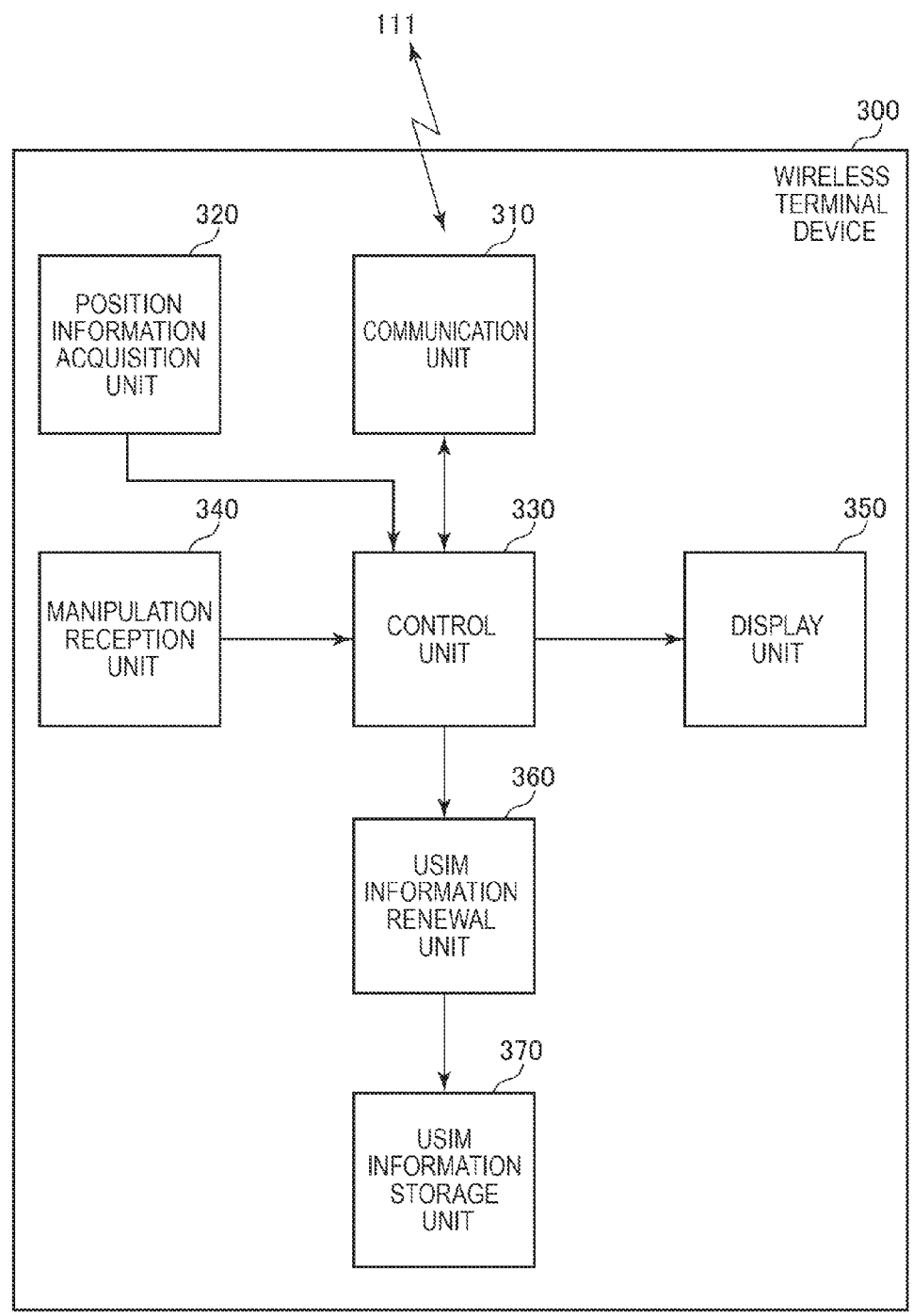
FIG. 3 is a block diagram illustrating a functional configuration example of a first wireless terminal device 300 in the first embodiment of this disclosure.

FIG. 3 is a block diagram illustrating a functional configuration example of the first wireless terminal device 300 in the first embodiment of this disclosure. Further, since functional configurations of the other wireless terminal devices are substantially similar to that of the first wireless terminal device 300, a description thereof will be omitted herein.

The first wireless terminal device 300 includes a communication unit 310, a position information acquisition unit 320, a control unit 330, a manipulation reception unit 340, a display unit 350, a USIM information renewal unit 360, and a USIM information storage unit 370. For example, the first wireless terminal device 300 is realized by a portable telephone device capable of telephone and data communication. Further, an illustration and a description of a microphone, a speaker and the like will be omitted.

The communication unit 310 includes a reception unit that receives a radio signal transmitted from each base station, and a transmission unit that transmits a radio signal to each base station, and is a communication unit corresponding to a plurality of wireless communication services. For example, the communication unit 310 can perform communication according to CDMA (Code Division Multiple Access) or OFDMA (Orthogonal Frequency Division Multiple Access). Further, CDMA means code division multiplex access, and OFDMA means orthogonal frequency division multiplex access.

The position information acquisition unit 320 acquires position information indicating a position in which the first wireless terminal device 300 is present, and outputs this acquired position information to the control unit 330. For example, the position information acquisition unit 320 can be realized by a GPS unit that calculates the position information based on a GPS (Global Positioning System) signal received by a GPS signal receiving antenna. Each piece of data about a position such as latitude, longitude, and altitude at the time of reception of the GPS signal is included in the calculated position information. Further, a position information acquisition device that acquires the position information using another position information acquisition method may be used. For example, a position information acquisition device that derives position information using access point information by a wireless LAN (Local Area Network) present in the vicinity and acquires this position information may be used.

The control unit 330 performs various controls based on a control program stored in a memory (not illustrated). The control unit 330 includes, for example, a microprocessor. For example, the control unit 330 accesses the communication unit 310, and performs transmission and reception of various data, which is performed with the first network control device 110 accessed via the base stations 111 and 113.

The manipulation reception unit 340 is a manipulation reception unit that receives a manipulation input manipulated by a user, and outputs a signal corresponding to the received manipulation input to the control unit 330. The manipulation reception unit 340 includes, for example, various keys such as numeric keys or alphabetic keys.

The display unit 350 is a display unit that displays various pieces of information (letter information, time information or the like) based on control of the control unit 330. For example, the display unit 350 displays each piece of information (e.g., a display screen illustrated in FIG. 10) on a process of transferring a right to use the USIM information. Further, for example, a display panel such as an organic EL (Electro Luminescence) panel or an LCD (Liquid Crystal Display) panel may be used as the display unit 350. Further, the manipulation reception unit 340 and the display unit 350 may be integrally configured using a touch panel that enables a user to perform a manipulation input by touching or approaching a display surface with his or her finger.

The USIM information renewal unit 360 performs a renewal process for the USIM information (contract authentication information) held in the USIM information storage unit 370 based on control of the control unit 330. Here, a state in which USIM information related to the first communication service provider 40 is held can be recognized as a state in which it has an access right to access the base stations 111 and 113 related to the first communication service provider 40. For example, transfer of the access right can be performed through a validation process and a nullification process for the USIM information. Further, the transfer of the access right can be performed through a transfer process for the USIM information itself.

The USIM information storage unit 370 is a memory that holds the USIM information (contract authentication information). For example, a UICC (Universal Integrated Circuit) card may be used as the USIM information storage unit 370, or a dedicated memory for securely holding the USIM information may be used. Further, when a UICC card is used as the USIM information storage unit 370, a UICC card in which the USIM information is not written to be fixed but a validation process and a nullification process for the USIM information is allowed is used. In other words, a UICC card allowing the USIM information renewal unit 360 to perform the validation process and the nullification process for the USIM information is used. Further, a UICC card allowing the renewal process for USIM information is used. Further, for the validation process and the nullification process for USIM information, a validation process and a nullification process defined by 3GPP (Third Generation Partnership Project) may be performed. Each process is performed, for example, at a sale shop of portable telephone devices.

[Configuration Example of Information Processing Device]

FIG. 4 is a block diagram illustrating a functional configuration example of the information processing device 200 in the first embodiment of this disclosure.

The information processing device 200 includes a wireless terminal device position acquisition unit 210, a wireless terminal device position holding unit 220, a congestion degree information acquisition unit 230, a congestion degree information holding unit 240, a USIM information exchange candidate extraction unit 250, and a USIM information exchange candidate list holding unit 260. Further, the information processing device 200 includes an access information reception unit 270, a USIM information exchange control unit 280, and a USIM information exchange terminal list holding unit 290.

The wireless terminal device position acquisition unit 210 acquires information (position information) on a position in which each wireless terminal device is present, from the first network control device 110 and the second network control device 120, and holds the acquired position information in the wireless terminal device position holding unit 220. For example, the wireless terminal device position acquisition unit 210 may acquire the position information acquired by the position information acquisition unit 320 included in each wireless terminal device, via the first network control device 110 and the second network control device 120. Further, the wireless terminal device position acquisition unit 210 regularly or irregularly acquires the position information from the first network control device 110 and the second network control device 120 and sequentially updates position information held in the wireless terminal device position holding unit 220.

The wireless terminal device position holding unit 220 holds the position information acquired by the wireless terminal device position acquisition unit 210, and information on the wireless terminal device corresponding to the position information (wireless terminal device information (e.g., terminal identification information and communication service provider identification information)) in association with each other. Further, the wireless terminal device position holding unit 220 supplies the held position information and the held wireless terminal device information to the USIM information exchange candidate extraction unit 250. In other words, the position of each wireless terminal device is managed by the wireless terminal device position holding unit 220. Further, held content of the wireless terminal device position holding unit 220 will be described in detail with reference to FIG. 5.

The congestion degree information acquisition unit 230 acquires information on a congestion degree (congestion degree information) of each of the base stations 111, 113, 121 and 123 from the first network control device 110 and the second network control device 120. Further, the congestion degree information acquisition unit 230 holds the acquired congestion degree information in the congestion degree information holding unit 240. For example, a value calculated based on a relationship between the number of wireless terminal devices that can access one base station and the number of actually accessed wireless terminal devices may be used as the congestion degree information. Further, for example, a value calculated based on a relationship with a total amount of radio resources available to one base station and an amount of actually used radio resources may be used as the congestion degree information. Here, the radio resources mean, for example, the number of orthogonal codes used for multiplex in the case of a CDMA scheme. Here, examples of this number include the number of channelization codes, the number of HS-DSCHs (High-Speed Downlink Shared Channels), power distributed to these codes, and a numerical value obtained from them through calculation. Further, the radio resources mean, for example, the number of subcarriers, power distributed to each subcarrier, and a numerical value obtained from them through calculation in the case of an OFDMA scheme. Further, the congestion degree information acquisition unit 230 regularly or irregularly acquires the congestion degree information from the first network control device 110 and the second network control device 120 according to an operative situation of each base station, and sequentially updates the congestion degree information held in the congestion degree information holding unit 240.

The congestion degree information holding unit 240 holds the congestion degree information acquired by the congestion degree information acquisition unit 230 and information about the base station corresponding to this congestion degree information (base station information (e.g., a cell ID)) in association with each other. Further, the congestion degree information holding unit 240 supplies the held congestion degree information and the held base station information to the USIM information exchange candidate extraction unit 250. Further, the congestion degree information holding unit 240 will be described in detail with reference to FIG. 6.

The USIM information exchange candidate extraction unit 250 extracts a communication service provider that is a USIM information exchange candidate based on the position information held in the wireless terminal device position holding unit 220 and the congestion degree information held in the congestion degree information holding unit 240. Further, the USIM information exchange candidate extraction unit 250 holds a list of extracted communication service providers in the USIM information exchange candidate list holding unit 260. Further, a method of extracting a communication service provider will be described in detail with reference to FIG. 6. Further, the USIM information exchange candidate extraction unit 250 is an example of an extraction unit defined in claims.

The USIM information exchange candidate list holding unit 260 holds the list of communication service providers extracted as the USIM information exchange candidates by the USIM information exchange candidate extraction unit 250, and supplies the held list of communication service providers to the USIM information exchange control unit 280.

The access information reception unit 270 receives access information (e.g., an access request) transmitted from each wireless terminal device via the first network control device 110 and the second network control device 120. Further, when the access information is received, the access information reception unit 270 outputs the access information to the USIM information exchange control unit 280.

When access information related to the access request is output from the access information reception unit 270, the USIM information exchange control unit 280 performs a USIM information exchange process on the wireless terminal device having transmitted the access request. Further, the USIM information exchange control unit 280 holds information on two wireless terminal devices for which the USIM information exchange process has been performed, in the USIM information exchange terminal list holding unit 290. Further, when access information related to an end request is output from the access information reception unit 270, the USIM information exchange control unit 280 performs a USIM information restoration process for the wireless terminal device having transmitted the end request. Further, the USIM information exchange control unit 280 is an example of a control unit defined in claims.

The USIM information exchange terminal list holding unit 290 holds the information (USIM information exchange terminal list) about two wireless terminal devices for which the USIM information exchange process has been performed by the USIM information exchange control unit 280. Further, the USIM information exchange terminal list holding unit 290 supplies the held information to the USIM information exchange control unit 280.

[Content Example of Wireless Terminal Device Position Holding Unit]

FIG. 5 is a diagram schematically illustrating an example of the held content of the wireless terminal device position holding unit 220 in the first embodiment of this disclosure.

The wireless terminal device position holding unit 220 is a holding unit that holds the information (position information) on the position in which each wireless terminal device is present. Specifically, terminal identification information 221, position information 222, and communication service provider identification information 223 are held in the wireless terminal device position holding unit 220 in association with one another.

The terminal identification information 221 is identification information for identifying a wireless terminal device.

The position information 222 is information on the position in which each wireless terminal device is present. For example, a latitude and a longitude corresponding to the position in which each wireless terminal device is present are stored as the position information 222.

The communication service provider identification information 223 is identification information for identifying a radio service provider that provides wireless access service. In other words, identification information of a communication service provider related to the USIM information (USIM information before exchange) held in the wireless terminal device is stored in the communication service provider identification information 223.

[Content Example of Congestion Degree Information Holding Unit]

FIG. 6 is a diagram schematically illustrating an example of the held content of the congestion degree information holding unit 240 in the first embodiment of this disclosure.

The congestion degree information holding unit 240 is a holding unit that holds information on the congestion degree of each base station (congestion degree information). Specifically, a cell ID 241, position information 242, and congestion degree information 243 are held in the congestion degree information holding unit 240 in association with one another for each communication service provider.

The cell ID 241 is identification information for identifying a base station (cell) operated by the communication service provider.

The position information 242 is information on a position in which the base station operated by the communication service provider is present. For example, a latitude and a longitude corresponding to the position in which each base station is present are stored as the position information 242. Further, in FIG. 6, a virtual numerical value is illustrated as the position information 242.

The congestion degree information 243 is information on the congestion degree of the base station operated by the communication service provider. For example, a value of 0 to 1 is stored as the congestion degree information 243. In FIG. 6, a congestion degree of value "1" of the congestion degree information 243 is highest (i.e., congested) and a congestion degree of "0" is lowest (i.e., not congested).

Further, in FIG. 6, each piece of information on each of base stations in which the cell of the base station operated by the first communication service provider 40 and the cell of the base station operated by the second communication service provider 50 overlap is arranged and shown in the same line. For example, each piece of information surrounded by a dotted rectangle 244 is assumed to be information on each of base stations in which the cell of the base station operated by the first communication service provider 40 and the cell of the base station operated by the second communication service provider 50 overlap.

Further, in this example, while the example in which the congestion degree is held in the congestion degree information holding unit 240 is shown, history information of a communication rate related to the congestion degree may be held as the congestion degree information. In this case, when a USIM information exchange candidate is extracted, the history information of the communication rate may be used as the congestion degree information instead of using the congestion degree.

[Content Example of USIM Information Exchange Candidate List Holding Unit]

FIG. 7 is a diagram schematically illustrating an example of held content of the USIM information exchange candidate list holding unit 260 in the first embodiment of this disclosure.

The USIM information exchange candidate list holding unit 260 is a holding unit that holds a list of wireless terminal devices extracted as the USIM information exchange candidates. Specifically, terminal identification information 261, communication service provider identification information 262, and USIM information exchange candidate information 263 are held in the USIM information exchange candidate list holding unit 260 in association with one another.

The terminal identification information 261 is identification information for identifying a wireless terminal device. For example, terminal identification information corresponding to the terminal identification information 221 illustrated in FIG. 5 is stored.

The communication service provider identification information 262 is identification information for identifying a radio service provider, which provides the wireless access service. For example, communication service provider identification information corresponding to the communication service provider identification information 223 illustrated in FIG. 5 is stored.

The USIM information exchange candidate information 263 is identification information for identifying a communication service provider extracted as the USIM information exchange candidate.

[USIM Information Exchange Candidate Extraction Example]

Next, a USIM information exchange candidate extracting method of extracting a wireless terminal device that is a USIM information exchange candidate will be described with reference to FIGS. 6 and 7. Here, an example in which the USIM information exchange candidate extraction unit 250 extracts a communication service provider that is a USIM information exchange candidate based on the position information held in the wireless terminal device position holding unit 220 and the congestion degree information held in the congestion degree information holding unit 240 is shown.

For example, a case in which the first wireless terminal device 300 in a contract with the first communication service provider 40 is within the coverage of the cell ID 241 "607402b" surrounded by the dotted rectangle 244 as illustrated in FIG. 6 is assumed. In this case, it is assumed that it is difficult to expect high rate communication service since the congestion degree information 243 "0.777" of the base station corresponding to the cell ID 241 "607402b" is relatively high.

On the other hand, a base station of the second communication service provider 50 corresponding to cell ID 241 "607402b" of the first communication service provider 40 is a base station corresponding to cell ID 241 "9f7013b") surrounded by the dotted rectangle 244. The congestion degree information 243 "0.227" of this base station is relatively lower than the congestion degree information 243 "0.777" of the base station of the first communication service provider 40. Accordingly, the cell of the base station of the second communication service provider 50 corresponding to cell ID 241 "607402b" of the first communication service provider 40 is in a situation with low congestion.

In this case, the USIM information exchange candidate extraction unit 250 identifies the second communication service provider 50 as the USIM information exchange candidate for the first wireless terminal device 300 in a contract with the first communication service provider 40. For example, "#102 (the second communication service provider)" is stored in the USIM information exchange candidate information 263 as the USIM information exchange candidate for "#1 (the first wireless terminal device)" of the terminal identification information 261, as illustrated in FIG. 7.

Further, for example, a case in which the second wireless terminal device 400 in a contract with the second communication service provider 50 is present within the coverage of cell ID 241 "9d1016b" surrounded by a dotted rectangle 245, as illustrated in FIG. 6, is assumed. In this case, it is assumed that it is difficult to expect high rate communication service since the congestion degree information 243 "0.519" of the base station corresponding to cell ID 241 "9d1016b" is relatively high.

On the other hand, a base station of the first communication service provider 40 corresponding to cell ID 241 "9d1016b" of the second communication service provider 50 is a base station corresponding to cell ID 241 "5f24018") surrounded by the dotted rectangle 245. The congestion degree information 243 "0.298" of this base station is relatively lower than the congestion degree information 243 "0.519" of the base station of the second communication service provider 50. Accordingly, the cell of the base station of the first communication service provider 40 corresponding to cell ID 241

"9d1016b" of the second communication service provider 50 is in a situation with low congestion.

In this case, the USIM information exchange candidate extraction unit 250 identifies the first communication service provider 40 as a USIM information exchange candidate for the second wireless terminal device 400 in a contract with the second communication service provider 50. For example, "#101 (the first communication service provider)" is stored in the USIM information exchange candidate information 263 as the USIM information exchange candidate for "#2 (the second wireless terminal device)" of the terminal identification information 261, as illustrated in FIG. 7.

Thus, the first wireless terminal device 300 and the second wireless terminal device 400 have a complementary relationship. For example, when access information related to an access request is transmitted from the first wireless terminal device 300 or the second wireless terminal device 400, the USIM information exchange control unit 280 performs the USIM information exchange process for each of the first wireless terminal device 300 and the second wireless terminal device 400. Through this USIM information exchange process, the USIM information renewal unit 360 of each of the first wireless terminal device 300 and the second wireless terminal device 400 performs the USIM information renewal. Thus, when the USIM information exchange process is performed in the USIM information exchange control unit 280, the information on the two wireless terminal devices related to the USIM information exchange process is held in the USIM information exchange terminal list holding unit 290. This held content is illustrated in FIG. 8.

[Content Example of USIM Information Exchange Terminal List Holding Unit]

FIG. 8 is a diagram schematically illustrating an example of held content of the USIM information exchange terminal list holding unit 290 in the first embodiment of this disclosure.

The USIM information exchange terminal list holding unit 290 is a holding unit that holds a list of wireless terminal devices among which the USIM information has been exchanged. Specifically, identification information 291 for a terminal under USIM information exchange and identification information 292 for a communication service provider that the terminal under USIM information exchange can access are held in the USIM information exchange terminal list holding unit 290 in association with each other.

The identification information 291 for a terminal under USIM information exchange is identification information for identifying two wireless terminal devices between which the USIM information has been exchanged. For example, the terminal identification information stored in the terminal identification information 221 illustrated in FIG. 5 is stored.

The identification information 292 for a communication service provider that the terminal under USIM information exchange can access is information identifying a communication service provider that each of the two wireless terminal devices between which the USIM information has been exchanged can access, after the exchange. For example, communication service provider identification information stored in the communication service provider identification information 223 illustrated in FIG. 5 is stored.

[Operation Example of Information Processing Device]

Next, operation of the information processing device 200 in the first embodiment of this disclosure will be described with reference to drawings.

Figure 9:
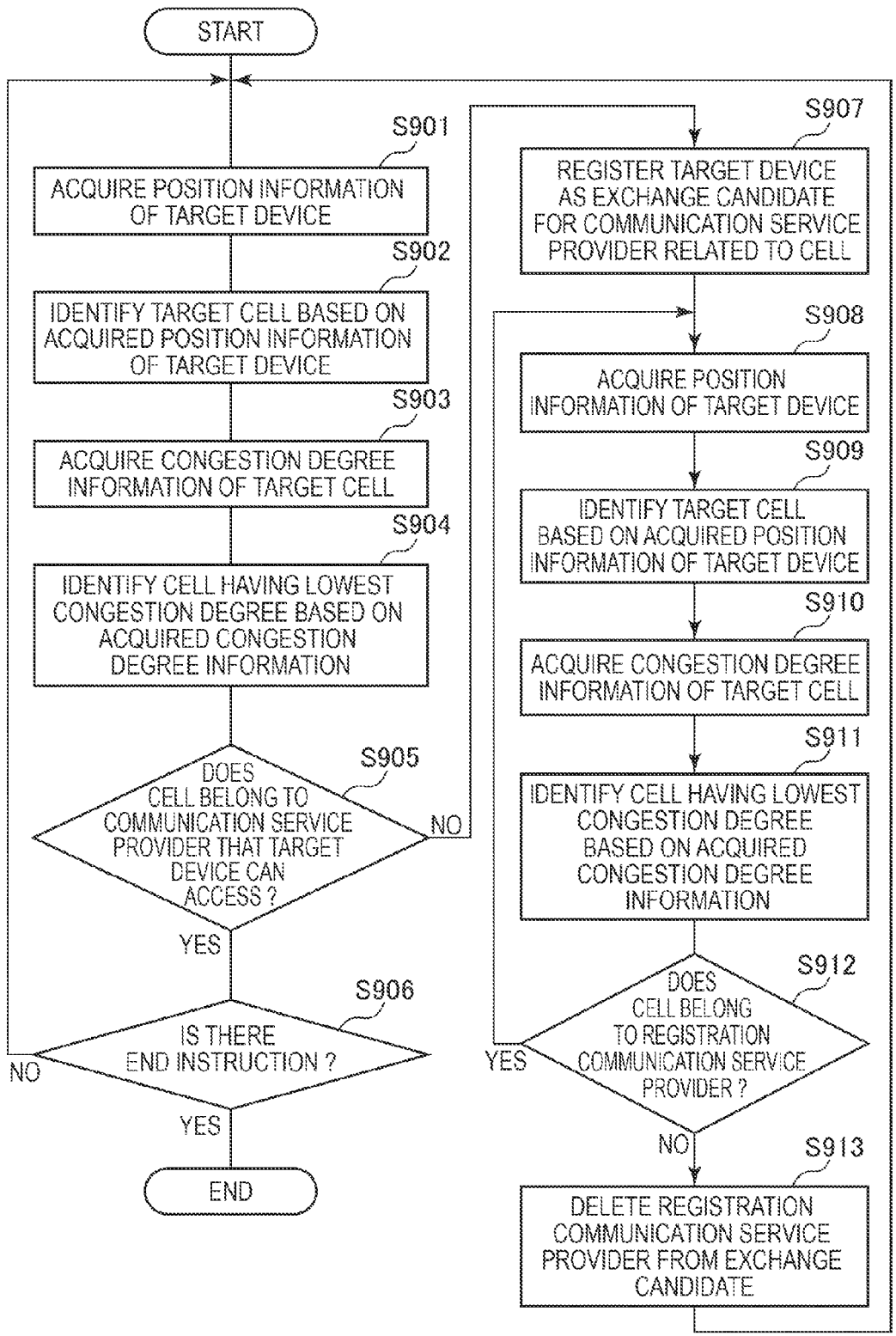
FIG. 9 is a flowchart illustrating an example of a processing procedure of a USIM information exchange candidate extraction control process in a USIM information exchange candidate extraction unit 250 in the first embodiment of this disclosure.

FIG. 9 is a flowchart illustrating an example of a processing procedure of a USIM information exchange candidate extraction control process in the USIM information exchange candidate extraction unit 250 in the first embodiment of this disclosure.

First, the position information 222 of the wireless terminal device (a target device), which is a target, and the communication service provider identification information 223 (illustrated in FIG. 5) are acquired from the wireless terminal device position holding unit 220 (step S901).

A cell (a target cell) corresponding to the position in which the target device is present is then identified based on the acquired position information and communication service provider identification information (step S902). For example, a communication service provider (a target communication service provider) related to the USIM information held by the target device is identified based on the acquired communication service provider identification information. Further, based on the acquired position information, the base station corresponding to the position in which the target device is present is extracted from the plurality of the base stations operated by the target communication service provider. Further, the cell ID 241 (illustrated in FIG. 6) of the cell (a target cell) corresponding to the extracted base station is identified.

The congestion degree information 243 (illustrated in FIG. 6) corresponding to the target cell is then acquired (step S903). In this case, the congestion degree information 243 related to each communication service provider corresponding to the target cell is acquired. Based on the acquired congestion degree information, a cell having the lowest congestion degree is then identified from among the cells of the target communication service provider and other communication service providers (step S904).

It is then determined whether the identified cell is the cell of the target communication service provider (the communication service provider that the target device can access) (step S905). When the identified cell is the cell of the target communication service provider (step S905), it is determined whether an end instruction has been performed (step S906). Further, when the end instruction is not performed (step S906), the process returns to step S901, and when the end instruction is performed, the operation of the USIM information exchange candidate extraction control process ends.

Further, when the identified cell is not the cell of the target communication service provider (step S905), a communication service provider related to the identified cell is registered in the USIM information exchange candidate list holding unit 260 as the USIM information exchange candidate for the target device (step S907).

Further, since steps S908 to S911 are a processing procedure corresponding to step S901 to S904, a description thereof will be omitted herein.

It is then determined whether the identified cell is the cell of the communication service provider (registration communication service provider) registered in the USIM information exchange candidate list holding unit 260 as the USIM information exchange candidate of the target device (step S912). When the identified cell is the cell of the registration communication service provider (step S912), the process returns to step S908. On the other hand, when the identified cell is not the cell of the registration communication service provider (step S912), the registration communication service provider registered in the USIM information exchange candidate list holding unit 260 as the USIM information exchange candidate of the target device is deleted (step S913). Further, the process returns to step S901.

Thus, in this example, the congestion degree of the base station related to the first communication service provider corresponding to the position in which the target device is present is compared with a congestion degree of each base station related to one or a plurality of communication service providers other than the first communication service provider corresponding to the position in which the target device is present. Further, a communication service provider other than the first communication service provider is extracted as the USIM information exchange candidate based on a comparison result. In this case, a communication service provider related to the base station whose congestion degree is lower than the congestion degree of the base station related to the first communication service provider corresponding to the position in which the target device is present may be extracted as the USIM information exchange candidate. Further, the congestion degree of the base station related to the first communication service provider corresponding to the position in which the target device is present is compared with a congestion degree of each base station related to one or a plurality of communication service providers corresponding to the position in which the target device is present. Further, a communication service provider related to the base station having the lowest congestion degree can be extracted as the USIM information exchange candidate. Further, the target device has a first access right (an access right based on the USIM information) to access the base station related to the first communication service provider. Further, steps S901 to S913 are an example of an extraction procedure of claims.

Further, in this example, while the example in which one communication service provider is registered as the USIM information exchange candidate for one wireless terminal device has been shown, for example, a plurality of communication service providers may be registered as USIM information exchange candidates for one wireless terminal device. For example, a case in which there are three or more communication service providers operating base stations corresponding to cells including the position in which the target device is present is assumed. In this case, for example, when the congestion degree of the target cell is the highest and congestion degrees of other cells (two or more cells) are below a certain value, a plurality of communication service providers corresponding to a plurality of cells whose congestion degree is below the certain value can be registered as the USIM information exchange candidates.

[Communication Example Between Respective Devices]

FIG. 10 is a diagram illustrating an example of a display screen displayed on the second wireless terminal device 400 in the first embodiment of this disclosure. This display screen will be described in detail with reference to sequence charts illustrated in FIGS. 11 and 12.

Figure 11:
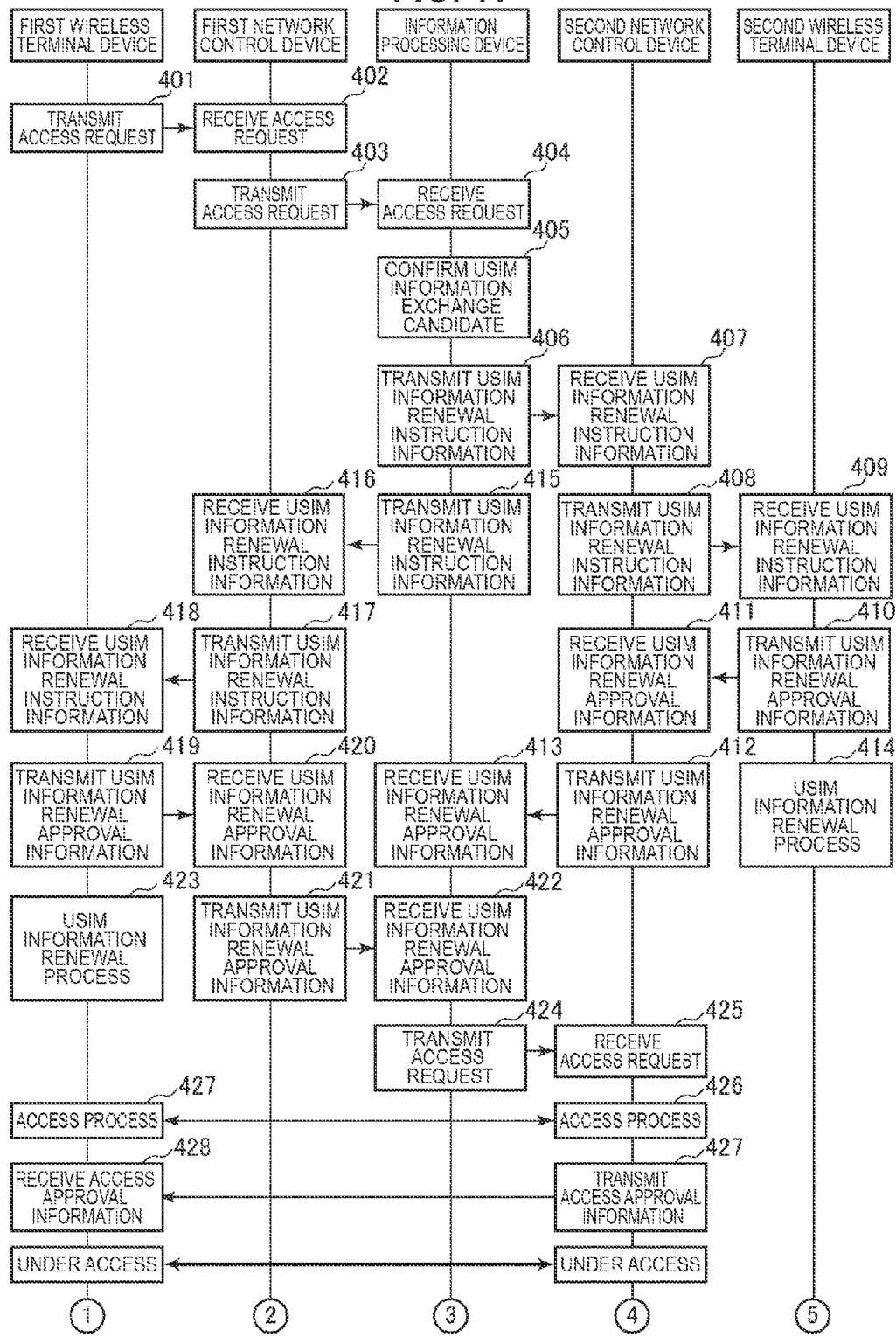
FIG. 11 is a sequence chart illustrating an example of a communication process between respective devices constituting the communication system 100 in the first embodiment of this disclosure.
Figure 12:
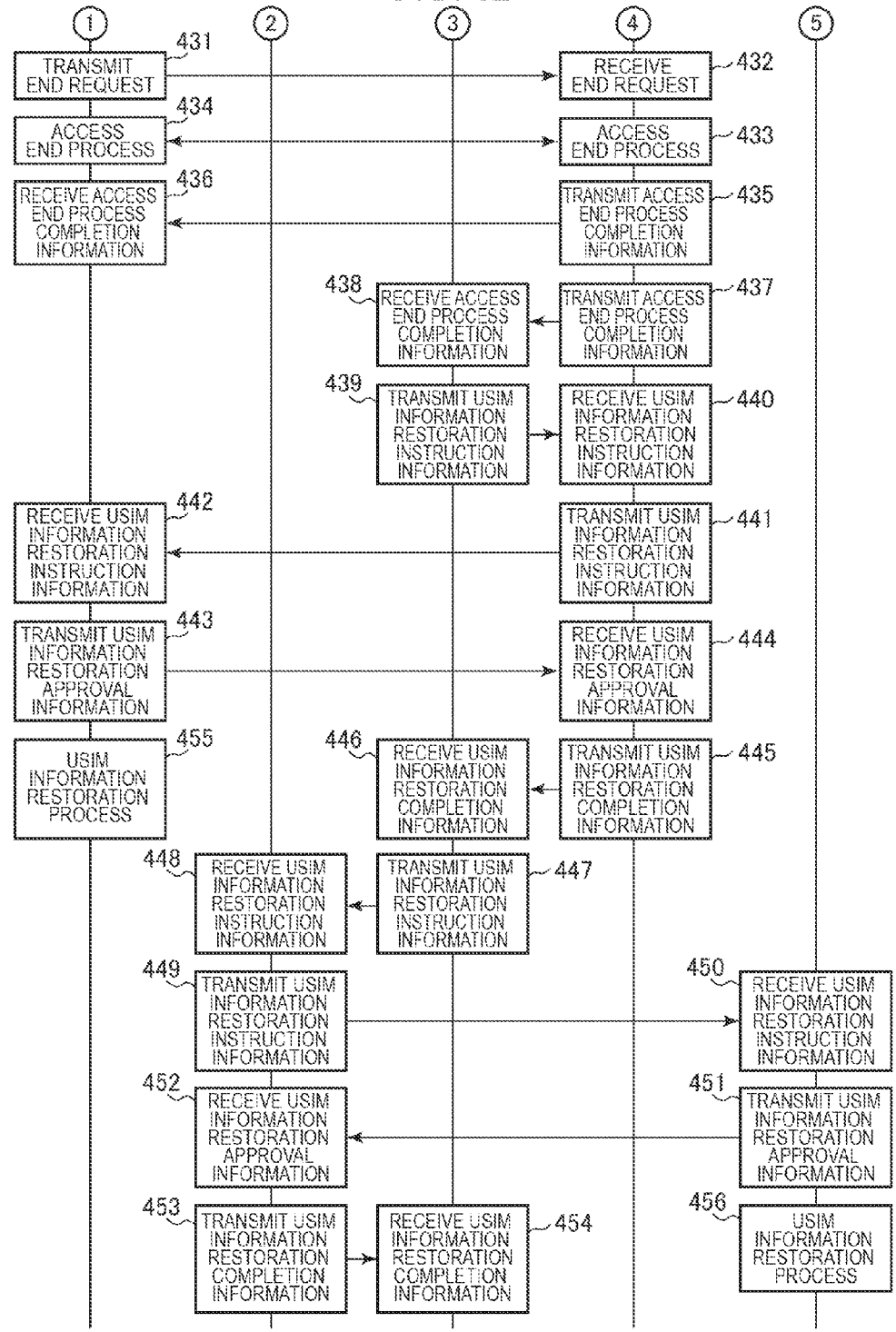
FIG. 12 is a sequence chart illustrating an example of a communication process between respective devices constituting the communication system 100 in the first embodiment of this disclosure.

FIGS. 11 and 12 are sequence charts illustrating an example of a communication process between respective devices constituting the communication system 100 in the first embodiment of this disclosure. Further, in FIGS. 11 and 12, while only an example of the communication process between the first wireless terminal device 300 and the second wireless terminal device 400 is illustrated, the same may apply to a communication process between other wireless terminal devices. For exchange of the USIM information, only a wireless terminal device in a contract with a service provider related to the information processing device 200 may be a target or all wireless terminal devices may be targets.

In FIGS. 11 and 12, an example in which the USIM information is exchanged when the first wireless terminal device 300 holds USIM information related to the first communication service provider 40 and the second wireless terminal device 400 holds USIM information related to the second communication service provider 50 is illustrated. Further, in FIGS. 11 and 12, a communication process when the USIM information held in the first wireless terminal device 300 and the USIM information held in the second wireless terminal device 400 are exchanged in response to an access request from the first wireless terminal device 300 will be described by way of example. Here, the access request means, for example, an access request for performing access to wireless access service or a telephone call.

First, a user manipulation to make an access request for access to the first communication service provider 40 is performed in the first wireless terminal device 300, which holds the USIM information related to the first communication service provider 40. When this user manipulation is performed, an access request for access of the first wireless terminal device 300 to the first communication service provider 40 is transmitted from the first wireless terminal device 300 to the information processing device 200 via the first network control device 110 (401-404).

When the access request is received from the first wireless terminal device 300 (404), the information processing device 200 confirms the USIM information exchange candidate for the first wireless terminal device 300 having transmitted the access request (405). In other words, when the access information reception unit 270 receives the access request from the first wireless terminal device 300, the access information reception unit 270 outputs the access request to the USIM information exchange control unit 280. The USIM information exchange control unit 280 then acquires the USIM information exchange candidate list held in the USIM information exchange candidate list holding unit 260. The USIM information exchange control unit 280 then determines whether there is the USIM information exchange candidate for the first wireless terminal device 300 having transmitted the access request with reference to the acquired USIM information exchange candidate list. Here, a case in which there is no USIM information exchange candidate for the first wireless terminal device 300 is assumed. In this case, the USIM information exchange control unit 280 transmits the access request to the first network control device 110 operated by the first communication service provider 40 to cause the first wireless terminal device 300 and the first network control device 110 to access each other.

Further, when there is the USIM information exchange candidate for the first wireless terminal device 300, the USIM information exchange control unit 280 performs a USIM information exchange process between a wireless terminal device related to the USIM information exchange candidate and the first wireless terminal device 300 (406-422).

Specifically, the USIM information exchange control unit 280 extracts a wireless terminal device (the second wireless terminal device 400) having a complementary relationship with the first wireless terminal device 300 based on the USIM information exchange candidate list of the USIM information exchange candidate list holding unit 260. The USIM information exchange control unit 280 then transmits the USIM information renewal instruction information to the USIM information exchange candidate (the second wireless terminal device 400) via the second network control device 120 (406-409). Information for renewing the USIM information stored in the USIM information storage unit 370 of the second wireless terminal device 400 with the USIM information related to the first communication service provider 40 is included in this USIM information renewal instruction information.

Further, when the second wireless terminal device 400 receives the USIM information renewal instruction information (409), USIM information renewal approval information indicating approval of the renewal of the USIM information is transmitted from the second wireless terminal device 400 to the information processing device 200 (410-413). In other words, the control unit 330 of the second wireless terminal device 400 transmits the USIM information renewal approval information to the information processing device 200 via the second network control device 120 (410-413).

Further, the USIM information renewal unit 360 of the second wireless terminal device 400 renews the USIM information stored in the USIM information storage unit 370 based on the received USIM information renewal instruction information (414). In other words, renewal from the USIM information related to the second communication service provider 50 to the USIM information related to the first communication service provider 40 is performed. Through this renewal process, the second wireless terminal device 400 becomes accessible to the first communication service provider 40 (the first network control device 110).

In FIG. 10, an example of a display screen displayed on the display unit 350 of the second wireless terminal device 400 after the USIM information exchange process is performed is illustrated. The display screen illustrated in FIG. 10 is a display screen for displaying the fact that the USIM information exchange process has been performed to allow a user to confirm the USIM information exchange. Specifically, the fact that the USIM information exchange process has been performed, and information on a communication service provider (e.g., a communication service provider name, an expected communication rate, and a communication unit price) to which access can be made after the exchange process are displayed on the display screen illustrated in FIG. 10.

Thus, it is possible for a user owning the wireless terminal device of the exchange partner to easily recognize that the USIM information exchange process has been performed by displaying the fact that the USIM information exchange process has been performed after the USIM information exchange process is performed.

Further, the USIM information exchange control unit 280 transmits USIM information renewal instruction information to the first wireless terminal device 300 via the first network control device 110 (415-418). Information for renewing the USIM information stored in the USIM information storage unit 370 of the first wireless terminal device 300 with the USIM information related to the second communication service provider 50 is included in this USIM information renewal instruction information.

Further, when the first wireless terminal device 300 receives the USIM information renewal instruction information (418), USIM information renewal approval information indicating approval of the renewal of the USIM information is transmitted from the first wireless terminal device 300 to the information processing device 200 (419-422). In other words, the control unit 330 of the first wireless terminal device 300 transmits the USIM information renewal approval information to the information processing device 200 via the first network control device 110 (419-422).

Further, the USIM information renewal unit 360 of the first wireless terminal device 300 renews the USIM information stored in the USIM information storage unit 370 based on the received USIM information renewal instruction information (423). In other words, renewal from the USIM information related to the first communication service provider 40 to the USIM information related to the second communication service provider 50 is performed. Through this renewal process, the first wireless terminal device 300 becomes able to access the second communication service provider 50 (the second network control device 120).

When the USIM information renewal approval information is received from the first wireless terminal device 300 and the second wireless terminal device 400 (413 and 422), the USIM information exchange control unit 280 records the information on each terminal in the USIM information exchange terminal list holding unit 290. Further, when the USIM information renewal approval information is received from the first wireless terminal device 300 and the second wireless terminal device 400 (413 and 422), the USIM information exchange control unit 280 transmits the access request to the second network control device 120 (424 and 425). This access request is an access request from the first wireless terminal device 300.

Upon receiving the access request (425), the second network control device 120 performs an access process with the second wireless terminal device 400 (426 and 427). The second network control device 120 then transmits access approval information to the first wireless terminal device 300 (427 and 428). Upon receiving the access approval information (428), the first wireless terminal device 300 becomes able to communicate with the second network control device 120. Accordingly, the user 20 can receive provision of desired service (e.g., video service) via the second network control device 120 using first wireless terminal device 300.

Further, when a communication process between the first wireless terminal device 300 and the second network control device 120 ends, an end request is transmitted from the first wireless terminal device 300 to the second network control device 120 (431 and 432). When receiving the end request (431), the second network control device 120 performs an access end process (433 and 434). The second network control device 120 then transmits access end process completion information to the first wireless terminal device 300 (435 and 436). Accordingly, the communication between the first wireless terminal device 300 and the second network control device 120 is completed.

The second network control device 120 then transmits access end process completion information to the information processing device 200 (437 and 438).

The USIM information exchange control unit 280 then transmits USIM information restoration instruction information to the first wireless terminal device 300 via the second network control device 120 (439-442). Information for renewing the USIM information stored in the USIM information storage unit 370 of the first wireless terminal device 300 with the USIM information related to the first communication service provider 40 is included in this USIM information restoration instruction information.

Further, when the first wireless terminal device 300 receives the USIM information restoration instruction information (442), USIM information restoration approval information indicating approval of the restoration of the USIM information is transmitted from the first wireless terminal device 300 to the information processing device 200 (443-446). In other words, the control unit 330 of the first wireless terminal device 300 transmits the USIM information restoration approval information to the information processing device 200 via the second network control device 120 (443-446).

Further, the USIM information renewal unit 360 of the first wireless terminal device 300 renews the USIM information stored in the USIM information storage unit 370 based on the received USIM information restoration instruction information (455). In other words, renewal from the USIM information related to the second communication service provider 50 to the USIM information related to the first communication service provider 40 is performed. Though this restoration process, the first wireless terminal device 300 becomes able to access the first communication service provider 40 (the first network control device 110).

Further, the USIM information exchange control unit 280 transmits USIM information restoration instruction information to the second wireless terminal device 400 via the first network control device 110 (447-450). Information for renewing the USIM information stored in the USIM information storage unit 370 of the second wireless terminal device 400 with the USIM information related to the second communication service provider 50 is included in this USIM information restoration instruction information.

Further, when the second wireless terminal device 400 receives the USIM information restoration instruction information (450), USIM information restoration approval information indicating approval of the restoration of the USIM information is transmitted from second wireless terminal device 400 to the information processing device 200 (451-454). In other words, the control unit 330 of the second wireless terminal device 400 transmits the USIM information restoration approval information to the information processing device 200 via the first network control device 110 (451-454).

Further, the USIM information renewal unit 360 of the second wireless terminal device 400 renews the USIM information stored in the USIM information storage unit 370 based on the received USIM information restoration instruction information (456). In other words, renewal from the USIM information related to the first communication service provider 40 to the USIM information related to the second communication service provider 50 is performed. Through this restoration process, the second wireless terminal device 400 becomes able to access the second communication service provider 50 (the second network control device 120).

Here, in current portable telephone service, a user makes a contract with each communication service provider, and basically, only use of a portable telephone network of the communication service provider with which the contract has been made is permitted. Further, contracts with a plurality of communication service providers are made, a plurality of pieces of USIM information are inserted into one terminal, and a user changes and uses the USIM information according to regions. For example, access to communication service of any communication service provider is attempted, and when a sufficient rate is detected not to be obtainable, access to communication service of another communication service provider is attempted. However, even when the communication service of the other communication service provider has been used, improvement of the communication rate is not guaranteed.

In contrast, in the first embodiment of this disclosure, it is possible to provide communication service most suitable in the region without performing useless communication. In other words, when the congestion degrees of base stations of respective service providers in the same region are different, each user can easily use the base station having a low congestion degree by the information processing device 200 mediating the exchange of the USIM information. In other words, it is possible to provide appropriate wireless access service.

Further, according to the first embodiment of this disclosure, it is possible to easily exchange the access rights of the base stations (the access rights based on the USIM information) without increasing a total number of wireless terminal devices that can use the base stations of the respective service providers. Further, since the exchange of the access rights of the base stations is performed according to the congestion degree, the user can use the base station having low congestion degree with high probability. In other words, since the USIM information exchange candidate for the base station having the lowest congestion degree is detected from among all base stations within the coverage with the perspective of reception power, great enhancement of a communication environment by USIM information trade can be expected.

Further, when the use of desired communication service ends after the USIM information exchange process has been performed, it is possible to easily restore the USIM information before the exchange.

[Operation Example of Information Processing Device]

Next, an operation of the information processing device 200 in the first embodiment of this disclosure will be described with reference to drawings.

Figure 13:
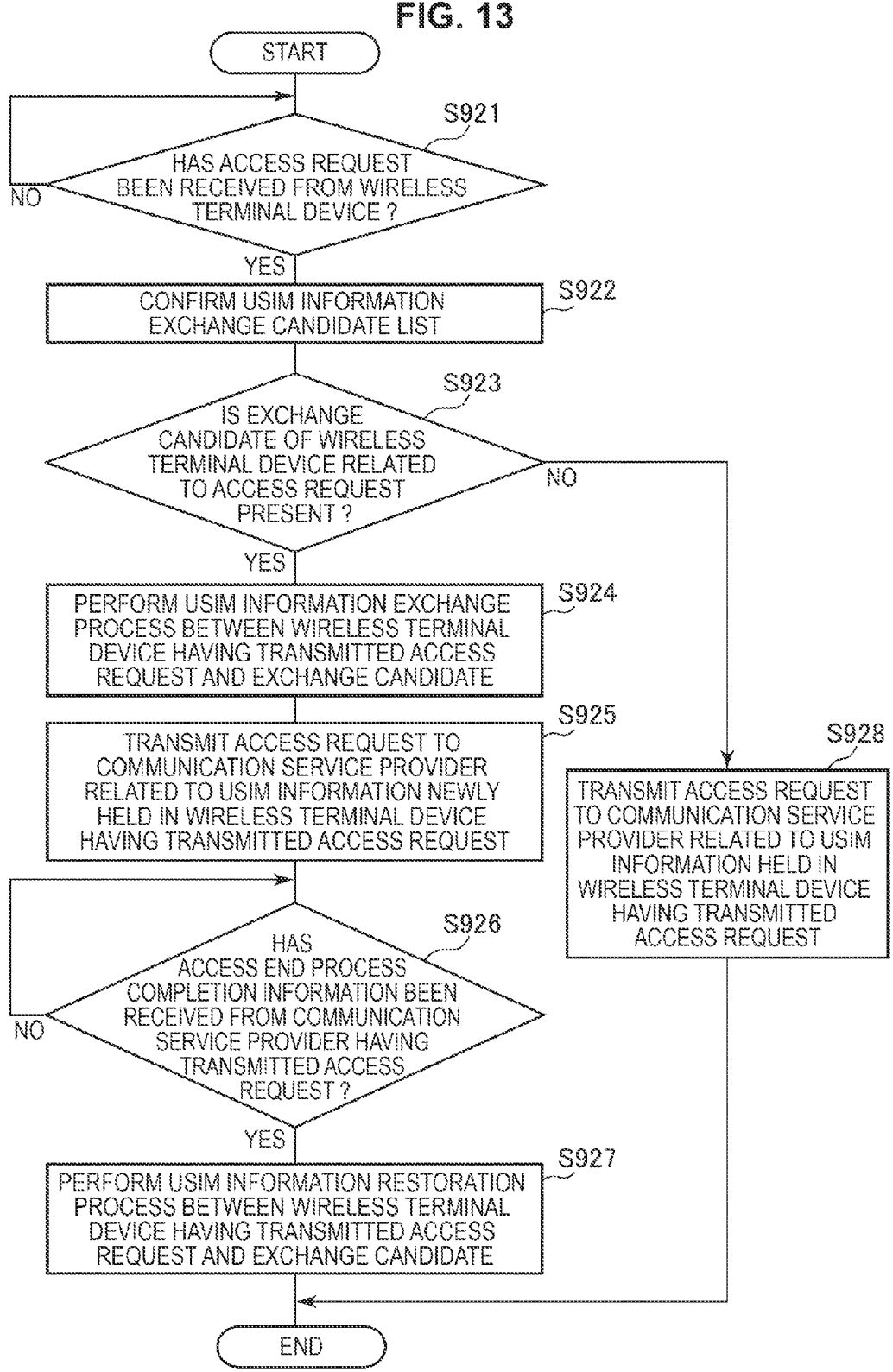
FIG. 13 is a flowchart illustrating an example of a processing procedure of a USIM information exchange control process in the information processing device 200 in the first embodiment of this disclosure.

FIG. 13 is a flowchart illustrating an example of a processing procedure of the USIM information exchange control process in the information processing device 200 in the first embodiment of this disclosure.

First, it is determined whether an access information reception unit 270 has received an access request transmitted from the wireless terminal device via the network control device (step S921). When the access request has not been received from the wireless terminal device, monitoring is continued.

When the access request from the wireless terminal device has been received (step S921), the USIM information exchange control unit 280 confirms the USIM information exchange candidate list of the USIM information exchange candidate list holding unit 260 (step S922). Further, the USIM information exchange control unit 280 determines whether a USIM information exchange candidate is present for the wireless terminal device having transmitted the access request (step S923). In other words, it is determined whether the USIM information exchange candidate (communication service provider) is present for the wireless terminal device having transmitted the access request with reference to the USIM information exchange candidate list holding unit 260 illustrated in FIG. 7.

When the USIM information exchange candidate is present for the wireless terminal device having transmitted the access request (step S923), the USIM information exchange control unit 280 performs a USIM information exchange process (step S924). In other words, between the wireless terminal device having transmitted the access request and a wireless terminal device (a terminal that can access a radio service provider of the USIM information exchange candidate) having a complementary relationship with the wireless terminal device having transmitted the access request, an exchange process of exchanging the USIM information held in the two wireless terminal devices is performed. When this exchange process ends, the two wireless terminal devices related to this exchange process are recorded in the USIM information exchange terminal list holding unit 290 as the USIM information exchange terminals.

The USIM information exchange control unit 280 then transmits the access request to the communication service provider related to the USIM information (USIM information renewed through the exchange process) newly held in the wireless terminal device having transmitted the access request (step S925). Accordingly, an access process is performed between the wireless terminal device having transmitted the access request and the communication service provider (the network control device) related to the USIM information renewed through the exchange process. Further, the wireless terminal device having transmitted the access request becomes able to communicate with the communication service provider (network control device) related to the USIM information renewed through the exchange process. Accordingly, a user can receive provision of desired service (e.g., video service) via the network control device related to the USIM information using the USIM information renewed through the exchange process.

The USIM information exchange control unit 280 then determines whether access end process completion information has been received from the communication service provider (network control device) having transmitted the access request (step S926). When the access end process completion information has not received, monitoring continues to be performed. Further, when the access end process completion information has been received from the communication service provider (network control device) having transmitted the access request (step S926), the USIM information exchange control unit 280 performs USIM information restoration (step S927). In other words, a restoration process of restoring the exchanged USIM information is performed between the two wireless terminal devices (the wireless terminal device having transmitted the access request and the wireless terminal device of the exchange partner) recorded in the USIM information exchange terminal list holding unit 290. When this restoration process has ended, the two wireless terminal devices related to the restoration process are deleted from the USIM information exchange terminal list holding unit 290. Accordingly, the two wireless terminal devices related to the restoration process become able to communicate with the communication service provider (the network control device) with which the contract has been made.

Further, when the USIM information exchange candidate is not present (step S923), the USIM information exchange control unit 280 transmits the access request to the communication service provider related to the USIM information held in the wireless terminal device having transmitted the access request (step S928). Accordingly, the access process is performed between the wireless terminal device having transmitted the access request and the communication service provider (network control device) related to the USIM information held in the wireless terminal device. Further, the wireless terminal device having transmitted the access request becomes able to communicate with the communication service provider (the network control device) with which the contract has been made.

Thus, in this example, the first access right is transferred from the first wireless terminal device to the second wireless terminal device having the second access right to access the base station related to the communication service provider extracted as the USIM information exchange candidate (the access right based on the USIM information). With this transfer, the second access right (the access right based on the USIM information) is transferred from the second wireless terminal device to the first wireless terminal device (an exchange control procedure). For example, when the access request to access the base station related to the first communication service provider based on the first access right is transmitted from the first wireless terminal device, the transfer is performed and then the base station related to the second communication service provider is accessed by the first wireless terminal device based on the second access right. Further, when the use of the wireless communication service based on the access request ends, the second access right is transferred from the first wireless terminal device to the second wireless terminal device. With this transfer, the first access right is transferred from the second wireless terminal device to the first wireless terminal device (a restoration control procedure). Further, steps S921 to S925 are an example of an exchange control procedure defined in claims. Further, steps S926 and S927 are an example of a restoration control procedure defined in claims.

[Operation Example at the Time of Handover]

Next, an operation of the information processing device 200 when a wireless terminal device accessed the communication service provider is handed over will be described with reference to drawing.

Figure 14:
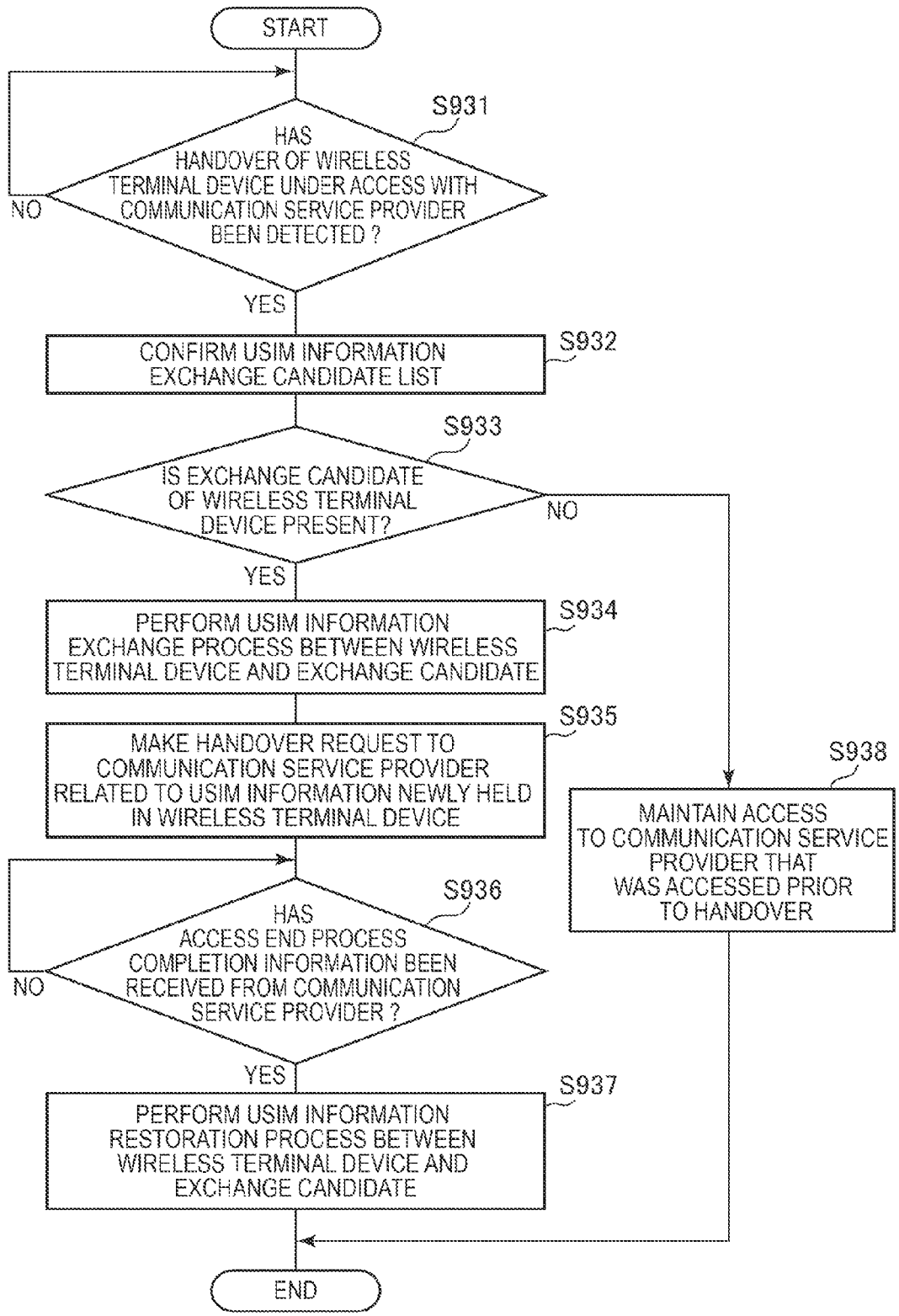
FIG. 14 is a flowchart illustrating an example of a processing procedure of the USIM information exchange control process in the information processing device 200 in the first embodiment of this disclosure.

FIG. 14 is a flowchart illustrating an example of a processing procedure of the USIM information exchange control process in the information processing device 200 in the first embodiment of this disclosure.

First, it is determined whether handover during access to the communication service provider (network control device) has been detected (step S931), and when the handover has not been detected, monitoring continues to be performed.

When the handover has been detected (step S931), the USIM information exchange control unit 280 confirms the USIM information exchange candidate list of the USIM information exchange candidate list holding unit 260 (step S932). Further, the USIM information exchange control unit 280 determines whether the USIM information exchange candidate is present for the wireless terminal device whose handover has been detected (step S933).

When the USIM information exchange candidate is present for the wireless terminal device (step S933), the USIM information exchange control unit 280 performs a USIM information exchange process (step S934).

The USIM information exchange control unit 280 then transmits a handover request to the communication service provider related to the USIM information (USIM information renewed through the exchange process) newly held in the wireless terminal device having transmitted the access request (step S935). The handover is admitted by the communication service provider related to the USIM information renewed through the exchange process in response to the handover request. After this permission, an access process is performed between the wireless terminal device whose handover has been detected and the communication service provider (network control device) related to the USIM information renewed through the exchange process. Further, the wireless terminal device whose handover has been detected becomes able to communicate with the communication service provider (network control device) related to the USIM information renewed through the exchange process.

The USIM information exchange control unit 280 determines whether access end process completion information has been received from the communication service provider (network control device) having transmitted the handover request (step S936). When the access end process completion information has not been received, monitoring continues to be performed. Further, when the access end process completion information has been received from the communication service provider (network control device) having transmitted the handover request (step S936), the USIM information exchange control unit 280 performs the USIM information restoration process (step S937). In other words, the restoration process of restoring the exchanged USIM information is performed between the two wireless terminal devices (the wireless terminal device having transmitted the access request and the wireless terminal device of the exchange partner) recorded in the USIM information exchange terminal list holding unit 290. When this restoration process ends, the two wireless terminal devices related to the restoration process are deleted from the USIM information exchange terminal list holding unit 290.

Further, when the USIM information exchange candidate is not present (step S923), the USIM information exchange control unit 280 performs a process of maintaining the access to the communication service provider that has been accessed prior to the handover (step S938).

[Selection Example of Communication Service Provider]

The example in which the information processing device 200 selects the wireless terminal device that is a USIM information exchange partner with reference to the USIM information exchange candidate list has been shown above. However, a plurality of communication service providers can be registered as the USIM information exchange candidate for one wireless terminal device, as described above. Accordingly, a communication service provider related to the wireless terminal device that is an exchange partner can be selected from among the plurality of communication service providers. Accordingly, in this example, an example in which the wireless terminal device having made the access request acquires the USIM information exchange candidate list from the information processing device 200 and selects the communication service provider that is the USIM information exchange partner is shown.

[Communication Example Between Respective Devices]

Figure 15:
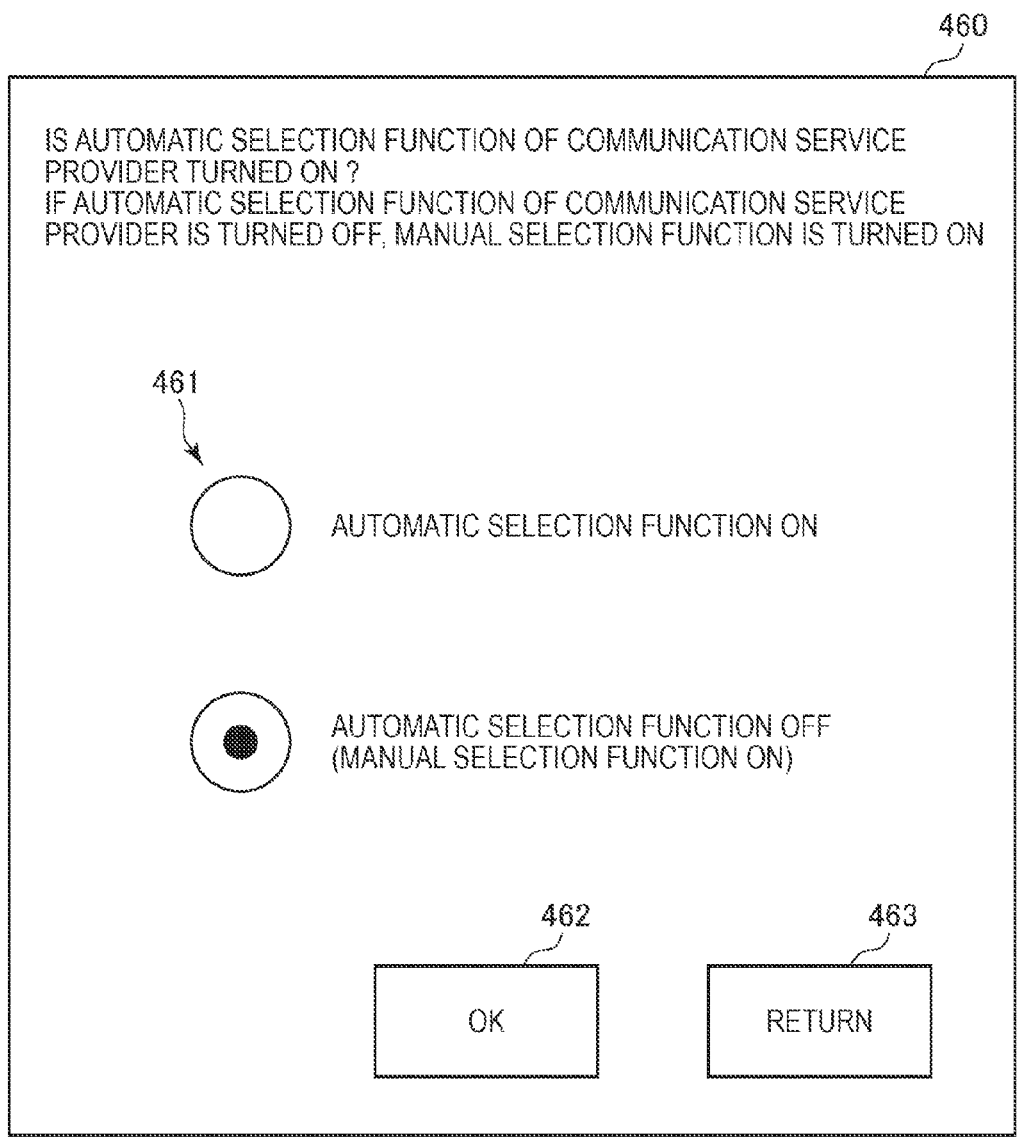
FIG. 15 is a diagram illustrating an example of a display screen displayed in the first wireless terminal device 300 in the first embodiment of this disclosure.

FIGS. 15 and 16 are diagrams illustrating examples of a display screen displayed on the first wireless terminal device 300 in the first embodiment of this disclosure. These display screens will be described in detail with reference to a sequence chart illustrated in FIG. 17. Further, while examples in which a communication service provider selection manipulation is performed in the first wireless terminal device 300 are illustrated in FIGS. 15 and 16, the same may be performed in other wireless terminal devices.

Figure 17:
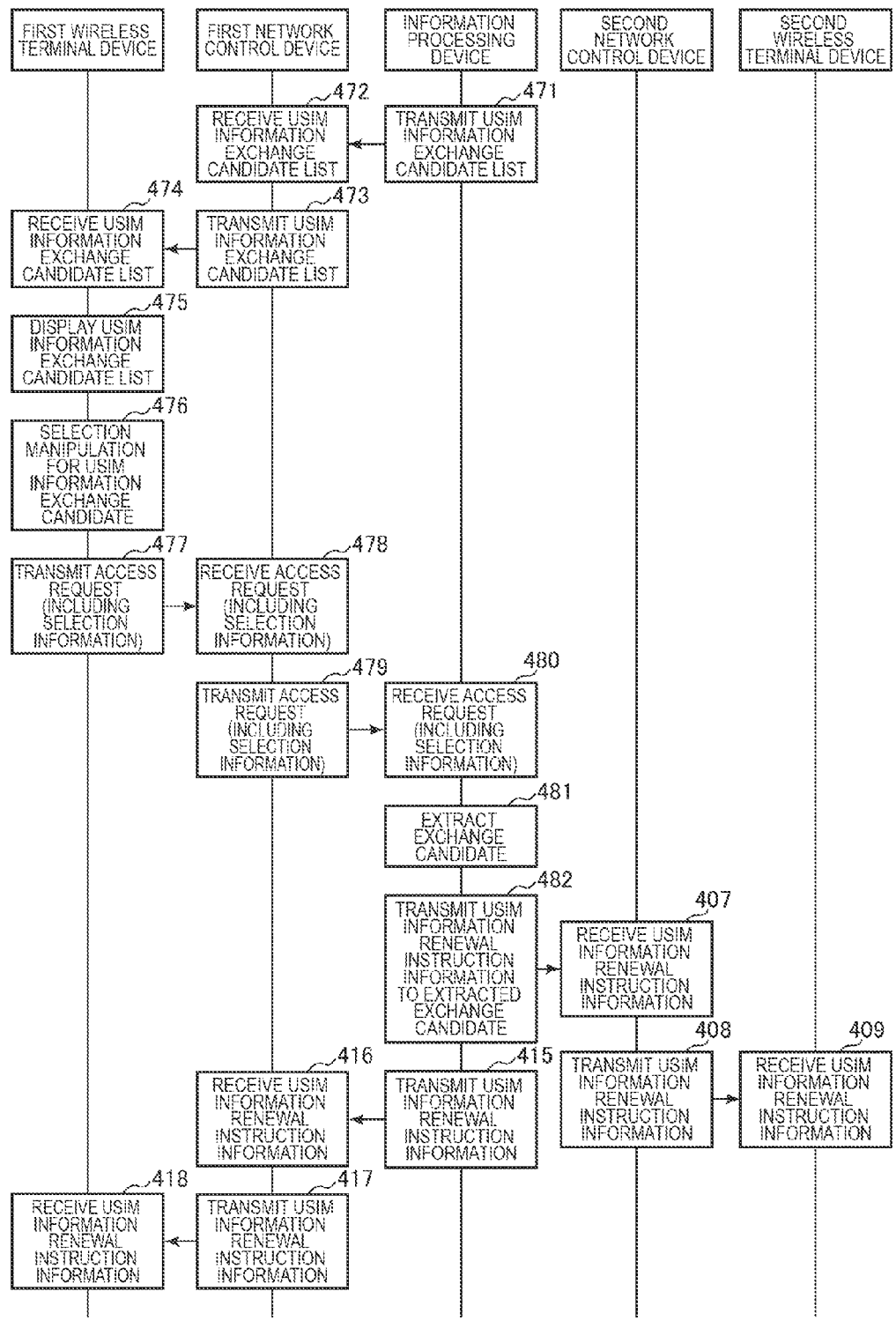
FIG. 17 is a sequence chart illustrating an example of a communication process between respective devices constituting the communication system 100 in the first embodiment of this disclosure.

FIG. 17 is a sequence chart illustrating an example of a communication process between respective devices constituting the communication system 100 in the first embodiment of this disclosure. Further, FIG. 17 is obtained by modifying a part of FIGS. 11 and 12. Accordingly, the common parts from FIGS. 11 and 12 are denoted by the same reference numerals and a description thereof will be partially omitted.

An example (display screen 460) of a display screen displayed when on/off of an automatic selection function of automatically selecting a communication service provider is set is illustrated in FIG. 15. Radio buttons 461, an OK button 462 and a return button 463 are displayed on the display screen 460.

The radio buttons 461 are radio buttons for selecting on/off of the automatic selection function.

The OK button 462 is a button pushed down when a selection is established after a pressing manipulation for selecting either of the radio buttons 461 has been performed.

For example, the return button 463 is a button pushed down when a screen returns to an immediately previously displayed display screen. Further, the same applies to return buttons 467 and 469 illustrated in FIG. 16.

For example, when a pressing manipulation of the OK button 462 is performed after a selection manipulation of the radio button 461 for automatic selection function off (manual selection function on) is performed, a manual selection function is set. When the manual selection function is set in this way, a selection screen 464 (illustrated in FIG. 16(a)) for causing a user to select the USIM information exchange candidate is displayed on the display unit 350.

Further, for example, when a pressing manipulation of the OK button 462 is performed after the radio button 461 for a selection manipulation of the automatic selection function ON has been performed, the automatic selection function is set. When the automatic selection function is set in this way, the selection screen for causing a user to select a USIM information exchange candidate is not displayed on the display unit 350. Further, when the first wireless terminal device 300 makes an access request, the USIM information exchange candidate is automatically selected by the control unit 330 of the first wireless terminal device 300.

First, the information processing device 200 regularly or irregularly transmits the USIM information exchange candidate list held in the USIM information exchange candidate list holding unit 260 to each wireless terminal device via each network control device (471-474). Further, in FIG. 17, the example in which the information processing device 200 transmits the USIM information exchange candidate list held in the USIM information exchange candidate list holding unit 260 to the first wireless terminal device 300 via the first network control device 110 is illustrated. Further, in response to the request from the wireless terminal device, the USIM information exchange candidate list may be appropriately transmitted to the wireless terminal device related to the request.

When the USIM information exchange candidate list from the information processing device 200 is received (474), the control unit 330 of the first wireless terminal device 300 displays the USIM information exchange candidate list on the display unit 350 (475). For example, the USIM information exchange candidate list is displayed on the display unit 350 according to a user manipulation or automatically. This display example is illustrated in FIG. 16.

An example of a display screen in which the USIM information exchange candidate list transmitted from the information processing device 200 is shown on the display unit 350 is illustrated in FIG. 16. A display example (a display screen 464) when there is a USIM information exchange candidate is illustrated in FIG. 16(a) and a display example (a display screen 468) when there is no USIM information exchange candidate is illustrated in FIG. 16(b).

Radio buttons 465, an OK button 466, and a return button 467 are displayed on the display screen 464 illustrated in FIG. 16(a).

The radio buttons 465 are radio buttons for selecting a communication service provider desired by a user. For example, information (e.g., a communication service provider name) on communication service providers, which are USIM information exchange candidates, and order of the candidates are displayed side by side in the corresponding radio button 465.

The OK button 466 is a button pushed down when a selection is established after a pressing manipulation to select either of the radio buttons 465 is performed. Further, when only a pressing manipulation of the OK button 466 is performed without a selection manipulation being performed, the communication service provider that is a first candidate is selected.

A return button 469 is displayed together with a message on the display screen 468 illustrated in FIG. 16(b). In other words, when there is no USIM information exchange candidate, the USIM information exchange candidate cannot be selected and accordingly only this fact is displayed.

For example, when the display screen 464 illustrated in FIG. 16(a) has been displayed on the display unit 350 (475), a selection manipulation is performed to select the USIM information exchange candidate (476). For example, when a pressing manipulation of the OK button 466 is performed after a selection manipulation of the radio button 465 of the second communication service provider (the first candidate) is performed, a second communication service provider is set as the USIM information exchange candidate. Further, when a certain time has elapsed after a setting operation of the USIM information exchange candidate has been performed, the possibility of the first wireless terminal device 300 being moved and a cell being changed or the congestion degree of the cell being changed may be considered. Accordingly, when a certain time has elapsed after the setting manipulation of the USIM information exchange candidate has been performed, setting content may be deleted and a screen promoting new settings may be displayed.

Further, when a user manipulation to perform an access request is performed after the USIM information exchange candidate is set, the access request is transmitted from the first wireless terminal device 300 to the information processing device 200 via the first network control device 110 (477-480). Information (selection information) on the communication service provider (the second communication service provider) selected as the USIM information exchange candidate is included in the access request. Further, when the automatic selection function is set, the USIM information exchange candidate is automatically selected by the control unit 330 from the USIM information exchange candidate list transmitted from the information processing device 200. Accordingly, the information (selection information) on the communication service provider automatically selected as the USIM information exchange candidate is included in the access request.

Upon receiving the access request from the first wireless terminal device 300 (480), the information processing device 200 extracts the USIM information exchange candidate for the communication service provider related to the selection information included in the access request (481). In other words, when the access information reception unit 270 receives the access request from the first wireless terminal device 300, the access information reception unit 270 outputs the access request to the USIM information exchange control unit 280. The USIM information exchange control unit 280 then acquires the USIM information exchange candidate list held in the USIM information exchange candidate list holding unit 260. The USIM information exchange control unit 280 then extracts a wireless terminal device (a terminal having a complementary relationship) that can access the communication service provider related to the selection information included in the access request with reference to the acquired USIM information exchange candidate list (481).

The USIM information renewal instruction information is then transmitted to the extracted wireless terminal device via the network control device (482 and 407-409). For example, the USIM information renewal instruction information is transmitted to the extracted wireless terminal device (the second wireless terminal device 400) via the second network control device 120 (482 and 407-409). Since a subsequent process is substantially the same as those in FIGS. 11 and 12, a description thereof will be omitted herein.

Thus, in this example, a plurality of communication service providers are extracted as the USIM information exchange candidates. Further, a wireless terminal device having an access right to access a base station related to one communication service provider selected in the first wireless terminal device 300 from among the plurality of extracted communication service providers is the wireless terminal device of the exchange partner.

Thus, the communication service provider desired by the user can be easily used by displaying the USIM information exchange candidate list transmitted from the information processing device 200 and the user selecting the communication service provider. In other words, the first wireless terminal device 300 can select a communication service provider not in a contract with the first wireless terminal device 300, as well as the first communication service provider 40 in a contract with the first wireless terminal device 300 in advance, and can easily receive communication service provided by the selected communication service provider.

[Acquisition Example of Congestion Degree Information]

The example in which the congestion degree information acquisition unit 230 of the information processing device 200 acquires congestion degree information from each network control device and holds the congestion degree information in the congestion degree information holding unit 240 has been shown above. Here, for example, when the wireless terminal device is in a standby state, the information on the congestion degree of the base station can also be acquired. Accordingly, in this example, an example in which the congestion degree information acquisition unit 230 acquires information (congestion degree information) acquired by the wireless terminal device and holds the information in the congestion degree information holding unit 240 is shown.

For example, in a code division multiplex access scheme, each wireless terminal device performs correlative detection of a pilot signal, including neighboring cells associated with cell search at the time of standby. Accordingly, the congestion degree can be calculated based on a correlative detection value.

Further, in an orthogonal frequency division multiplex access scheme, allocation information of a subcarrier is transmitted to each wireless terminal device. Accordingly, the congestion degree can be calculated based on a ratio of the number of actually allocated subcarriers to the number of all subcarriers of each frame included in the information.

Thus, the congestion degree of each base station can be acquired from the wireless terminal device capable of accessing the base station. Further, the information (congestion degree information) acquired by the wireless terminal device is sequentially transmitted to the information processing device 200 and acquired by the congestion degree information acquisition unit 230. Further, detection of the congestion degree of the base station may be performed using the wireless terminal device, and the information of the congestion degree may be collected in the wireless terminal device in association with position information. In this case, the congestion degree of the base station can be recognized even if the wireless terminal device does not receive disclosure of the information on the congestion degree from the communication service provider.

Here, the congestion degree information acquisition unit 230 may acquire history information of a communication rate related to the congestion degree detected by each wireless terminal device, as well as the congestion degree, and hold the history information in the congestion degree information holding unit 240 as the congestion degree information. In this case, the history information of the communication rate may be used as the congestion degree information instead of using the congestion degree when the USIM information exchange candidate is extracted.

2. Second Embodiment

In the first embodiment of this disclosure, the example in which the USIM information exchange candidate is extracted based on the position of the wireless terminal device and the congestion degree of the base station is shown. Here, in a period in which a user does not use a wireless terminal device (a unused period), selection of the wireless terminal device as the USIM information exchange candidate without consideration of the position of the wireless terminal device and the congestion degree of the base station may be considered. Accordingly, in the second embodiment of this disclosure, an example in which the USIM information exchange candidate is selected using an unused period of the wireless terminal device is shown. Further, a configuration of a communication system in the second embodiment of this disclosure is substantially the same as that in the example illustrated in FIG. 1. Accordingly, the same parts as those in the first embodiment of this disclosure are denoted by the same reference numerals, and a description thereof will be partially omitted.

[Configuration Example of Information Processing Device]

Figure 18:
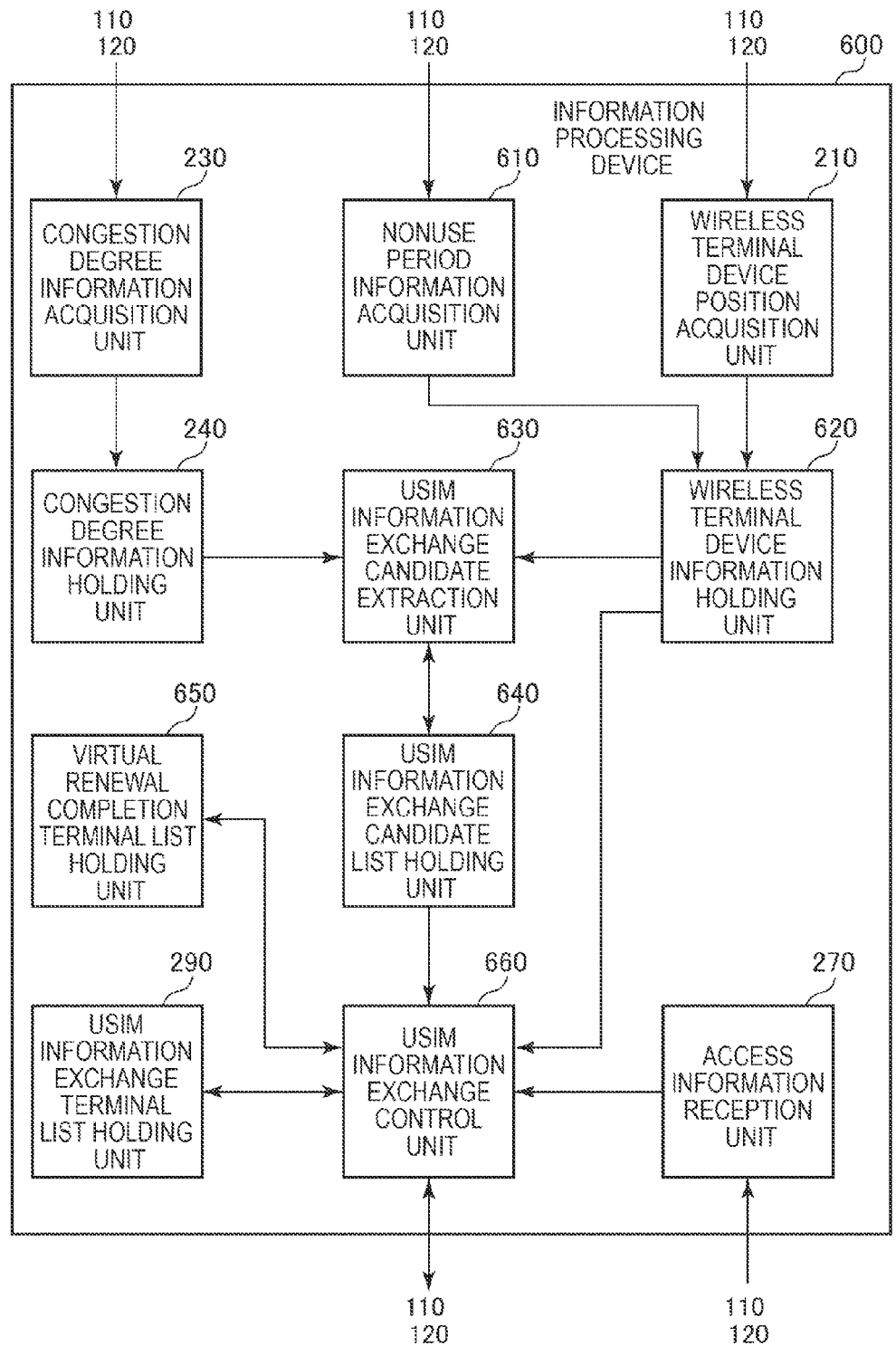
FIG. 18 is a block diagram illustrating a functional configuration example of an information processing device 600 in a second embodiment of this disclosure.

FIG. 18 is a block diagram illustrating a functional configuration example of an information processing device 600 in the second embodiment of this disclosure. Further, the information processing device 600 is a variant of the information processing device 200 illustrated in FIG. 4. Accordingly, the same parts as those in the information processing device 200 are denoted by the same reference numerals, and a description thereof will be partially omitted.

The information processing device 600 includes an unused period information acquisition unit 610, a wireless terminal device information holding unit 620, a USIM information exchange candidate extraction unit 630, a USIM information exchange candidate list holding unit 640, a virtual renewal completion terminal list holding unit 650, and a USIM information exchange control unit 660.

The unused period information acquisition unit 610 acquires information on an unused period (unused period information) to be set in each wireless terminal device from the first network control device 110 and the second network control device 120. Further, the unused period information acquisition unit 610 holds the acquired unused period information in the wireless terminal device information holding unit 620. Further, the unused period information acquisition unit 610 regularly or irregularly acquires the unused period information from the first network control device 110 and the second network control device 120 to sequentially update the unused period information held in the wireless terminal device information holding unit 620. Further, a method of setting the unused period information will be described with reference to FIGS. 22 and 23 in detail.

The wireless terminal device information holding unit 620 holds the unused period information acquired by the unused period information acquisition unit 610 and information on the wireless terminal device (wireless terminal device information (e.g., terminal identification information)) corresponding to the unused period information in association with each other. Further, the wireless terminal device information holding unit 620 supplies the held unused period information and wireless terminal device information to the USIM information exchange candidate extraction unit 630 and the USIM information exchange control unit 660. In other words, the unused period information of each wireless terminal device is managed by the wireless terminal device information holding unit 620. Further, held content of the wireless terminal device information holding unit 620 will be described in detail with reference to FIG. 19.

The USIM information exchange candidate extraction unit 630 extracts a radio service provider that is a USIM information exchange candidate based on the position information and the unused period information held in the wireless terminal device information holding unit 620 and congestion degree information held in a congestion degree information holding unit 240. Further, the USIM information exchange candidate extraction unit 630 holds a list of extracted communication service providers in the USIM information exchange candidate list holding unit 640.

The USIM information exchange candidate list holding unit 640 holds the list of communication service providers extracted as the USIM information exchange candidate by the USIM information exchange candidate extraction unit 630 and supplies the held list of communication service providers to the USIM information exchange control unit 660.

The virtual renewal completion terminal list holding unit 650 holds a list of wireless terminal devices in an unused state among two wireless terminal devices related to an exchange process in the USIM information exchange control unit 660.

When access information related to an access request is output from an access information reception unit 270, the USIM information exchange control unit 660 performs the USIM information exchange process for the wireless terminal device having transmitted the access request. Further, the USIM information exchange control unit 660 holds the list of wireless terminal devices in an unused state among the two wireless terminal devices for which the USIM information exchange process has been performed, in the virtual renewal completion terminal list holding unit 650.

[Content Example of Wireless Terminal Device Information Holding Unit]

FIG. 19 is a diagram schematically illustrating an example of held content of the wireless terminal device information holding unit 620 in the second embodiment of this disclosure.

The wireless terminal device information holding unit 620 is a holding unit that holds information on each wireless terminal device (wireless terminal device information). Specifically, terminal identification information 221, position information 222, communication service provider identification information 223, and unused period information 621 are held in the wireless terminal device information holding unit 620 in association with one another. Further, since the terminal identification information 221, the position information 222 and the communication service provider identification information 223 are the same as those in the example illustrated in FIG. 5, a description thereof will be omitted herein.

The unused period information 621 is information on the unused period (unused period information) to be set by a user manipulation in the wireless terminal device. In other words, the information on the wireless terminal device (terminal identification information) in which the USIM information held in the wireless terminal device is in an unused state is stored.

[Content Example of the USIM Information Exchange Candidate List Holding Unit]

FIG. 20 is a diagram schematically illustrating an example of held content of the USIM information exchange candidate list holding unit 640 in the second embodiment of this disclosure.

The USIM information exchange candidate list holding unit 640 is a holding unit that holds a list of wireless terminal devices extracted as the USIM information exchange candidates. Specifically, terminal identification information 261, communication service provider identification information 262, USIM information exchange candidate information 263, and unused terminal information 641 are held in the USIM information exchange candidate list holding unit 640 in association with one another. Further, since the terminal identification information 261, the communication service provider identification information 262 and the USIM information exchange candidate information 263 are the same as those in an example illustrated in FIG. 7, a description thereof will be omitted herein.

Further, the unused terminal information 641 corresponds to the unused period information 621 illustrated in FIG. 19. In other words, information (terminal identification information) on a wireless terminal device in an unused state among wireless terminal devices that can access the communication service provider stored in the USIM information exchange candidate information 263 is stored among the unused terminal information 641.

[Content Example of Virtual Renewal Completion Terminal List Holding Unit]

FIG. 21 is a diagram schematically illustrating an example of held content of the virtual renewal completion terminal list holding unit 650 in the second embodiment of this disclosure.

The virtual renewal completion terminal list holding unit 650 is a holding unit that holds the list of the wireless terminal devices that are in an unused state among two wireless terminal devices related to the exchange process in the USIM information exchange control unit 660. Specifically, identification information 651 for a terminal in an unused period and identification information 652 for a communication service provider that the terminal in the unused period can access are held in the virtual renewal completion terminal list holding unit 650 in association with each other. Further, the identification information 651 for a terminal in an unused period corresponds to the terminal identification information 221 illustrated in FIG. 19. Further, the identification information 652 for a communication service provider that the terminal in the unused period can access corresponds to the communication service provider identification information 223 illustrated in FIG. 19.

[Setting Example of Unused Period]

Next, an example of setting an unused period based on a user manipulation is shown.

[Setting Example of Unused Period Based on Airplane Mode Setting Manipulation]

Figure 22:
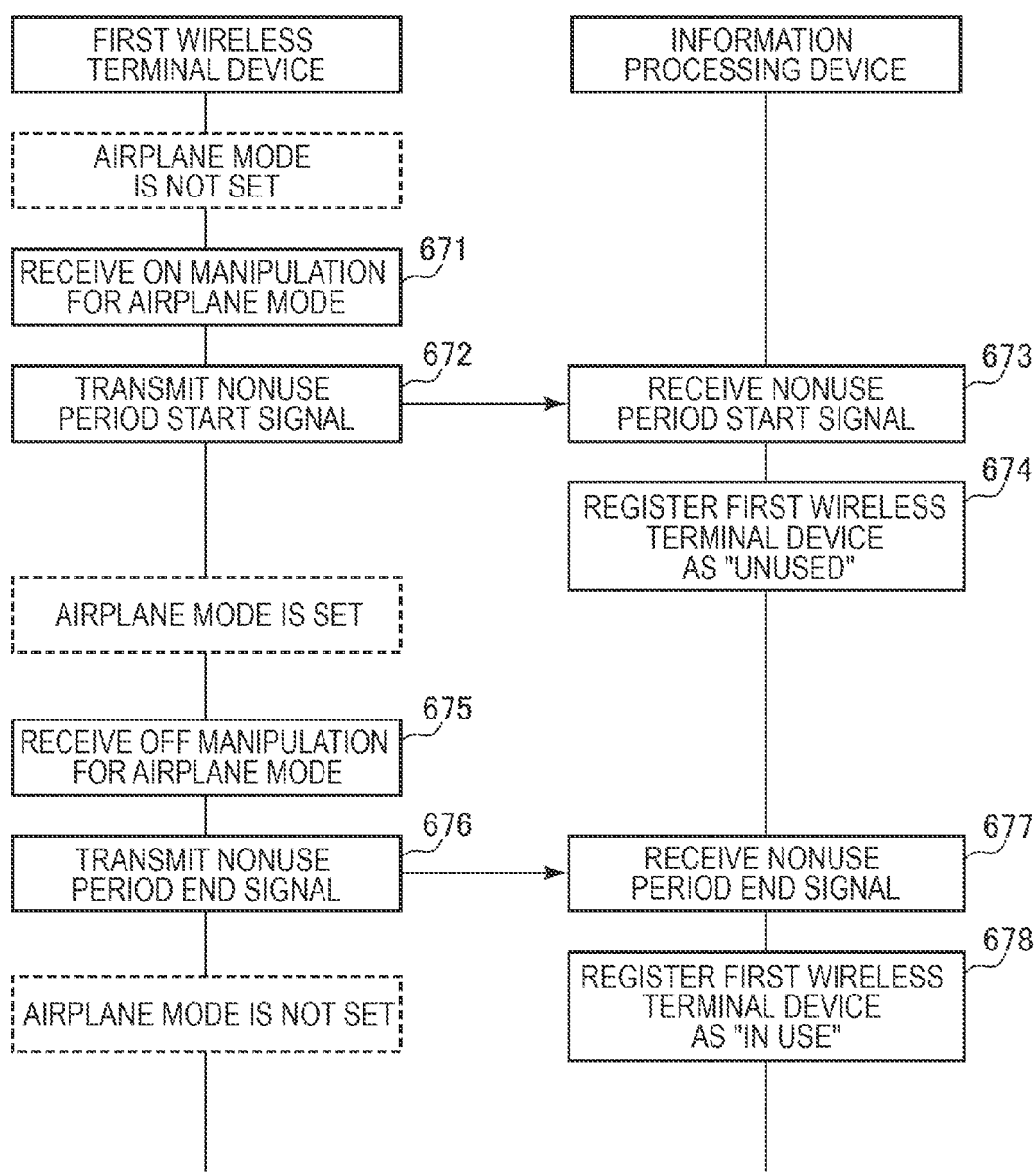
FIG. 22 is a sequence chart illustrating an airplane mode setting process of a first wireless terminal device 300 in the second embodiment of this disclosure.

FIG. 22 is a sequence chart illustrating an airplane mode setting process of the first wireless terminal device 300 in the second embodiment of this disclosure. Further, in this example, while an example of setting of the airplane mode in the first wireless terminal device 300 is shown, the same applies to other wireless terminal devices. Here, the airplane mode means a mode in which a state is switched to a state in which radio waves of the wireless terminal device are not transmitted and received so that the wireless terminal device can be used in an airplane.

First, a case in which the airplane mode is not set in the first wireless terminal device 300 is assumed. In this case, a user manipulation (an ON manipulation) for setting the airplane mode is assumed to have been received in a manipulation reception unit 340 (671). When the ON manipulation for the airplane mode is received (671), the first wireless terminal device 300 transmits an unused period start signal to the information processing device 600 via the first network control device 110 (672 and 673).

When the unused period information acquisition unit 610 receives the unused period start signal (673), the wireless terminal device (the first wireless terminal device 300) having transmitted the unused period start signal is registered in the wireless terminal device information holding unit 620 (674). In other words, "unused" is recorded in the unused period information 621 corresponding to the first wireless terminal device 300 of the wireless terminal device information holding unit 620.

Further, a case in which the airplane mode has been set in the first wireless terminal device 300 is assumed. In this case, a user manipulation (an OFF manipulation) for releasing the airplane mode is assumed to have been received in the manipulation reception unit 340 (675). When the OFF manipulation for the airplane mode is received (675), the first wireless terminal device 300 transmits an unused period end signal to the information processing device 600 via the first network control device 110 (676 and 677).

When the unused period information acquisition unit 610 receives the unused period end signal (677), the wireless terminal device (first wireless terminal device 300) having transmitted the unused period end signal is registered in the wireless terminal device information holding unit 620 (678). In other words, "in use" is recorded in the unused period information 621 corresponding to the first wireless terminal device 300 of the wireless terminal device information holding unit 620.

[Setting Example of Unused Period Based on Power ON-OFF Manipulation]

Figure 23:
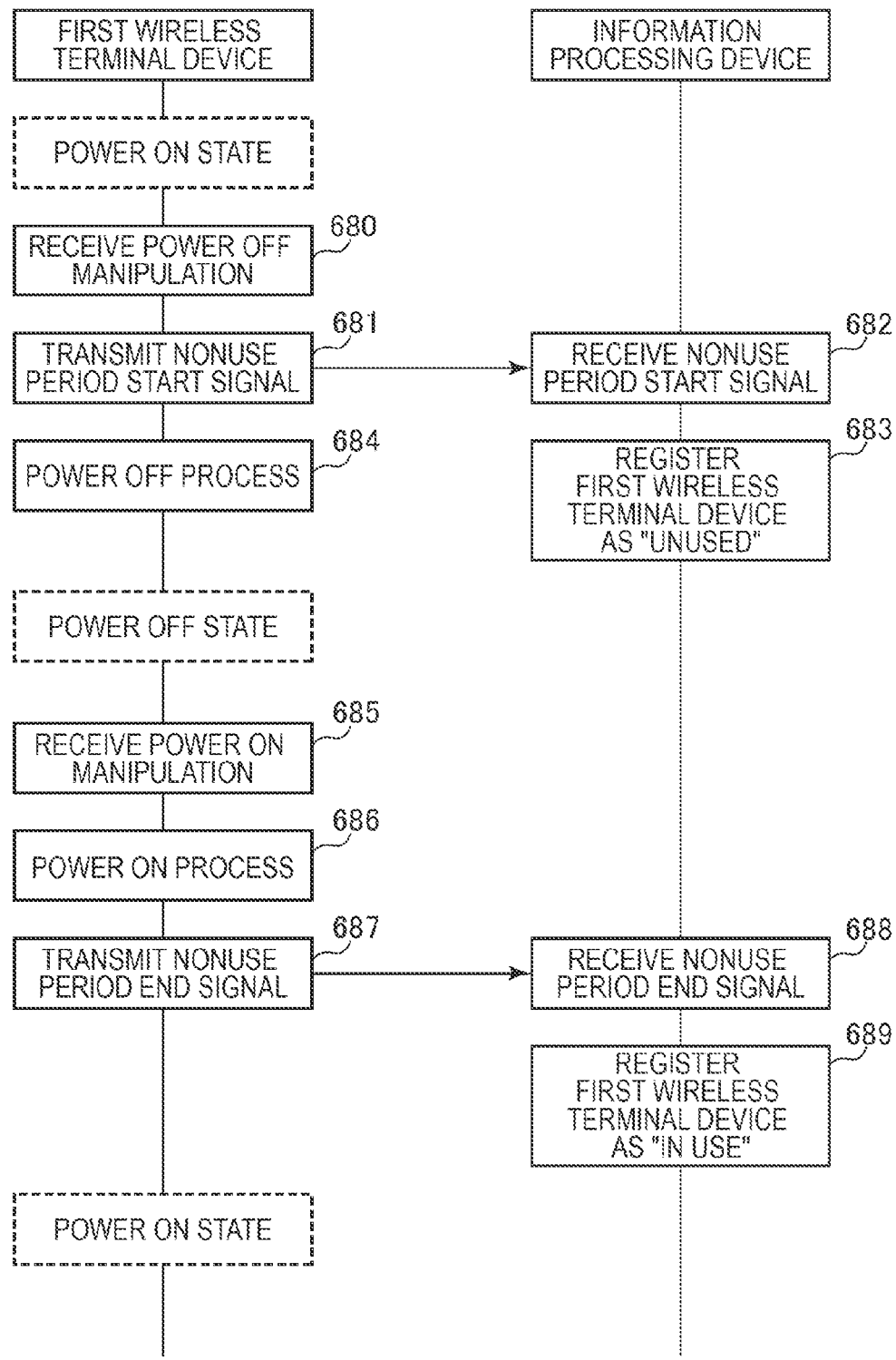
FIG. 23 is a sequence chart illustrating a power ON/OFF process of the first wireless terminal device 300 in the second embodiment of this disclosure.

FIG. 23 is a sequence chart illustrating a power ON/OFF process of the first wireless terminal device 300 in the second embodiment of this disclosure. Further, in this example, while an example in which power is on or off in the first wireless terminal device 300 is shown, the same applies to other wireless terminal devices.

First, a case in which the first wireless terminal device 300 is in a power ON state is assumed. In this case, a user manipulation for power OFF (a power OFF manipulation) is assumed to have been received in the manipulation reception unit 340 (680). When the power OFF manipulation has been received (680), the first wireless terminal device 300 transmits an unused period start signal to the information processing device 600 via the first network control device 110 (681 and 682). Further, a power OFF process is performed in the first wireless terminal device 300 (684).

When the information acquisition unit 610 receives the unused period start signal (682), the information acquisition unit 610 registers the wireless terminal device (the first wireless terminal device 300) having transmitted the unused period start signal in the wireless terminal device information holding unit 620 (683). In other words, "unused" is recorded in the unused period information 621 corresponding to the first wireless terminal device 300 of the wireless terminal device information holding unit 620.

Further, a case in which the first wireless terminal device 300 is in a power OFF state is assumed. In this case, a user manipulation for power ON (power ON manipulation) is assumed to have been received in the manipulation reception unit 340 (685). When the power ON manipulation is received (685), the power ON process is performed in the first wireless terminal device 300 (686). The first wireless terminal device 300 then transmits an unused period end signal to the information processing device 600 via the first network control device 110 (687 and 688).

When the unused period information acquisition unit 610 receives the unused period end signal (688), the wireless terminal device (the first wireless terminal device 300) having transmitted the unused period end signal is registered in the wireless terminal device information holding unit 620 (689). In other words, "in use" is recorded in the unused period information 621 corresponding to the first wireless terminal device 300 of the wireless terminal device information holding unit 620.

Further, in the second embodiment of this disclosure, an example of setting of the unused period based on the airplane mode setting manipulation and the power ON/OFF manipulation is shown as a setting method of setting the unused period. However, the unused period may be set based on another user manipulation (e.g., an unused period setting manipulation). For example, information on the period in which the first wireless terminal device 300 is not used (the unused period information) may be transmitted from the first wireless terminal device 300 to the information processing device 600 based on the user manipulation.

Further, the start of the period in which the first wireless terminal device 300 is not used (unused period start information) may be transmitted from the first wireless terminal device 300 to the information processing device 600 based on the user manipulation. In this case, the information processing device 600 may determine a period until the information on use start of the first wireless terminal device 300 (unused period end information) is transmitted from the first wireless terminal device 300, as a period in which the first wireless terminal device 300 is not used.

[USIM Information Exchange Candidate Extraction Example]

Using the unused period information set as described above, the USIM information exchange candidate extraction unit 630 extracts the USIM information exchange candidate.

Specifically, the USIM information exchange candidate extraction unit 630 extracts the USIM information exchange candidate based on the position information 222 and the unused period information 621 held in the wireless terminal device information holding unit 620 and the congestion degree information 243 held in the congestion degree information holding unit 240.

For example, a case in which the second communication service provider 50 has been extracted as the USIM information exchange candidate of the first wireless terminal device 300, as in the first embodiment of this disclosure, is assumed. In this case, the USIM information exchange candidate extraction unit 630 extracts the wireless terminal device holding the USIM information related to the second communication service provider 50 with reference to the communication service provider identification information 223 of the wireless terminal device information holding unit 620. The USIM information exchange candidate extraction unit 630 then extracts a wireless terminal device registered as "unused" from the extracted wireless terminal devices with reference to the unused period information 621 of the wireless terminal device information holding unit 620. Here, when there is the wireless terminal device registered as "unused," the wireless terminal device is the USIM information exchange candidate for the first communication service provider 40, and the terminal identification information of the wireless terminal device is held in the unused terminal information 641 of the USIM information exchange candidate list holding unit 640.

Further, the USIM information exchange control unit 660 performs a USIM information exchange processes using the wireless terminal device whose terminal identification information has been held in the unused terminal information 641 of the USIM information exchange candidate list holding unit 640 as a USIM information exchange partner. Further, when a plurality of pieces of terminal identification information have been held in the unused terminal information 641, any of the plurality of terminals may be used as the exchange partner. Further, the USIM information exchange control unit 660 holds the list of the wireless terminal devices that are in an unused state among the two wireless terminal devices for which the USIM information exchange process has been performed, in the virtual renewal completion terminal list holding unit 650.

[Operation Example of Information Processing Device]

Next, an operation of the information processing device 600 in the second embodiment of this disclosure will be described with reference to drawings.

Figure 24:
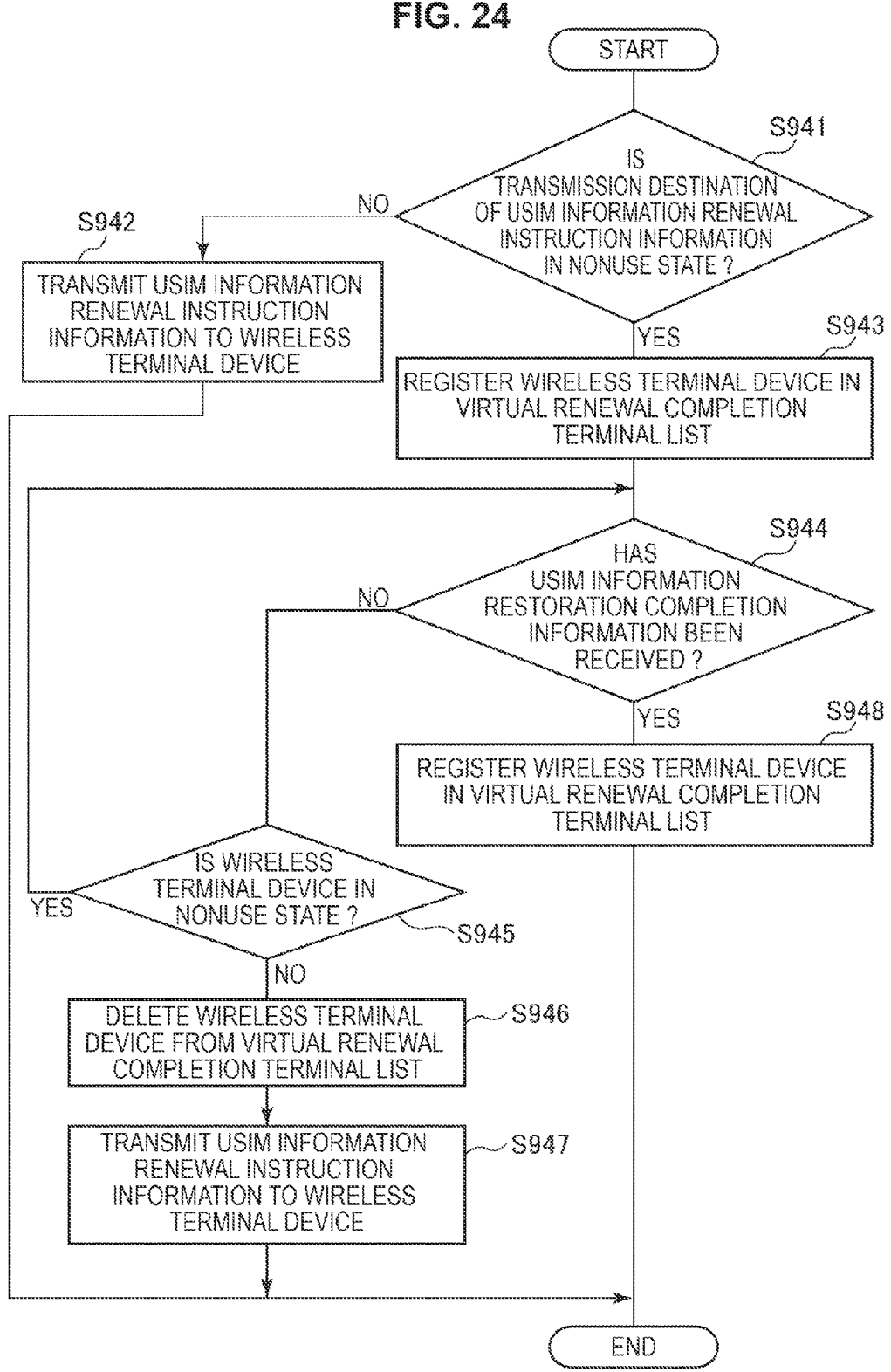
FIG. 24 is a flowchart illustrating an example of a processing procedure of a virtual renewal completion terminal list registration control process in a USIM information exchange control unit 660 in the second embodiment of this disclosure.

FIG. 24 is a flowchart illustrating an example of a processing procedure of a virtual renewal completion terminal list registration control process in the USIM information exchange control unit 660 in the second embodiment of this disclosure. In this example, a processing procedure when an access request has been performed is shown.

First, it is determined whether a transmission destination of USIM information renewal instruction information is a wireless terminal device that is in an unused state based on the unused terminal information 641 of the USIM information exchange candidate list holding unit 640 (step S941). When the transmission destination of the USIM information renewal instruction information is not the wireless terminal device that is in an unused state (step S941), the USIM information renewal instruction information is transmitted to the wireless terminal device (step S942).

When the transmission destination of the USIM information renewal instruction information is the wireless terminal device that is in an unused state (step S941), the wireless terminal device is registered in the virtual renewal completion terminal list holding unit 650 (step S943). Thus, since a radio function is not used or cannot be used in the unused period for the wireless terminal device registered in the virtual renewal completion terminal list holding unit 650, transmission of various pieces of information is not performed.

It is then determined whether the USIM information restoration completion information has been received (step S944). Further, when the USIM information restoration completion information has not been received (step S944), it is determined whether the wireless terminal device is in an unused state based on the unused period information 621 of the wireless terminal device information holding unit 620 (step S945). When the wireless terminal device is in an unused state (step S945), the process returns to step S944. On the other hand, when the wireless terminal device is not in the unused state (step S945), the wireless terminal device is deleted from the virtual renewal completion terminal list holding unit 650 (step S946), and the USIM information renewal instruction information is transmitted to the wireless terminal device (step S947). Thus, the process after the USIM information renewal instruction information has been transmitted is substantially the same as that in the first embodiment of this disclosure.

Further, when the USIM information restoration completion information has been received (step S944), the wireless terminal device is deleted from the virtual renewal completion terminal list holding unit 650 (step S948).

Figure 25:
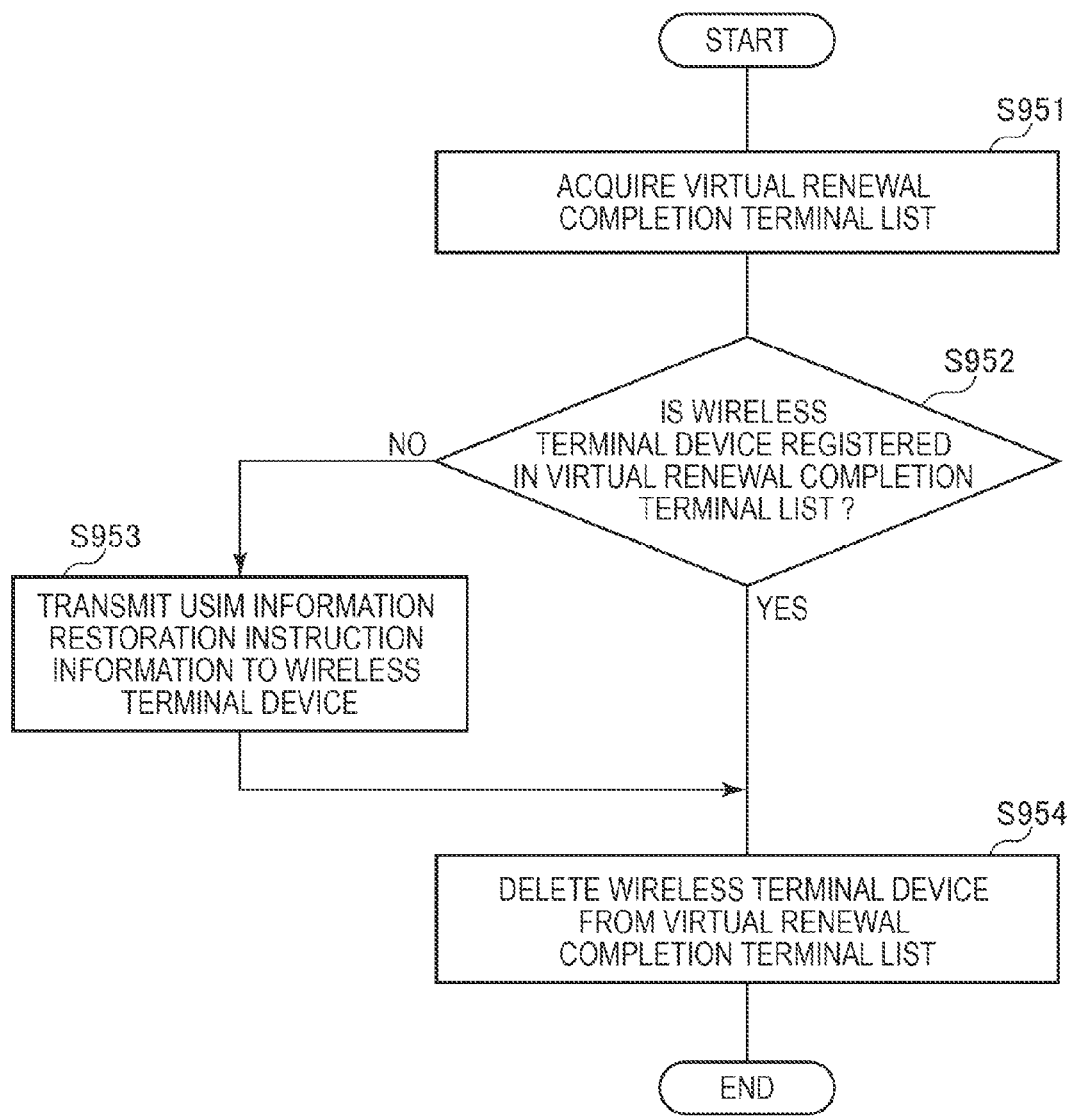
FIG. 25 is a flowchart illustrating an example of a processing procedure of a virtual renewal completion terminal list registration control process in a USIM information exchange control unit 660 in the second embodiment of this disclosure.

FIG. 25 is a flowchart illustrating an example of a processing procedure of the virtual renewal terminal list registration control process in the USIM information exchange control unit 660 in the second embodiment of this disclosure. In this example, a processing procedure when an end request has been performed is shown.

First, content of the virtual renewal completion terminal list holding unit 650 is acquired (step S951) and it is determined whether a wireless terminal device that is a target is registered in a virtual renewal completion terminal list (step S952).

When the wireless terminal device has not been registered in the virtual renewal completion terminal list (step S952), the USIM information restoration instruction information is transmitted to the wireless terminal device (step S953). Thus, the process after the USIM information restoration instruction information has been transmitted is substantially the same as the first embodiment of this disclosure.

Further, when the wireless terminal device has been registered in the virtual renewal completion terminal list (step S952), the wireless terminal device is deleted from the virtual renewal completion terminal list holding unit 650 (step S954).

Thus, in the second embodiment of this disclosure, the nonuse information on the unused state of each wireless terminal device having an access right (an access right based on the USIM information) to access at least one of base stations related to one or a plurality of communication service providers is acquired. Further, the wireless terminal device that is in an unused state is selected as a USIM information exchange partner from among the plurality of wireless terminal devices having the access right related to the communication service provider of the USIM information exchange candidate. Further, 673, 677, 682, and 688 illustrated in FIGS. 22 and 23 are an example of an acquisition procedure defined in claims.

Thus, according to the second embodiment of this disclosure, it is possible to efficiently find the USIM information exchange candidate since a user notifies of a period in which the USIM information is not used in advance.

3. Third Embodiment

In the first and second embodiments of this disclosure, examples in which the USIM information is exchanged between two wireless terminal devices are shown. Here, when communication with a communication service provider is performed using USIM information after exchange, communication is performed with a communication service provider different from a communication service provider with which a contract has been made in advance. Accordingly, when communication is performed with the communication service provider using USIM information after exchange, it is important to appropriately perform charging. Therefore, an example in which charging is performed after exchange of USIM information is shown in the third embodiment of this disclosure. Further, a configuration of a communication system in the third embodiment of this disclosure is substantially the same as the example illustrated in FIG. 1 or the like. Accordingly, the same parts as those the first embodiment of this disclosure are denoted by the same reference numerals, and a description thereof will be partially omitted.

[Configuration Example of Information Processing Device]

Figure 26:
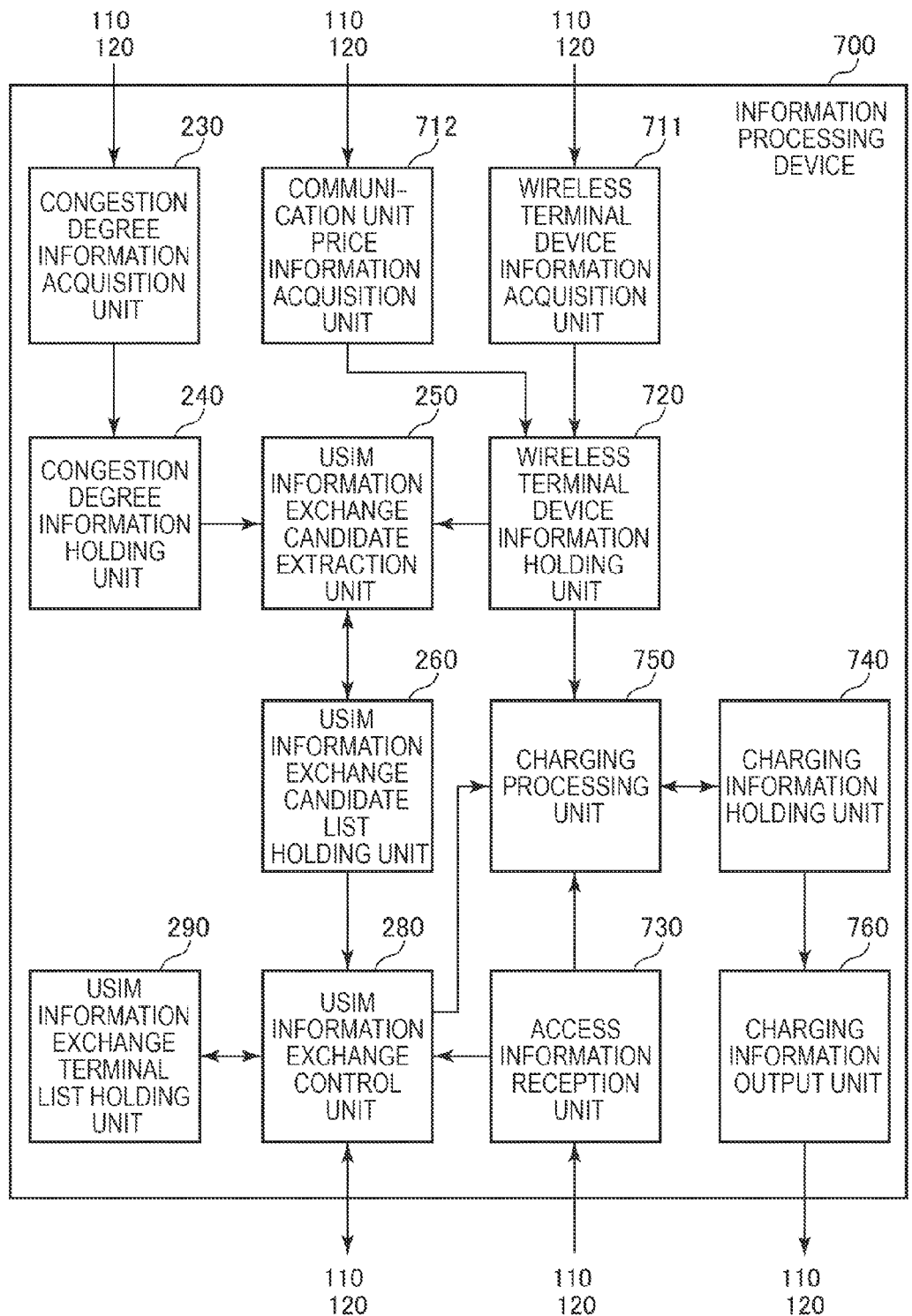
FIG. 26 is a block diagram illustrating a functional configuration example of an information processing device 700 in a third embodiment of this disclosure.

FIG. 26 is a block diagram illustrating a functional configuration example of an information processing device 700 in the third embodiment of this disclosure. Further, the information processing device 700 is a variant of the information processing device 200 illustrated in FIG. 4. Accordingly, the same parts as those in the information processing device 200 are denoted by the same reference numerals, and a description thereof will be partially omitted.

The information processing device 700 includes a wireless terminal device information acquisition unit 711, a communication unit price information acquisition unit 712, a wireless terminal device information holding unit 720, an access information reception unit 730, a charging information holding unit 740, a charging processing unit 750, and a charging information output unit 760.

The wireless terminal device information acquisition unit 711 acquires wireless terminal device information including position information of a wireless terminal device from the first network control device 110 and the second network control device 120. The communication unit price information acquisition unit 712 acquires information on a communication unit price from the first network control device 110 and the second network control device 120. Each piece of the information is held in the wireless terminal device information holding unit 720. Further, the wireless terminal device information acquisition unit 711 and the communication unit price information acquisition unit 712 regularly or irregularly acquire each piece of information from the first network control device 110 and the second network control device 120. Further, the information held in the wireless terminal device information holding unit 720 is sequentially updated.

The wireless terminal device information holding unit 720 is a holding unit that holds information on communication cost together with the position information of the wireless terminal device as wireless terminal device information. Further, the wireless terminal device information holding unit 720 supplies the held position information to a USIM information exchange candidate extraction unit 250 and supplies the held information (the information on the communication cost) to the charging processing unit 750. Further, content of the wireless terminal device information holding unit 720 will be described in detail with reference to FIG. 27.

The access information reception unit 730 receives access information (e.g., an access request) transmitted from each wireless terminal device, via the first network control device 110 and the second network control device 120. Further, the access information reception unit 730 outputs the access information to a USIM information exchange control unit 280 and the charging processing unit 750.

The charging information holding unit 740 holds charging information related to a communication process caused by the wireless terminal device and supplies the stored charging information to the charging processing unit 750.

The charging processing unit 750 calculates a communication cost related to the wireless terminal device and performs a charging process. For example, the charging processing unit 750 calculates the communication cost related to the wireless terminal device using the access information from the access information reception unit 730, the information (the information on the communication cost) stored in the wireless terminal device information holding unit 720, and the charging information stored in the charging information holding unit 740. Further, the charging process in the charging processing unit 750 will be described in detail with reference to FIGS. 29 to 36.

The charging information output unit 760 outputs the communication cost included in the charging information held in the charging information holding unit 740. For example, when a predetermined period expires, the charging information output unit 760 outputs the communication cost to each network control device.

[Content Example of Wireless Terminal Device Information Holding Unit]

FIG. 27 is a diagram schematically illustrating an example of held content of the wireless terminal device information holding unit 720 in the third embodiment of this disclosure.

The wireless terminal device information holding unit 720 is a holding unit that holds the information on each wireless terminal device (wireless terminal device information). Specifically, terminal identification information 221, position information 222, communication service provider identification information 223, and communication unit price information 721 are held in the wireless terminal device information holding unit 720 in association with each other. Further, since the terminal identification information 221, the position information 222 and the communication service provider identification information 223 are the same as those in the example illustrated in FIG. 5, a description thereof will be omitted herein.

The communication unit price information 721 is information on the communication cost (communication unit price information) that is charged when a wireless terminal device uses wireless access service via a radio service provider. In other words, the communication unit price information of a communication service provider related to the USIM information (USIM information before exchange) held in the wireless terminal device is stored. The charging processing unit 750 performs a charging process related to the wireless terminal device before and after exchange with reference to the communication unit price information 721.

[Content Example of Charging Information Holding Unit]

FIG. 28 is a diagram schematically illustrating an example of held content of the charging information holding unit 740 in the third embodiment of this disclosure.

The charging information holding unit 740 is a holding unit that holds the charging information on each wireless terminal device. Specifically, terminal identification information 741 and charging information 742 are held in the charging information holding unit 740 in association with each other.

The terminal identification information 741 is identification information for identifying a wireless terminal device.

The charging information 742 is information including history information (e.g., a date, a communication amount, and an additive amount) on the communication cost when a wireless terminal device uses wireless access service via a radio service provider, and a total amount of communication cost. In other words, whenever the wireless terminal device uses the wireless access service via the radio service provider, the history information is recorded, and a communication cost related to the use of the wireless access service is sequentially added to calculate the total amount.

[Example of Charging Based on Holding State of USIM Information Before Exchange]

Figure 29:
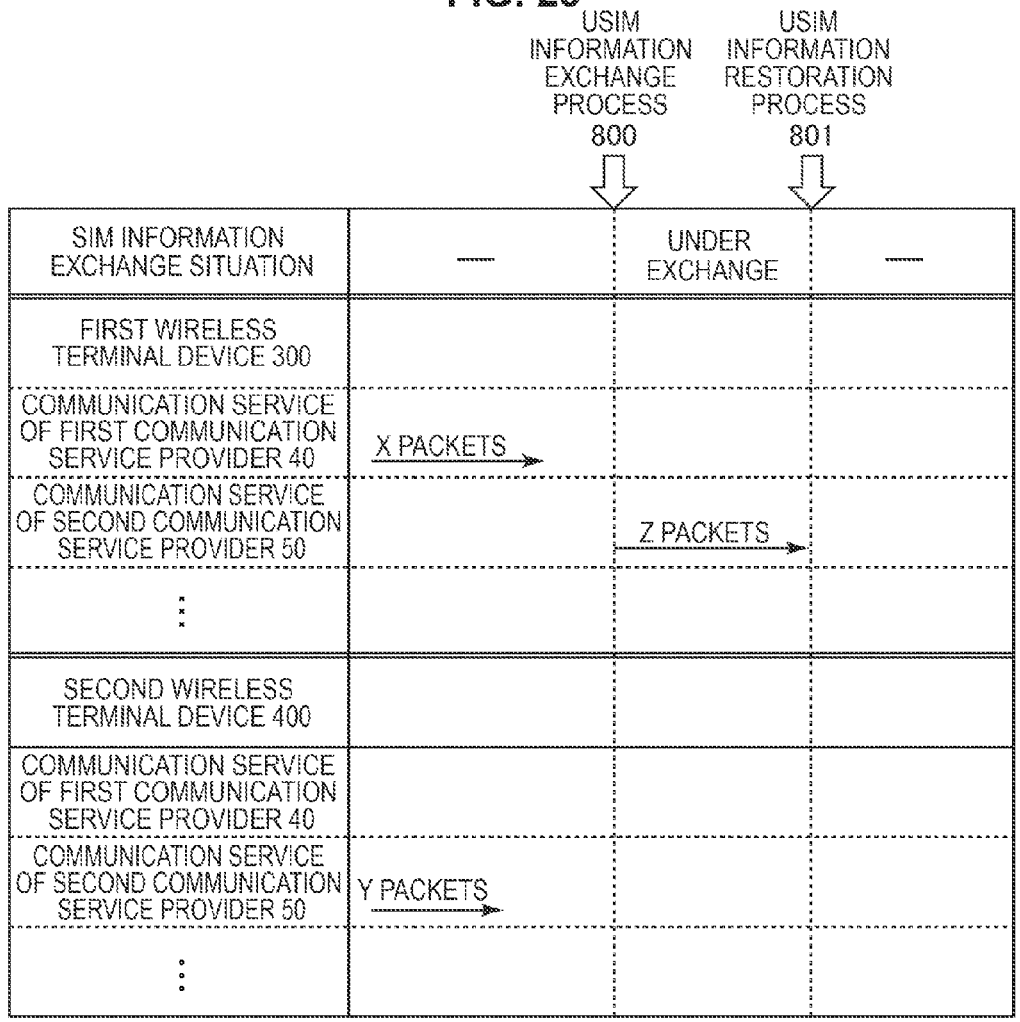
FIG. 29 is a diagram schematically illustrating a charging method for a wireless terminal device in the third embodiment of this disclosure.

FIG. 29 is a diagram schematically illustrating a charging method for a wireless terminal device in the third embodiment of this disclosure. In FIG. 29, a charging method for a first wireless terminal device 300 and a second wireless terminal device 400 is shown.

In FIG. 29(*a*), communication states for the first wireless terminal device 300 and the second wireless terminal device 400 are shown in time series. In other words, in FIG. 29(*a*), a horizontal axis is a time axis, and a state in which the first wireless terminal device 300 and the second wireless terminal device 400 perform communication is schematically shown by arrows (X to Z packets). Further, a packet amount related to the communication indicated by each arrow is indicated by a letter (X to Z packets) attached to the arrow.

In the example illustrated in FIG. 29(*a*), it is first assumed that the first wireless terminal device 300 holds the USIM information of the first communication service provider 40, and the second wireless terminal device 400 holds the USIM information of the second communication service provider 50. In this state, it is assumed that the first wireless terminal device 300 has performed communication using the USIM information of the first communication service provider 40 (X packets), and the second wireless terminal device 400 has performed communication using the USIM information of the second communication service provider 50 (Y packets).

It is assumed that a USIM information exchange process 800 is then performed and the USIM information has been exchanged in the first wireless terminal device 300 and the second wireless terminal device 400. It is assumed that in this state, the first wireless terminal device 300 has performed communication using the USIM information of the second communication service provider 50 (Z packets).

It is assumed that a USIM information restoration process 801 has then been performed and the USIM information in the first wireless terminal device 300 and the second wireless terminal device 400 has been restored.

In FIG. 29(*b*), a charging method for the first wireless terminal device 300 and the second wireless terminal device 400 is shown. In other words, in FIG. 29(*b*), a packet amount that is a charging packet is shown in each column for each wireless terminal device. Based on the packet amount of each wireless terminal device, a total amount of the communication cost is calculated. Thus, in the example illustrated in FIG. 29, when the USIM information is exchanged, the charging process is performed based on a holding state of the USIM information before exchange. In this case, for example, a user of the second wireless terminal device 400 that is an exchange target will bear a communication cost (for Z packets) of the first wireless terminal device 300.

However, for example, it is assumed that the user of the second wireless terminal device 400 has made a flat rate contract with the second communication service provider. In this case, the user of the second wireless terminal device 400 will pay the communication cost (fixed amount) to the second communication service provider 50 regardless of the packet amount. Accordingly, the user of the second wireless terminal device 400 does not substantially bear the communication cost (for Z packets) of the first wireless terminal device 300. Further, the user of the first wireless terminal device 300 does not substantially bear the communication cost (for Z packets) of the first wireless terminal device 300.

Thus, when the user of the wireless terminal device that is a use target has made a flat rate contract with the communication service provider, it is possible to reduce the communication cost borne by both of the users by exchanging the USIM information in the two wireless terminal devices. Further, since a wireless terminal device present in a cell of a base station having a high congestion degree can easily use a cell of a base station of another communication service provider with a low congestion degree, it is possible to increase use efficiency of a wireless line for the communication service provider. In other words, provision of efficient communication service within communication service in which an upper limit amount has been established is possible.

Further, in the example illustrated in FIG. 29(*a*), a case in which the second wireless terminal device 400 performs communication between the USIM information exchange process 800 and the USIM information restoration process 801 (during USIM information exchange) is assumed. In this case, since the USIM information related to the first communication service provider 40 is held in the second wireless terminal device 400, the second wireless terminal device 400 uses communication service provided by the first communication service provider 40. The communication cost at the time of this use is added to the first wireless terminal device 300.

[Operation Example of Information Processing Device]

Figure 30:
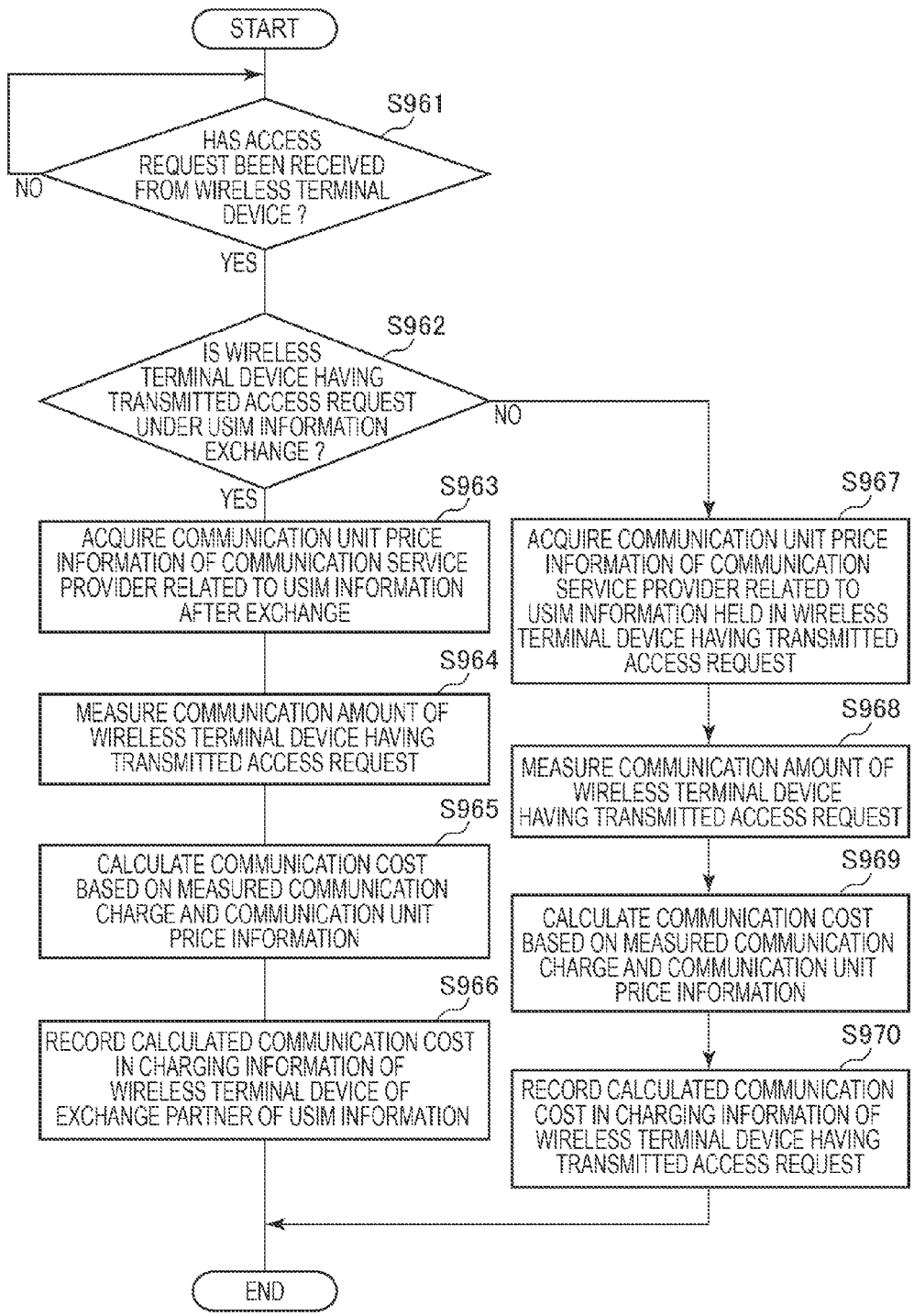
FIG. 30 is a flowchart illustrating an example of a processing procedure of a charging control process in the information processing device 700 in the third embodiment of this disclosure.

FIG. 30 is a flowchart illustrating an example of a processing procedure of the charging control process in the information processing device 700 in the third embodiment of this disclosure.

First, it is determined whether the access information reception unit 730 has received the access request transmitted from the wireless terminal device via the network control device (step S961). When the access request from the wireless terminal device has not been received, monitoring continues to be performed.

When the access request from the wireless terminal device has been received (step S961), the charging processing unit 750 determines whether the wireless terminal device having transmitted the access request is under USIM information exchange based on the information from the USIM information exchange control unit 280 (step S962).

When the wireless terminal device having transmitted the access request is under USIM information exchange (step S962), the charging processing unit 750 acquires the communication unit price information of the communication service provider related to the USIM information after exchange (step S963). In other words, communication unit price information associated with the wireless terminal device of the exchange partner in the communication unit price information 721 of the wireless terminal device information holding unit 720 is acquired.

The charging processing unit 750 then measures a communication amount of the wireless terminal device having transmitted the access request based on the information from the network control device (step S964). The charging processing unit 750 then calculates the communication cost based on the measured communication amount and the acquired communication unit price information (step S965).

The charging processing unit 750 then records the calculated communication cost in the charging information of the USIM information exchange partner (the exchange partner of the wireless terminal device having transmitted the access request) (step S966). In other words, the communication cost is recorded as history information of the charging information 742 of the charging information holding unit 740, and the communication cost is added to a total amount of the charging information 742.

Further, when the wireless terminal device having transmitted the access request is not under USIM information exchange (step S962), the charging processing unit 750 acquires the communication unit price information of the communication service provider related to the USIM information held in the wireless terminal device having transmitted the access request (step S967). In other words, communication unit price information associated with the wireless terminal device having transmitted the access request in the communication unit price information 721 of the wireless terminal device information holding unit 720 is acquired.

The charging processing unit 750 then measures a communication amount of the wireless terminal device having transmitted the access request based on the information from the network control device (step S968). The charging processing unit 750 calculates a communication cost based on the measured communication amount and the acquired communication unit price information (step S969).

The charging processing unit 750 then records the calculated communication cost in the charging information of the wireless terminal device having transmitted the access request (step S970).

Thus, in this example, a cost related to communication performed after access of the first wireless terminal device and the base station related to the second communication service provider based on the second access right after the first access right and the second access right are transferred is charged as a cost related to the second wireless terminal device. Further, steps S963 to S966 are an example of a charging procedure defined in claims.

[Example of Charging Based on Holding State of USIM Information after Exchange]

Figure 31:
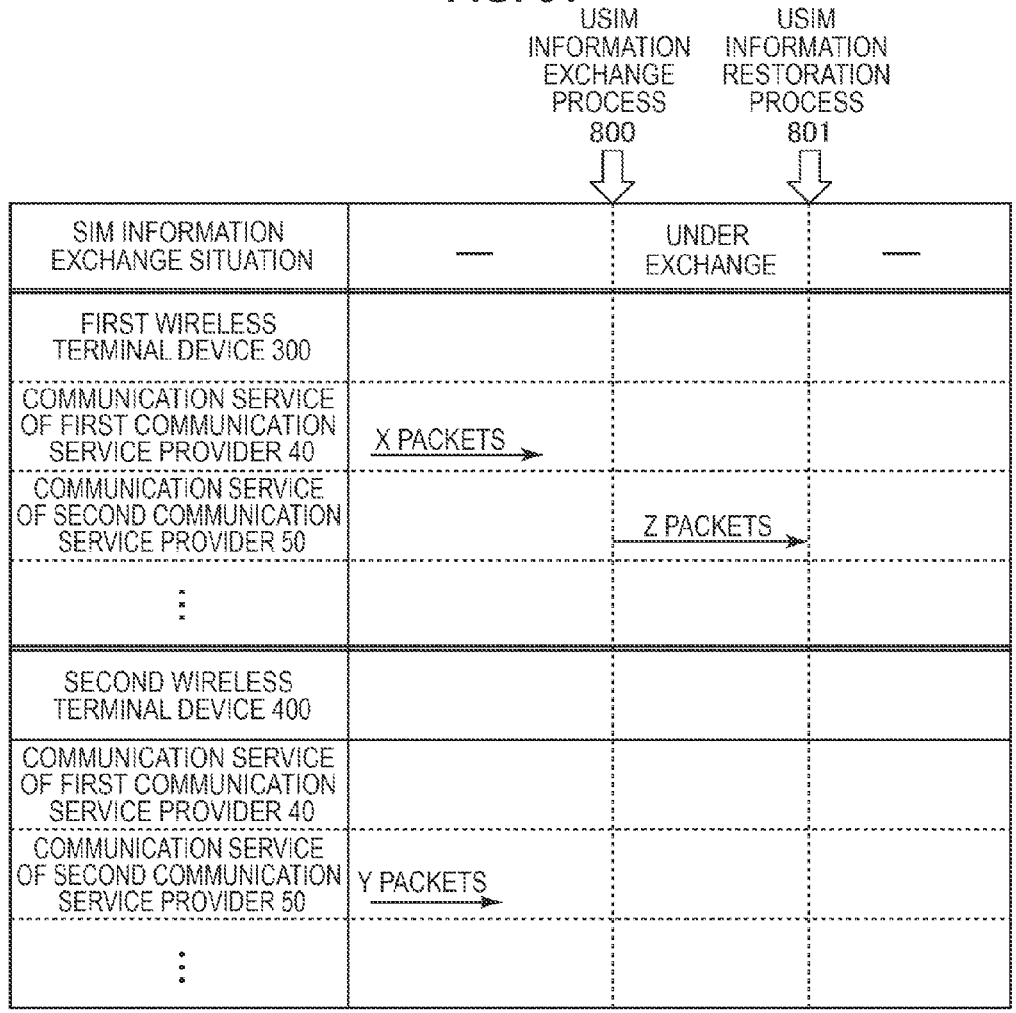
FIG. 31 is a diagram schematically illustrating a charging method for the wireless terminal device in the third embodiment of this disclosure.

FIG. 31 is a diagram schematically illustrating a charging method for a wireless terminal device in the third embodiment of this disclosure. Further, FIG. 31 is a variant of FIG. 29, and FIG. 31(a) is the same as FIG. 29(a). Accordingly, the same parts as those in FIG. 29 are denoted by the same reference numerals, and a description thereof will be partially omitted.

In FIG. 31(b), a charging method for the first wireless terminal device 300 and the second wireless terminal device 400 is shown. Here, in FIG. 29(b), the example in which, when the USIM information has been exchanged, charging is performed based on the holding state of the USIM information before exchange has been shown. On the other hand, in FIG. 31(b), an example in which charging is performed based on a holding state of the USIM information after exchange is shown. For example, communication cost for communication (Z packets) performed by the first wireless terminal device 300 using the USIM information of the second communication service provider 50 between the USIM information exchange process 800 and the USIM information restoration process 801 is added to the first wireless terminal device 300. In other words, the user of the second wireless terminal device 400 that is an exchange target does not bear the communication cost (for the Z packets) of the first wireless terminal device 300.

For example, each user of the first wireless terminal device 300 and the second wireless terminal device 400 is also assumed to have made a meter-rate system contract with each communication service provider. In this case, each user will pay a communication cost to each communication service provider according to a packet amount. Accordingly, it is preferable for the user having performed communication to substantially bear a communication cost generated after the exchange of the USIM information. Thus, it is possible to enable provision of communication service corresponding to a different charging method of each communication service provider.

[Operation Example of Information Processing Device]

Figure 32:
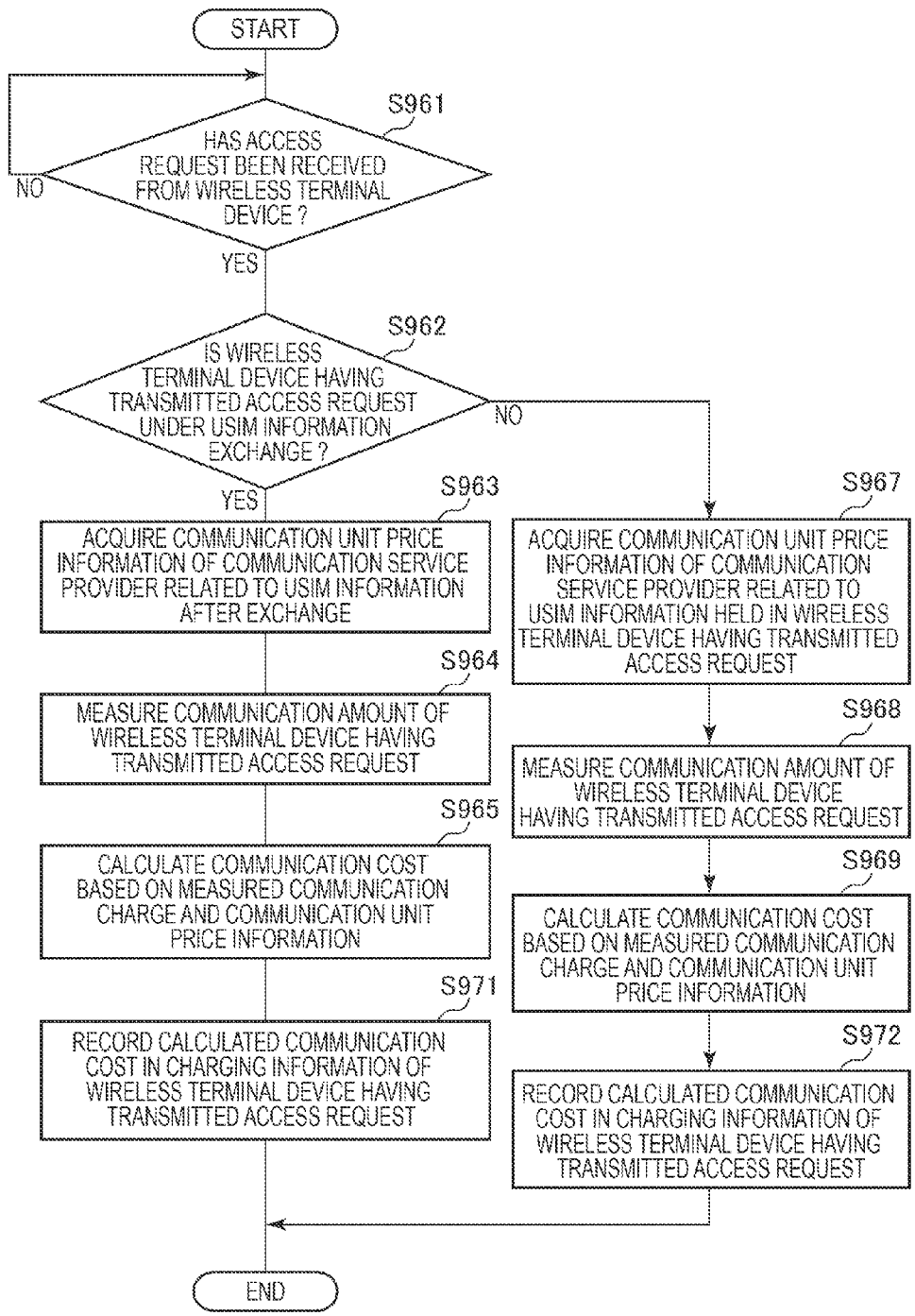
FIG. 32 is a flowchart illustrating an example of a processing procedure of the charging control process in the information processing device 700 in the third embodiment of this disclosure.

FIG. 32 is a flowchart illustrating an example of a processing procedure of a charging control process in the information processing device 700 in the third embodiment of this disclosure. Further, since this processing procedure is a variant of FIG. 30, the same parts as those in FIG. 30 are denoted by the same reference numerals, and a description thereof will be partially omitted.

After a communication cost is calculated (step S965), the charging processing unit 750 records the calculated communication cost in the charging information of the wireless terminal device having transmitted the access request (step S971).

Further, after the communication cost is calculated (step S969), the charging processing unit 750 records the calculated communication cost in the charging information of the wireless terminal device having transmitted the access request (step S972).

Thus, in this example, a cost related to communication performed after access of the first wireless terminal device and the base station related to the second communication service provider based on the second access right after the first access right and the second access right are transferred is charged as a cost related to the first wireless terminal device. Further, steps S963 to S965 and S971 are an example of a charging procedure defined in claims.

Further, the example illustrated in FIGS. 29 and 30 and the example illustrated in FIGS. 31 and 32 may be switched based on whether at least one of the users of the wireless terminal devices that are exchange targets has made a flat rate contract with the communication service provider. In other words, a cost of communication used by the wireless terminal device of the use target may be added to the wireless terminal device of the user having made the flat rate contract with the communication service provider. For example, following step S962 illustrated in FIGS. 30 and 32, a determination may be made as to whether at least one of the users of the wireless terminal devices that are exchange targets has made the flat rate contract with the communication service provider and each process may be performed based on this determination result.

[Example of Charging Based on Communication Unit Price Different According to Communication Content]

The case in which the communication unit price is equal between the communication service providers has been illustrated above by way of example. Here, a case in which, even if the communication service provider is the same, the communication unit price is different according to communication content (communication service) is also assumed (e.g., call service or data communication service). Therefore, in this example, an example of charging based on the communication unit price different according to the communication content is shown.

Figure 33:
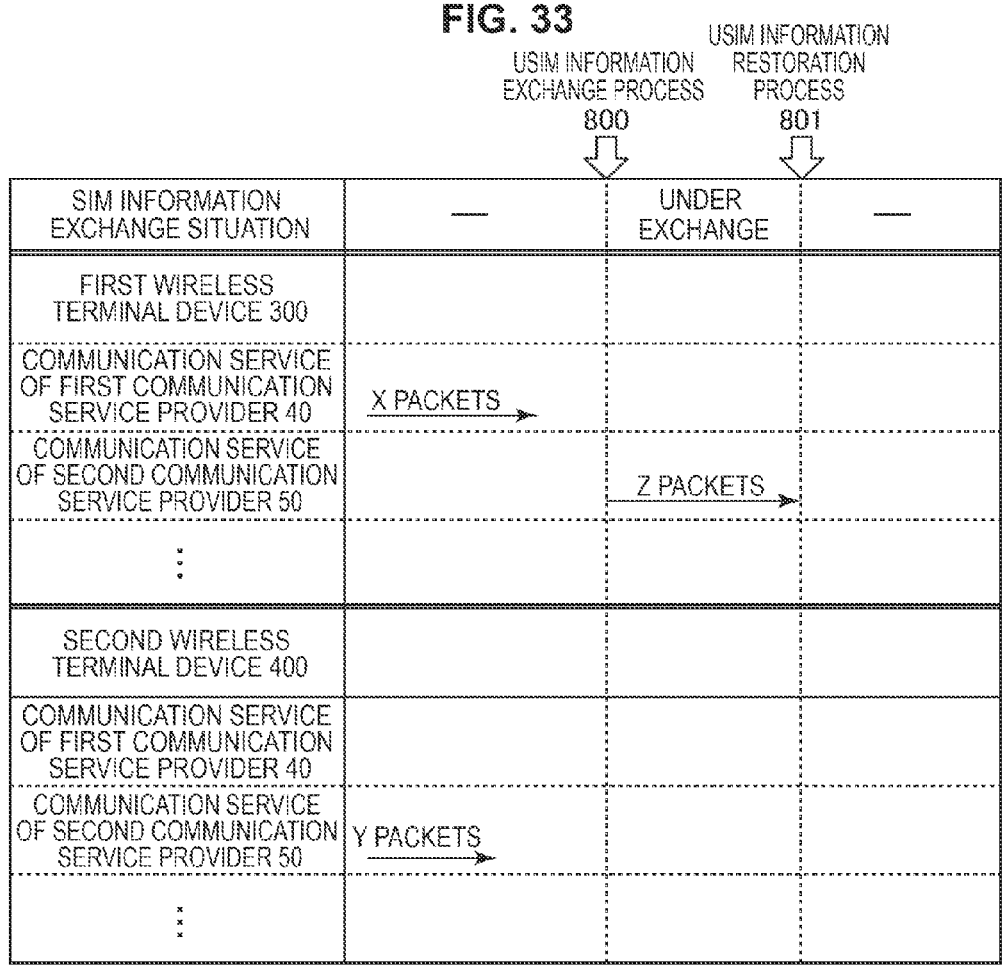
FIG. 33 is a diagram schematically illustrating a charging method for a wireless terminal device in the third embodiment of this disclosure.

FIG. 33 is a diagram schematically illustrating a charging method for the wireless terminal device in the third embodiment of this disclosure. Further, FIG. 33 is a variant of FIG. 31, and FIG. 33(a) is the same as FIG. 29(a). Accordingly, the same parts as those in FIG. 31 are denoted by the same reference numerals, and a description thereof will be partially omitted.

In FIG. 33(b), a charging method for the first wireless terminal device 300 and the second wireless terminal device 400 is shown. Here, while the case in which the communication unit price is the same between communication service providers is illustrated in FIG. 31(b), a case in which the communication unit price is different according to the communication content (communication service) is illustrated in FIG. 33(b) (e.g., call service or data communication service).

For example, the communication unit price when the first wireless terminal device 300 has performed communication (X packets) using the USIM information of the first communication service provider 40 is assumed to be "C yen/packet." Further, the communication unit price when the second wireless terminal device 400 has performed communication (Y packets) using the USIM information of the second communication service provider 50 is assumed to be "D1 yen/packet."

Further, a communication unit price when the first wireless terminal device 300 has performed communication (Z packets) using the USIM information of the second communication service provider 50 between the USIM information exchange process 800 and the USIM information restoration process 801 is assumed to be "D2 yen/packet."

Thus, when the communication unit price is different according to the communication content (communication service), the communication cost is calculated based on the number of packets used for the communication and the communication unit price at the time of the communication. Further, the same also applies to a case in which the communication unit price is changed regularly or irregularly according to a communication state (e.g., a congestion state).

[Operation Example of Information Processing Device]

Figure 34:
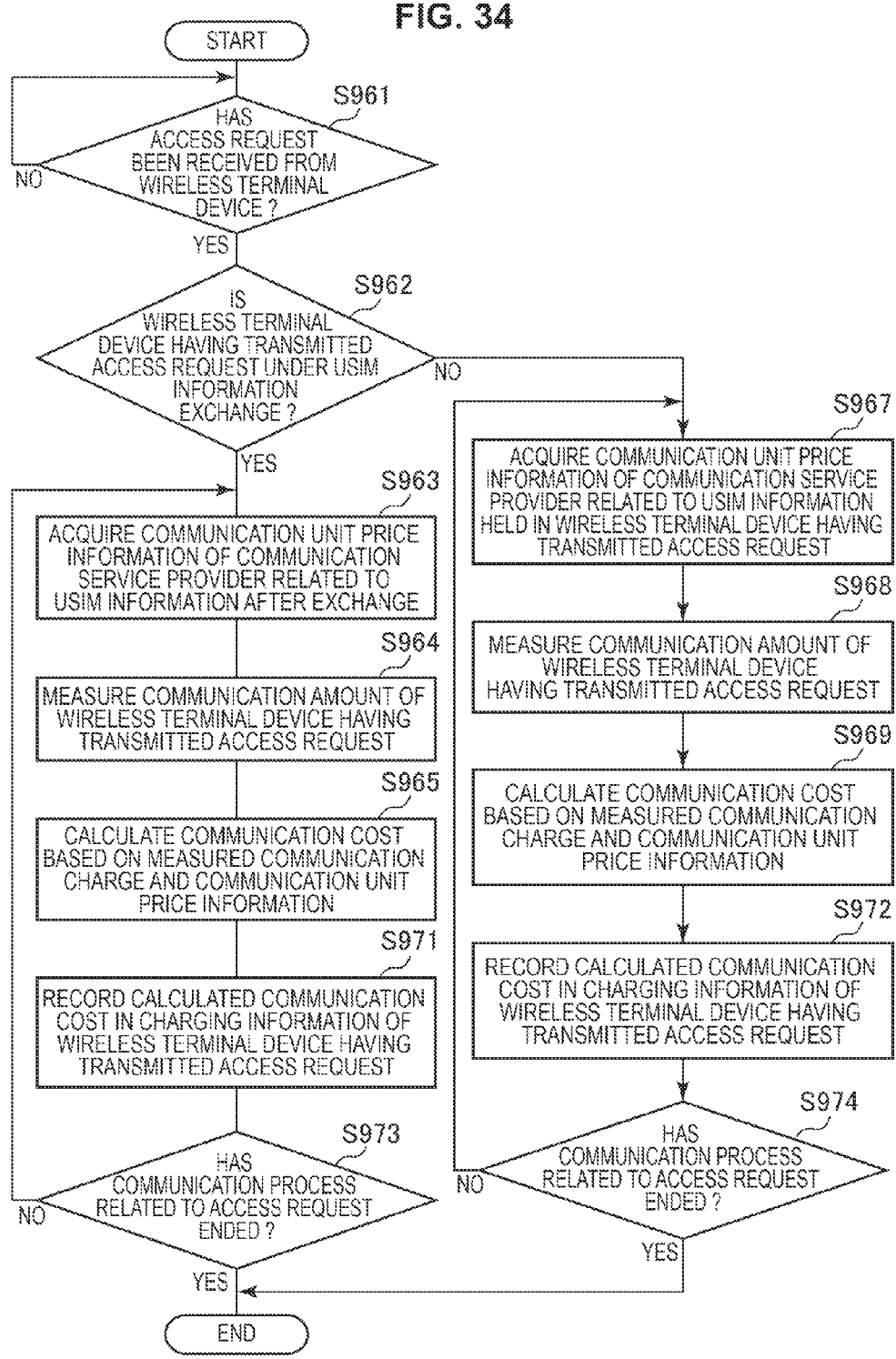
FIG. 34 is a flowchart illustrating an example of a processing procedure of a charging control process in the information processing device 700 in the third embodiment of this disclosure.

FIG. 34 is a flowchart illustrating an example of a processing procedure of a charging control process according to the information processing device 700 in the third embodiment of this disclosure. Further, since this processing procedure is a variant of FIG. 32, the same parts as those in FIG. 32 are denoted by the same reference numerals, and a description thereof will be partially omitted.

After the calculated communication cost has been recorded in the charging information of the wireless terminal device having transmitted the access request (step S971), it is determined whether a communication process related to the access request has ended (step S973). When the communication process related to the access request has ended (step S973), an operation of the charging control process ends, and when the communication process related to the access request has not ended, the process returns to step S963.

Further, after the calculated communication cost has been recorded in the charging information of the wireless terminal device having transmitted the access request (step S972), it is determined whether the communication process related to the access request has ended (step S974). When the communication process related to the access request has ended (step S974), the operation of the charging control process ends, and when the communication process related to the access request has not ended, the process returns to step S967.

Thus, in this example, the cost related to the communication performed after access of the first wireless terminal device and the base station related to the second communication service provider based on the second access right after the first access right and the second access right are transferred is calculated based on the communication unit price related to the second communication service provider. In this case, the cost may be calculated while changing the communication unit price based on the congestion degree of the base station accessed by the first wireless terminal device based on the second access right.

Thus, it is possible to perform an appropriate charging process even when the communication unit price is changed regularly or irregularly, by sequentially acquiring and using the communication unit price information after the calculated communication cost has been recorded. For example, communication cost can reflect a market mechanism by using the communication unit price that is dynamically changed according to the congestion degree.

[Example of Charging of Reward by Exchange of USIM Information]

The example in which the communication cost generated due to communication caused by the wireless terminal device is calculated has been described above. Here, giving some incentive for acceptance of the exchange to the wireless terminal device of the exchange partner having exchanged the USIM information with the wireless terminal device having transmitted the access request may be considered. Accordingly, in this example, an example in which, when the USIM information has been exchanged, an incentive for the exchange is given to the exchange partner is shown.

Figure 35:
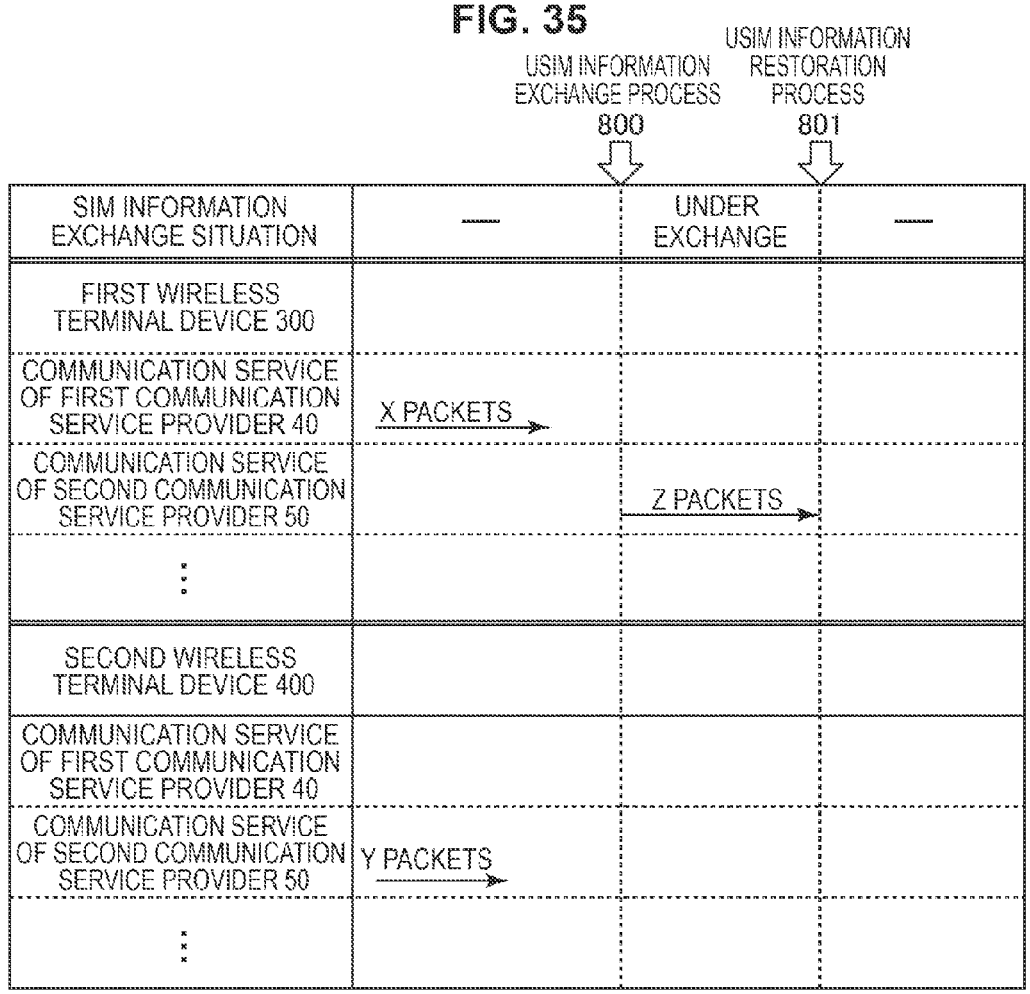
FIG. 35 is a diagram schematically illustrating a charging method for the wireless terminal device in the third embodiment of this disclosure.

FIG. 35 is a diagram schematically illustrating a charging method for the wireless terminal device in the third embodiment of this disclosure. Further, FIG. 35 is a variant of FIG. 33, and FIG. 35 (a) is the same as FIG. 33 (a). Accordingly, the same parts as those in FIG. 33 are denoted by the same reference numerals, and a description thereof will be partially omitted.

A charging method for the first wireless terminal device 300 and the second wireless terminal device 400 is illustrated in FIG. 35(b). Here, in FIG. 35(b), an example in which a reward is given from the first wireless terminal device 300 to the second wireless terminal device 400 when the USIM information exchange process has been performed based on the access request from the first wireless terminal device 300 is shown. For example, E1 yen is paid as the reward from the first wireless terminal device 300 to the second wireless terminal device 400 that is the USIM information exchange partner.

In other words, E1 yen is added to a total amount of the first wireless terminal device 300 paying the reward of E1 yen. On the other hand, −E1 yen is added to a total amount of the second wireless terminal device 400, which is the USIM information exchange partner, to which the reward of E1 yen is paid (i.e., E1 yen is subtracted).

Thus, when the exchange of the USIM information has been performed, the reward is paid to the exchange partner of the USIM information. For example, the reward is given from a user on the side having executed the communication to a user on the side having accepted the exchange of the USIM information. By the reward being given in this way, an incentive is given in exchanging the USIM information, and an operation of the USIM information exchange is activated. For example, when the exchange of the USIM information is performed based on an unused period that is set by the user manipulation as shown in the second embodiment of this disclosure, positively performing such a setting may be considered. Accordingly, it is possible to effectively utilize the base station with a low congestion degree and effectively utilize frequency resources. In other words, it is possible to improve both profit of a user and a wireless communication environment.

[Operation Example of Information Processing Device]

Figure 36:
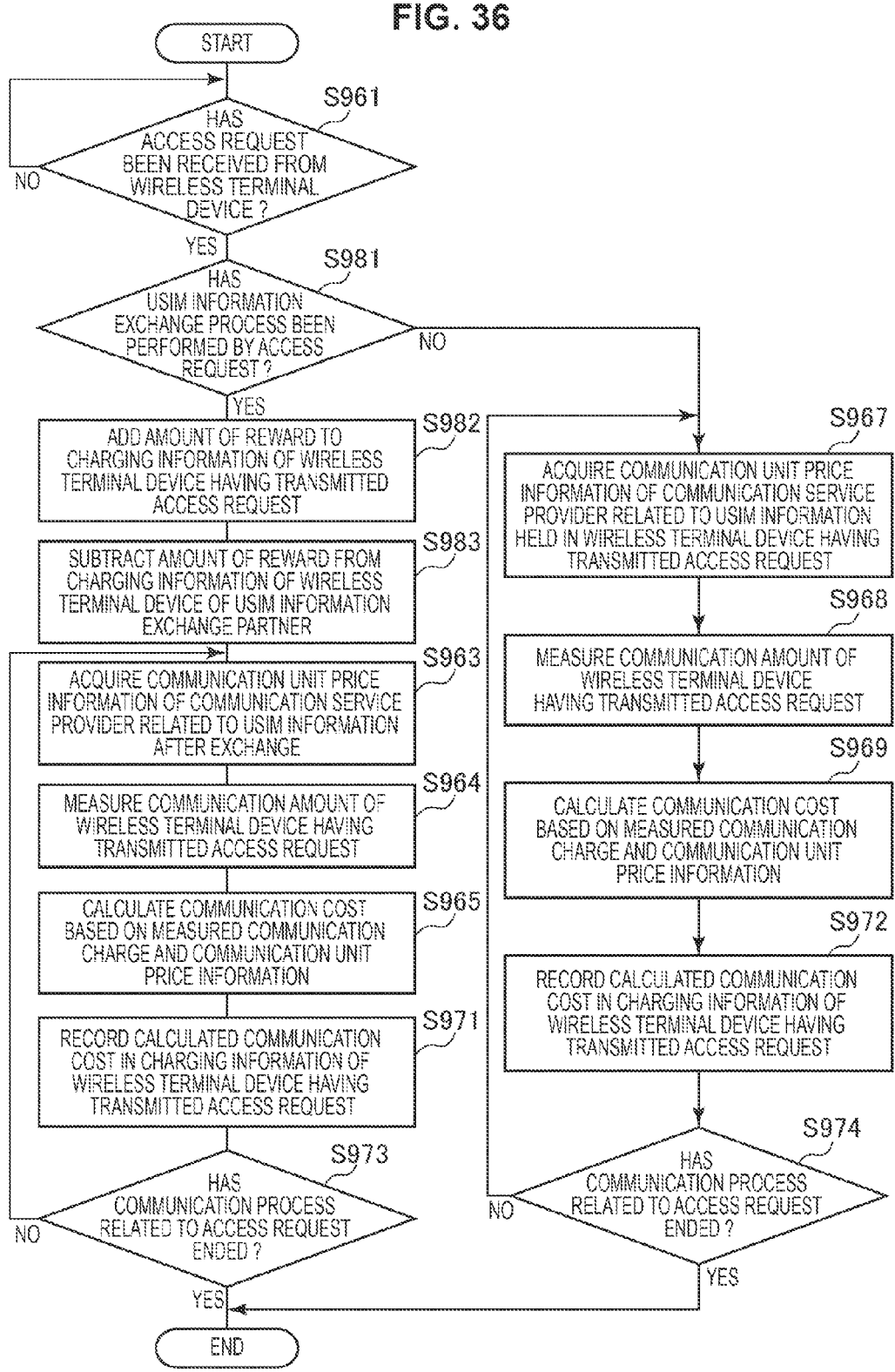
FIG. 36 is a flowchart illustrating an example of a processing procedure of the charging control process in the information processing device 700 in the third embodiment of this disclosure.

FIG. 36 is a flowchart illustrating an example of a processing procedure of the charging control process in the information processing device 700 in the third embodiment of this disclosure. Further, since this processing procedure is a variant of FIG. 34, the same parts as those in FIG. 34 are denoted by the same reference numerals, and a description thereof will be partially omitted.

When an access request is received from a wireless terminal device (step S961), the charging processing unit 750 determines whether the USIM information exchange process has been performed by the access request (step S981). In other words, it is determined whether the USIM information exchange process has been performed for the wireless terminal device having transmitted the access request in response to the access request, based on the information from the USIM information exchange control unit 280. When the USIM information exchange process has not been performed in response to the access request (step S981), the process proceeds to step S967.

Further, when the USIM information exchange process has been performed in response to the access request (step S981), the charging processing unit 750 records a reward in the charging information of the wireless terminal device having transmitted the access request (step S982). In other words, the reward is added to the communication cost of the wireless terminal device having transmitted the access request.

The charging processing unit 750 then records the reward in the charging information of the wireless terminal device of the USIM information exchange partner (step S983). In other words, the reward is subtracted from the communication cost of the wireless terminal device of the exchange partner.

Thus, in this example, after the first access right and second access right have been transferred, the reward for the transfer is charged in the cost related to the first wireless terminal device and a cost related to the second wireless terminal device. Further, step S982 and S983 are an example of the charging procedure defined in claims.

Thus, recording of the reward is performed in the two wireless terminal devices related to the exchange process whenever the USIM information exchange process is performed. Accordingly, an appropriate charging process related to the USIM information exchange process in addition to the communication cost can be performed.

[Selection Example of Communication Service Provider Having Displayed Reward]

The example in which the addition or subtraction of the reward is performed in the two wireless terminal devices related to the USIM information exchange process when the USIM information exchange process has been performed has been shown above. Here, a plurality of communication service providers can be displayed on a display unit and a communication service provider desired by the user can be determined, as shown in the first embodiment of this disclosure. Accordingly, presenting the reward at the time of such a display and giving a user an opportunity of selection based on the reward may be considered.

Figure 37:
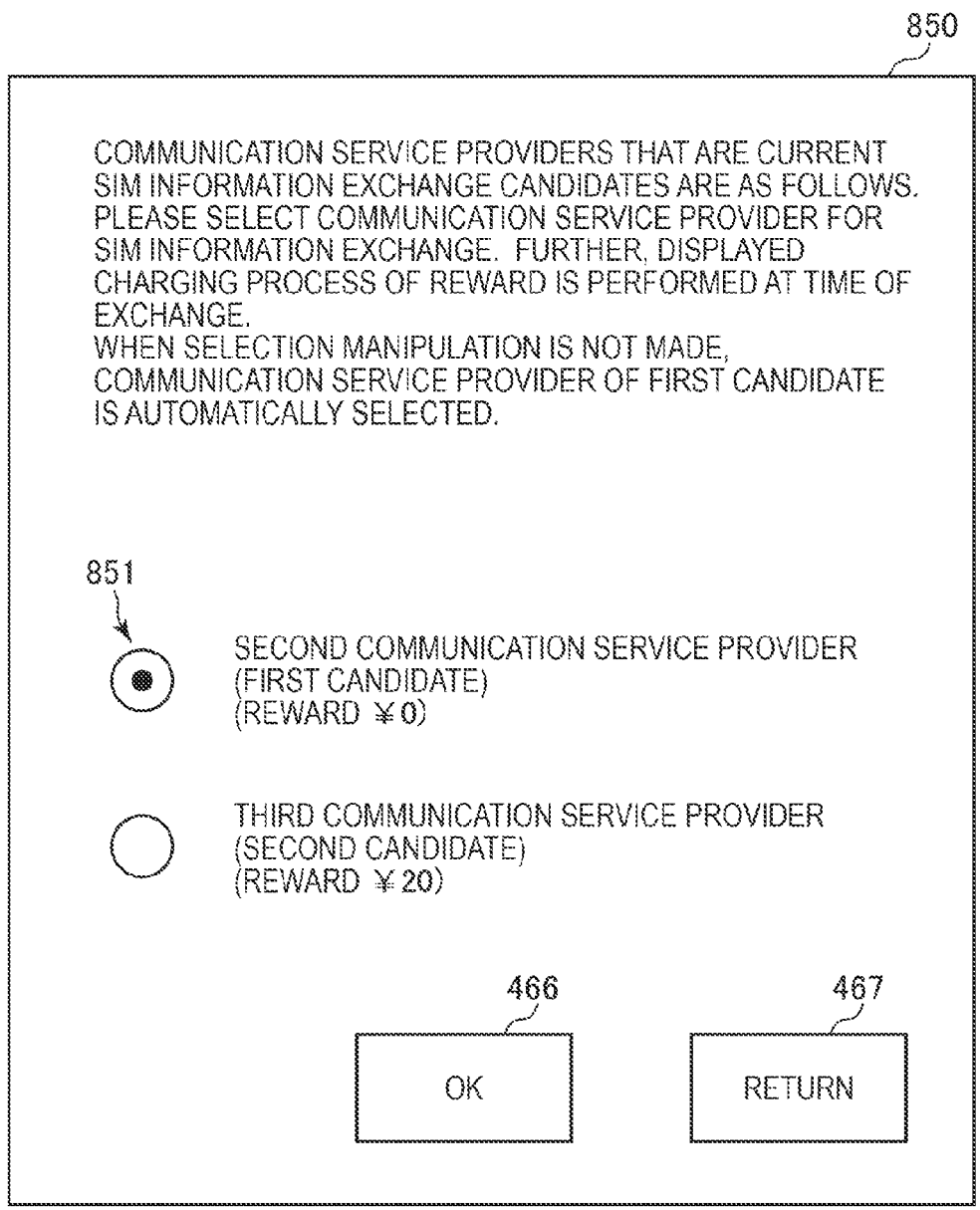
FIG. 37 is a diagram illustrating an example of a display screen displayed in the first wireless terminal device 300 in the third embodiment of this disclosure.

FIG. 37 is a diagram illustrating an example of a display screen (a display screen 850) displayed on the first wireless terminal device 300 in the third embodiment of this disclosure. Further, while an example which a communication service provider selection manipulation is performed in the first wireless terminal device 300 is illustrated in FIG. 37, the same may be performed in other wireless terminal devices.

The display screen 850 is an example of a display screen when the USIM information exchange candidate list transmitted from the information processing device 700 is displayed on the display unit 350. Further, the display screen 850 is a variant of the display screen 464 illustrated in FIG. 16(*a*), and is substantially the same as the display screen 464 except that the reward amount of money is displayed. Accordingly, the same parts as those in the display screen 464 are denoted by the same reference numerals and a description thereof will be partially omitted.

Radio buttons 851, an OK button 466, and a return button 467 are displayed on the display screen 850.

The radio buttons 851 are radio buttons for selecting a communication service provider desired by a user. For example, information (e.g., a communication service provider name) on a communication service provider that is a USIM information exchange candidate, order of the candidates, and an amount of reward are displayed side-by-side in the corresponding radio button 851. This amount of reward may be set by the communication service provider or may be set by a user manipulation in each wireless terminal device.

For example, when in urgent need of a partner, a user may recruit USIM information exchange partners by notifying them of a reward. For example, in the example illustrated in FIG. 37, a case in which the second communication service provider provides a higher rate communication service than the third communication service provider is assumed. In this case, when the high rate communication service is going to be used, the second communication service provider is selected. On the other hand, when the high rate communication service is not going to be used, the third communication service provider may be selected for a reward (20 yen). Further, setting for automatically selecting a communication service provider with high reward during notification of the unused period, as shown in the second embodiment of this disclosure, may be performed.

Further, in the embodiments of this disclosure, the information processing devices 200, 600 and 700 configured integrally have been described by way of examples. However, the embodiment of this disclosure may also apply to an information system in which each unit of the information processing device is configured of a plurality of devices. Further, the embodiment of this disclosure may also apply to a portable wireless terminal device (e.g., a data communication-only terminal) other than a portable telephone device or a stationary wireless terminal device (e.g., a wireless terminal device aiming at data collection for a vending machine).

Further, the embodiments of this disclosure are examples for embodying this disclosure, and matters in the embodiments of this disclosure and matters identifying the invention in claims have a correspondence relationship, as specified in the embodiments of this disclosure. Similarly, the matters identifying the invention in claims and matters in the embodiments of this disclosure having the same name as the matters identifying the invention have a correspondence relationship. However, this disclosure is not limited to the embodiments, and may be further embodied by variously modifying the embodiments without departing from the scope and spirit of this disclosure.

Further, the processing procedures described in the embodiments of this disclosure may be regarded as a method having a series of the procedures or may be regarded as a program for causing a computer to execute the series of procedures or as a recording medium having the program stored therein. For example, a hard disk, a CD (Compact Disc), an MD (MiniDisc), or a DVD (Digital Versatile Disk) may be used as the recording medium. Further, a memory card, a Blu-ray Disc (registered trademark)) or the like may be used.

REFERENCE SIGNS LIST 100 communication system
101 public line network
110, 120 network control device
200, 600, 700 information processing device
210 wireless terminal device position acquisition unit
220 wireless terminal device position holding unit
230 congestion degree information acquisition unit
240 congestion degree information holding unit
250, 630 USIM information exchange candidate extraction unit
260, 640 USIM information exchange candidate list holding unit
270, 730 access information reception unit
280, 660 USIM information exchange control unit
290 USIM information exchange terminal list holding unit
300 first wireless terminal device
310 communication unit
320 position information acquisition unit
330 control unit
340 manipulation reception unit
350 display unit
360 USIM information renewal unit
370 USIM information storage unit
400 second wireless terminal device
610 unused period information acquisition unit
620, 720 wireless terminal device information holding unit
650 virtual renewal completion terminal list holding unit
711 wireless terminal device information acquisition unit
712 communication unit price information acquisition unit
740 charging information holding unit
750 charging processing unit
760 charging information output unit

The invention claimed is:

1. An information processing method comprising:
an extraction procedure of extracting another communication service provider other than a first communication service provider based on a result of a comparison of a congestion degree of a base station related to the first communication service provider corresponding to a position in which a first wireless terminal device having a first access right to access the base station related to the first communication service provider is present with a congestion degree of each of base stations related to one or a plurality of communication service providers other than the first communication service provider corresponding to the position in which the first wireless terminal device is present; and
an exchange control procedure of performing control to transfer the first access right from the first wireless terminal device to a second wireless terminal device having a second access right to access a base station related to the other extracted communication service provider, and to transfer the second access right from the second wireless terminal device to the first wireless terminal device.

2. The information processing method according to claim 1, wherein
the extraction procedure extracts, as the other communication service provider, a communication service provider related to a base station whose congestion degree is lower than the congestion degree of the base station related to the first communication service provider corresponding to the position in which the first wireless terminal device is present.

3. The information processing method according to claim 1, wherein
the extraction procedure compares the congestion degree of the base station related to the first communication service provider corresponding to the position in which the first wireless terminal device is present with the congestion degree of each of the base stations related to the one or the plurality of communication service providers corresponding to the position in which the first wireless terminal device is present, and extracts a communication service provider related to a base station whose congestion degree is lowest as the other communication service provider.

4. The information processing method according to claim 1, wherein
the exchange control procedure transfers the first access right and the second access right when an access request for access to the base station related to the first communication service provider based on the first access right is transmitted from the first wireless terminal device, and, thereafter, performs control to cause the base station related to the second communication service provider and the first wireless terminal device based on the second access right to access each other.

5. The information processing method according to claim 4, further comprising:
a restoration control procedure of performing control, when use of wireless communication service based on the access request ends, to transfer the second access right from the first wireless terminal device to the second wireless terminal device and to transfer the first access right from the second wireless terminal device to the first wireless terminal device.

6. The information processing method according to claim 1, wherein
the extraction procedure extracts a plurality of communication service providers as the other communication service provider, and
the exchange control procedure selects, as the second wireless terminal device, a wireless terminal device having an access right to access a base station related to one communication service provider selected in the first wireless terminal device from the plurality of extracted communication service providers.

7. The information processing method according to claim 1, further comprising:
- an acquisition procedure of acquiring nonuse information on an unused state of each of wireless terminal devices having an access right to access at least one of the base stations related to the one or a plurality of communication service providers,
- wherein the exchange control procedure selects, as the second wireless terminal device, a wireless terminal device that is in an unused state from among the plurality of wireless terminal devices having the second access right.

8. The information processing method according to claim 1, wherein
- the extraction procedure acquires and uses the congestion degree of each base station from a wireless terminal device accessing the base station.

9. The information processing method according to claim 1, further comprising:
- a charging procedure of charging, as a cost related to the second wireless terminal device, a cost related to communication performed after access of the first wireless terminal device to the base station related to the second communication service provider based on the second access right after the first access right and the second access right are transferred.

10. The information processing method according to claim 1, further comprising:
- a charging procedure of charging, as a cost related to the first wireless terminal device, a cost related to communication performed after access of the first wireless terminal device to the base station related to the second communication service provider based on the second access right after the first access right and the second access right are transferred.

11. The information processing method according to claim 10, wherein
- the charging procedure calculates the cost related to the communication based on a communication unit price related to the second communication service provider.

12. The information processing method according to claim 11, wherein
- the charging procedure calculates the cost related to the communication while changing the communication unit price based on the congestion degree of the base station related to the second communication service provider accessing the first wireless terminal device.

13. The information processing method according to claim 1, further comprising:
- a charging procedure of charging, after transfer of the first access right and the second access right, a reward for the transfer in a cost related to the first wireless terminal device and a cost related to the second wireless terminal device.

14. An information processing device comprising:
- a processing unit, configured to,
- extract another communication service provider other than a first communication service provider based on a result of a comparison of a congestion degree of a base station related to the first communication service provider corresponding to a position in which a first wireless terminal device having a first access right to access the base station related to the first communication service provider is present with a congestion degree of each of base stations related to one or a plurality of communication service providers other than the first communication service provider corresponding to the position in which the first wireless terminal device is present;
- perform control to transfer the first access right from the first wireless terminal device to a second wireless terminal device having a second access right to access a base station related to the other extracted communication service provider, and
- transfer the second access right from the second wireless terminal device to the first wireless terminal device.

15. An information processing system comprising:
- a first wireless terminal device having a first access right to access a base station related to a first communication service provider;
- a second wireless terminal device having a second access right to access a base station related to a second communication service provider; and
- a control unit configured to perform control to transfer the first access right from the first wireless terminal device to the second wireless terminal device and to transfer the second access right from the second wireless terminal device to the first wireless terminal device, based on a result of a comparison of a congestion degree of the base station related to the first communication service provider corresponding to a position in which the first wireless terminal device is present.

* * * * *